(12) United States Patent
Peitzke et al.

(10) Patent No.: US 10,069,333 B2
(45) Date of Patent: Sep. 4, 2018

(54) RIDGELINE CABLE DRIVE ELECTRIC ENERGY STORAGE SYSTEM

(71) Applicant: Advanced Rail Energy Storage, LLC, Seattle, WA (US)

(72) Inventors: William R. Peitzke, Montecito, CA (US); Matthew B. Brown, San Diego, CA (US)

(73) Assignee: ADVANCED RAIL ENERGY STORAGE, LLC, Seattle, WA (US)

( * ) Notice: Subject to any disclaimer, the term of this patent is extended or adjusted under 35 U.S.C. 154(b) by 0 days.

(21) Appl. No.: 15/443,816

(22) Filed: Feb. 27, 2017

(65) Prior Publication Data

US 2017/0288457 A1    Oct. 5, 2017

Related U.S. Application Data

(60) Provisional application No. 62/301,466, filed on Feb. 29, 2016.

(51) Int. Cl.
| H02J 15/00 | (2006.01) |
| H02K 7/00 | (2006.01) |
| B61C 17/06 | (2006.01) |
| B60L 9/28 | (2006.01) |
| B60L 8/00 | (2006.01) |

(52) U.S. Cl.
CPC .............. *H02J 15/00* (2013.01); *B61C 17/06* (2013.01); *H02K 7/00* (2013.01); *B60L 8/00* (2013.01); *B60L 9/28* (2013.01)

(58) Field of Classification Search
CPC .... H02J 15/00; B60L 8/00; B60L 9/28; Y02B 50/14; Y02B 50/144
See application file for complete search history.

(56) References Cited

U.S. PATENT DOCUMENTS

| 2009/0284021 A1* | 11/2009 | Scott | F03G 3/00 290/1 R |
| 2011/0037275 A1* | 2/2011 | Peitzke | B60L 7/10 290/1 R |
| 2015/0048622 A1* | 2/2015 | Schegerin | F03G 3/00 290/1 R |
| 2016/0138572 A1* | 5/2016 | Boone | F03G 3/00 290/1 A |

* cited by examiner

*Primary Examiner* — Harry Behm
(74) *Attorney, Agent, or Firm* — Felix L. Fischer

(57) ABSTRACT

A highly efficient, utility scale energy storage system employs large masses transported uphill to store energy and downhill to release energy. An electric powered cable winch or chain drive shuttles the masses between two storage yards of different elevations separated by a steep incline on rail vehicles supported by track and operated by an automated control system.

12 Claims, 52 Drawing Sheets

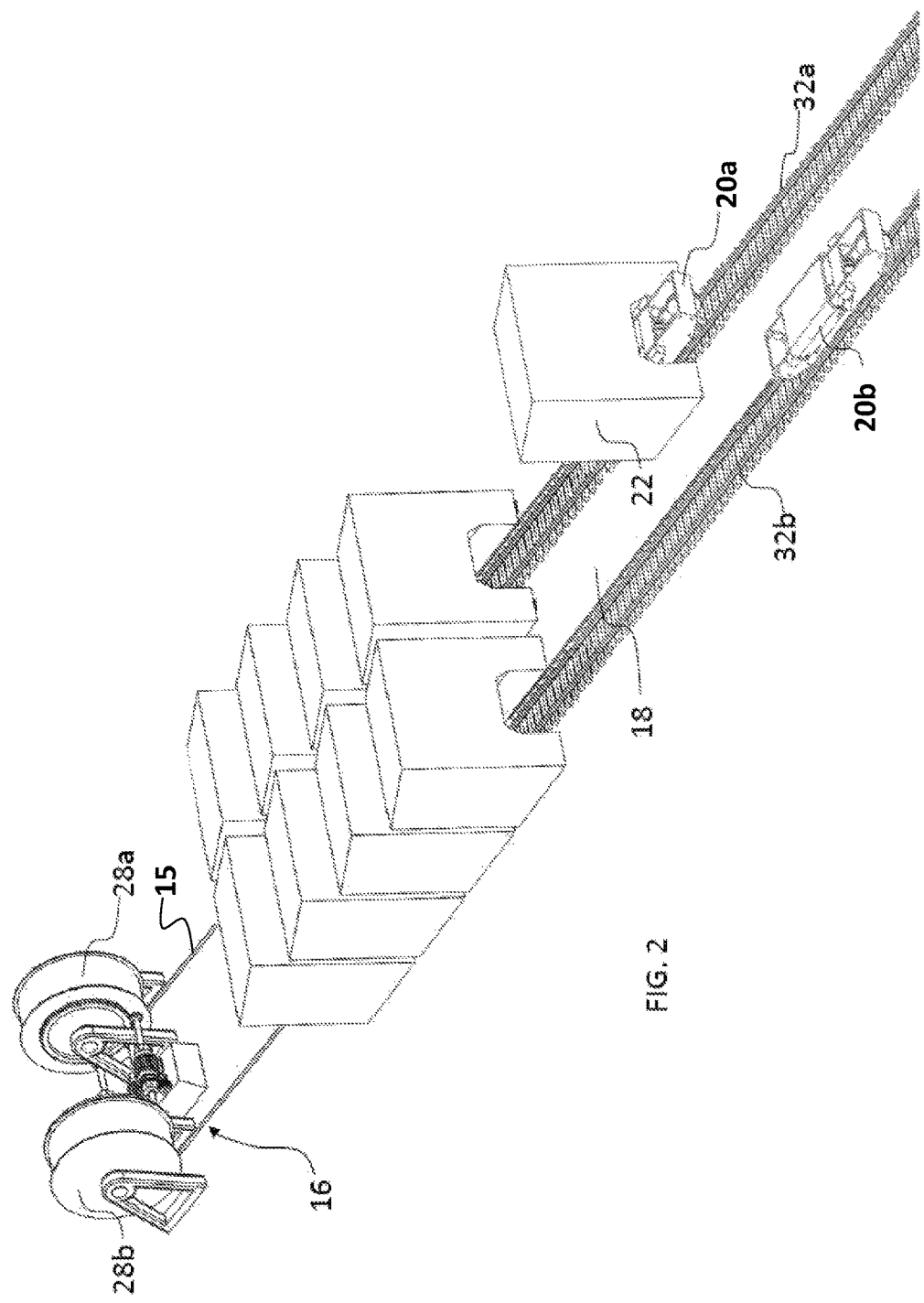

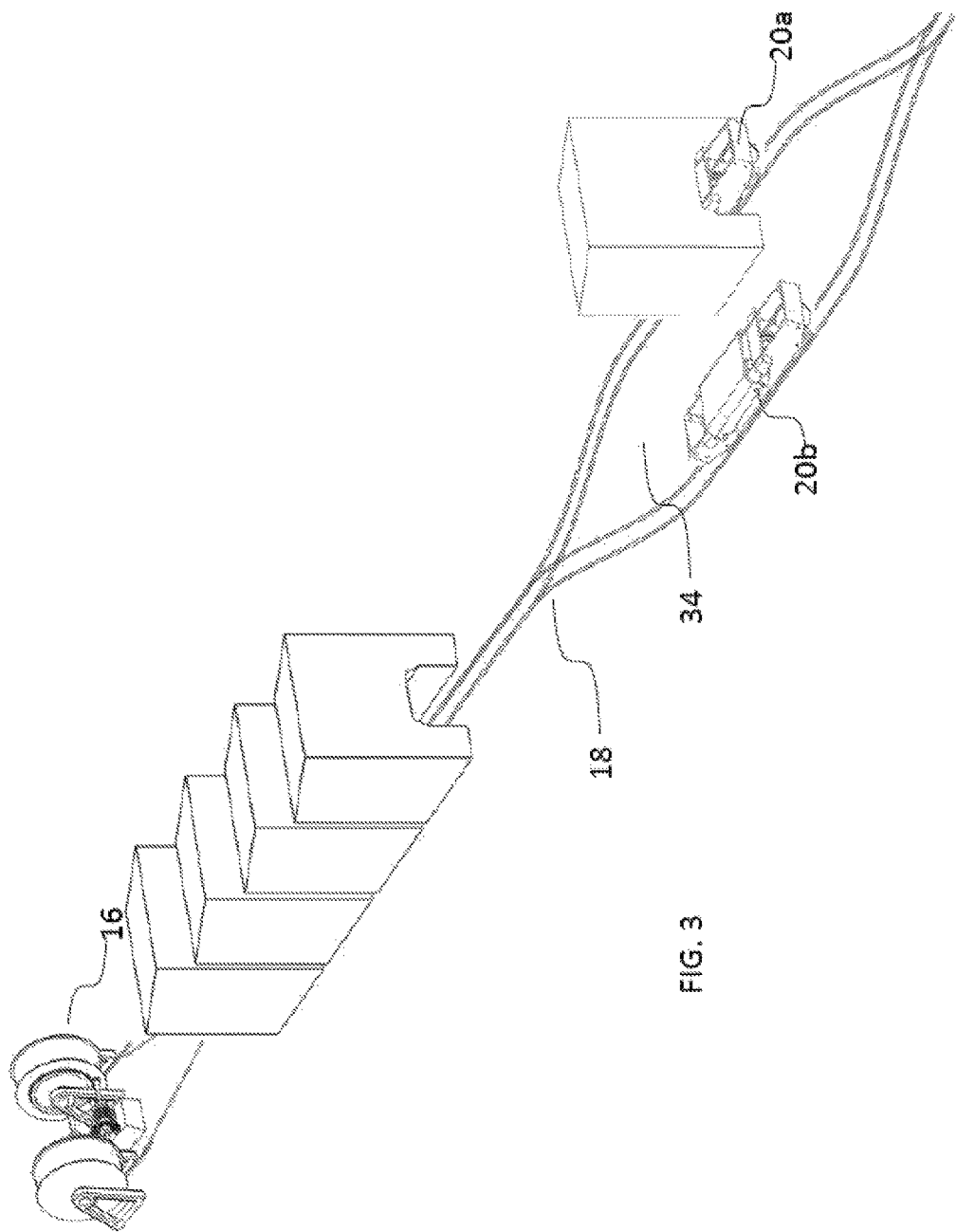

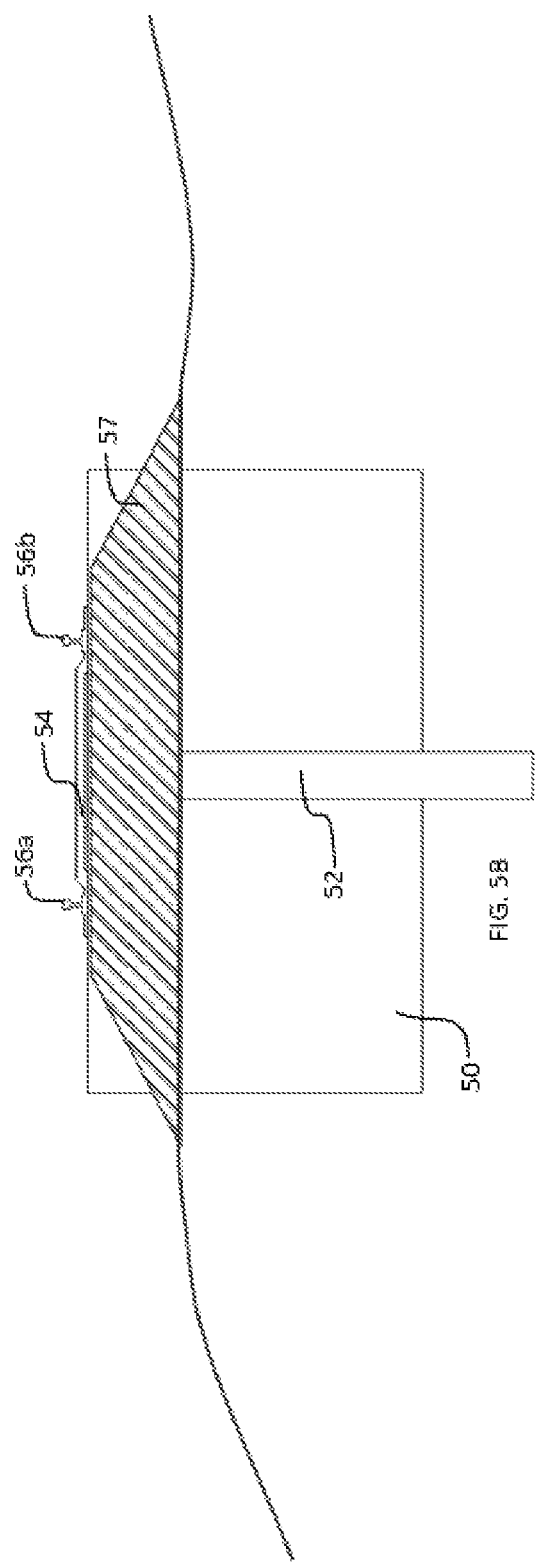

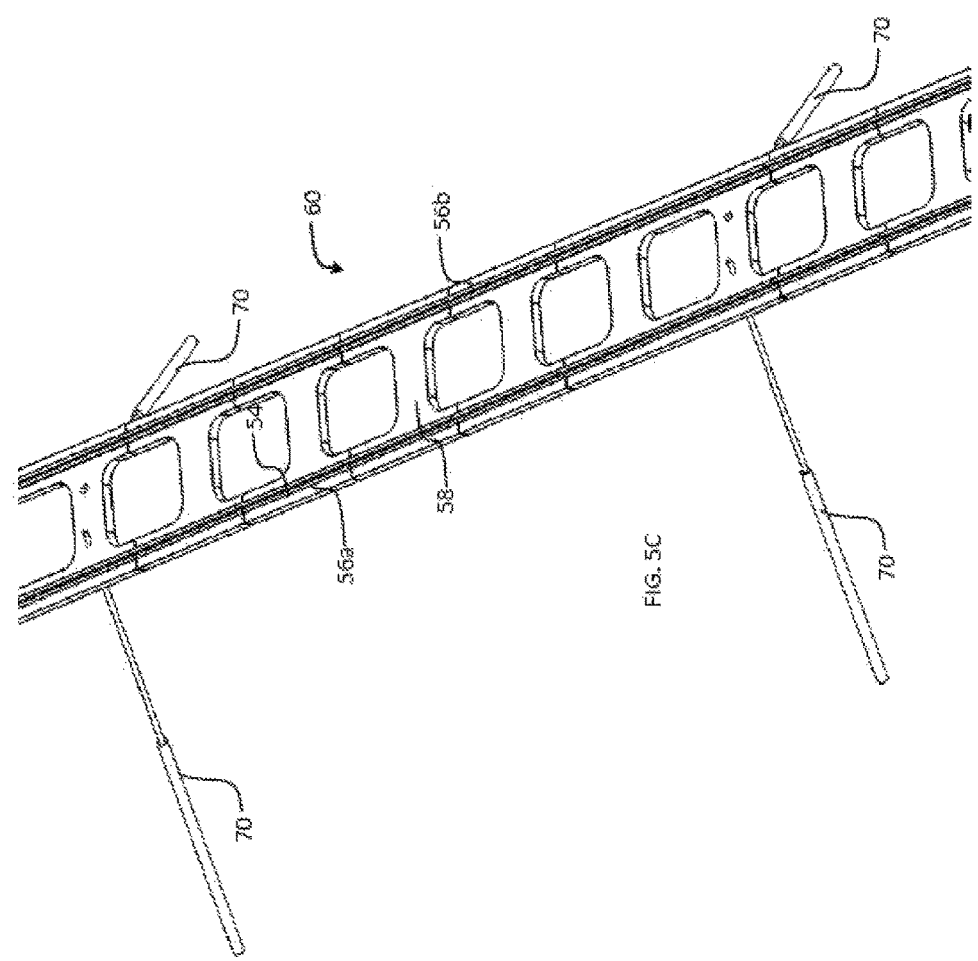

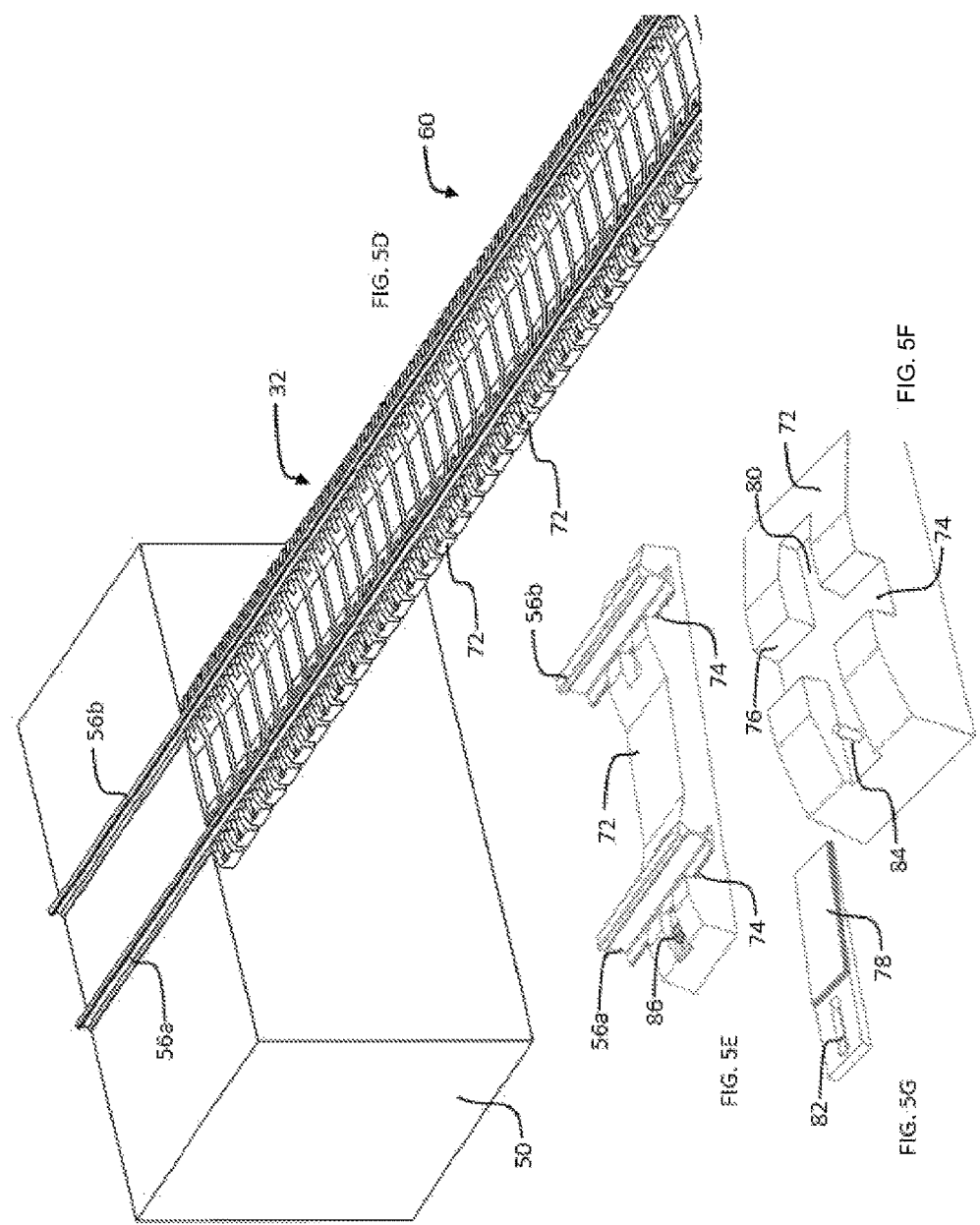

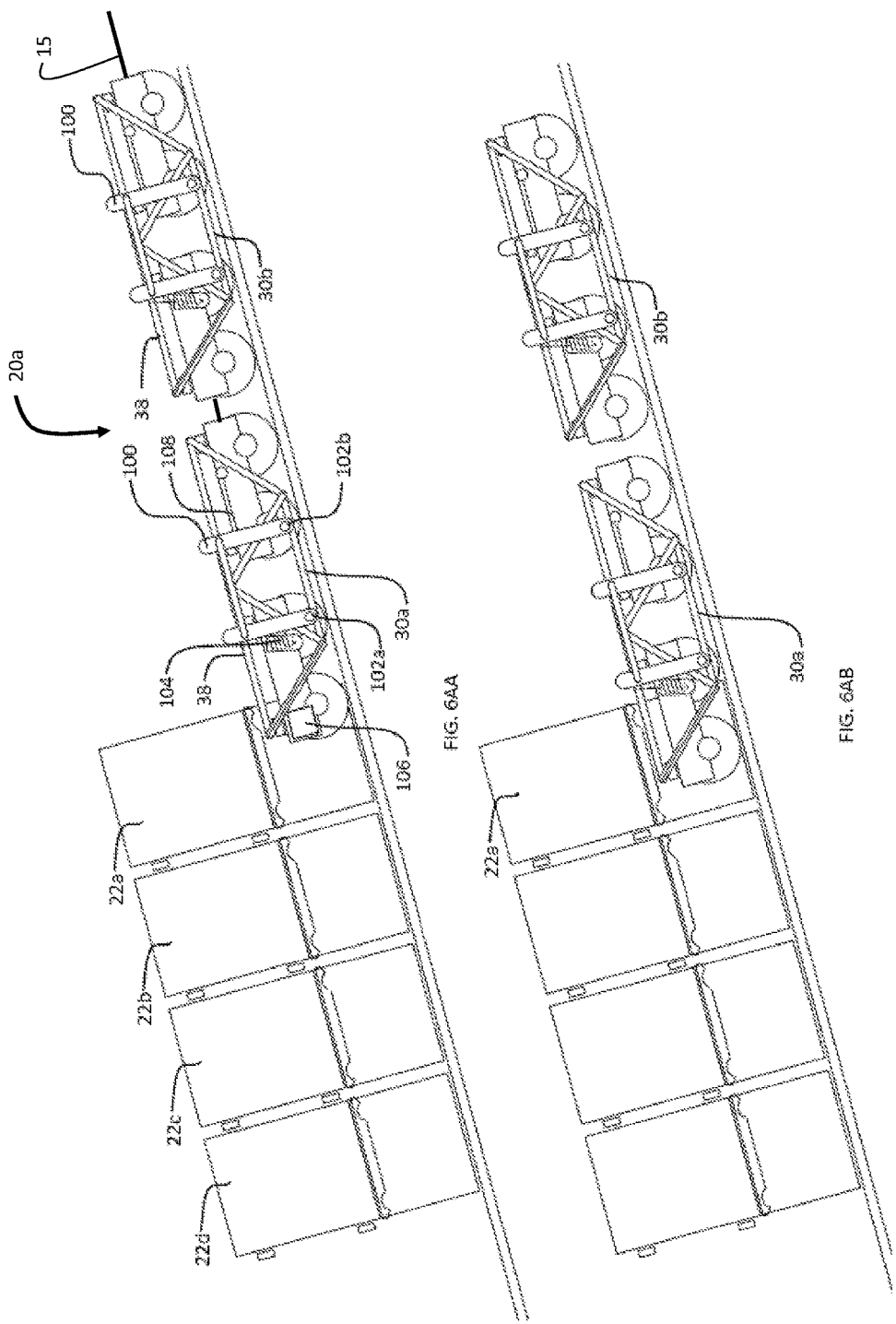

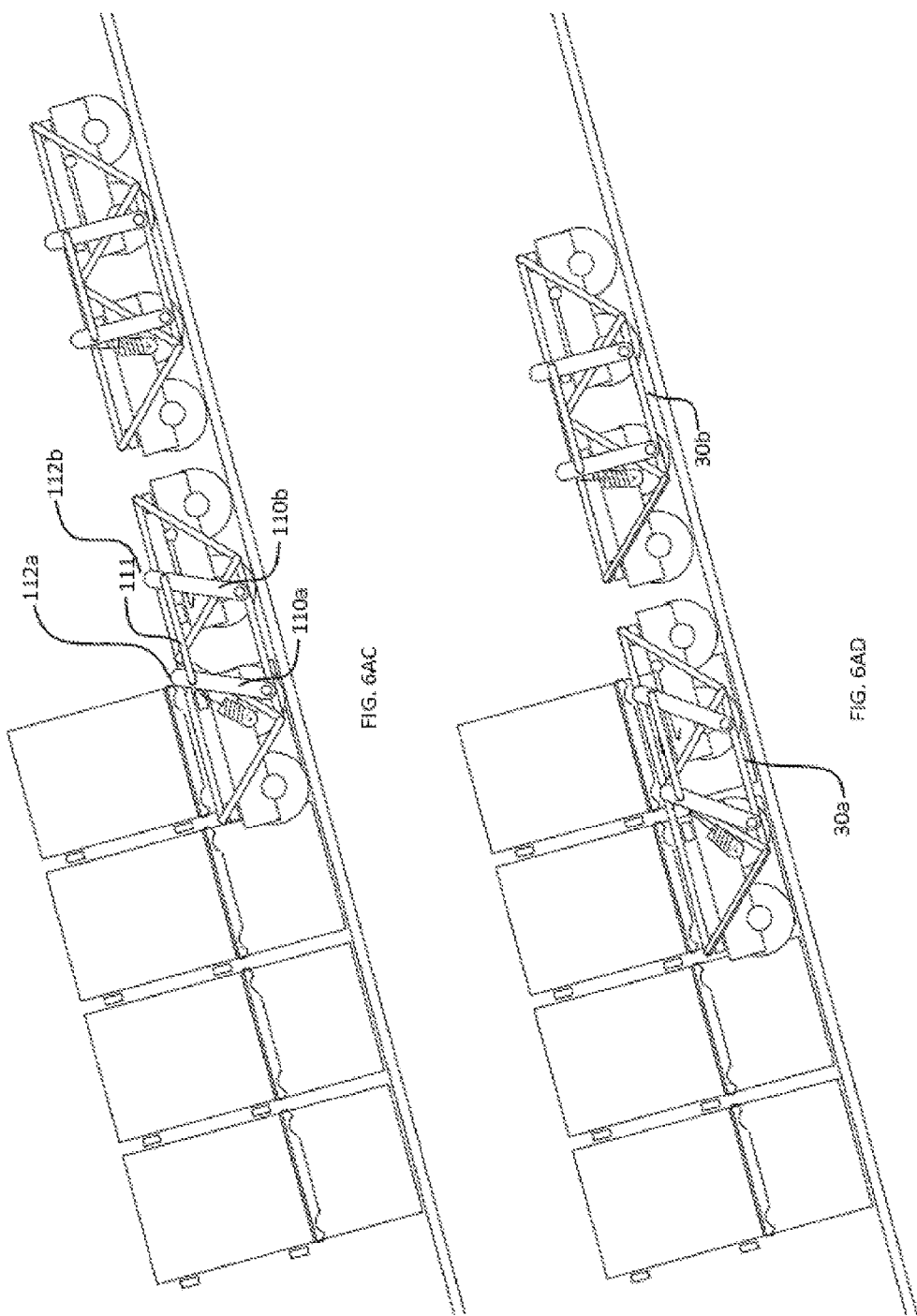

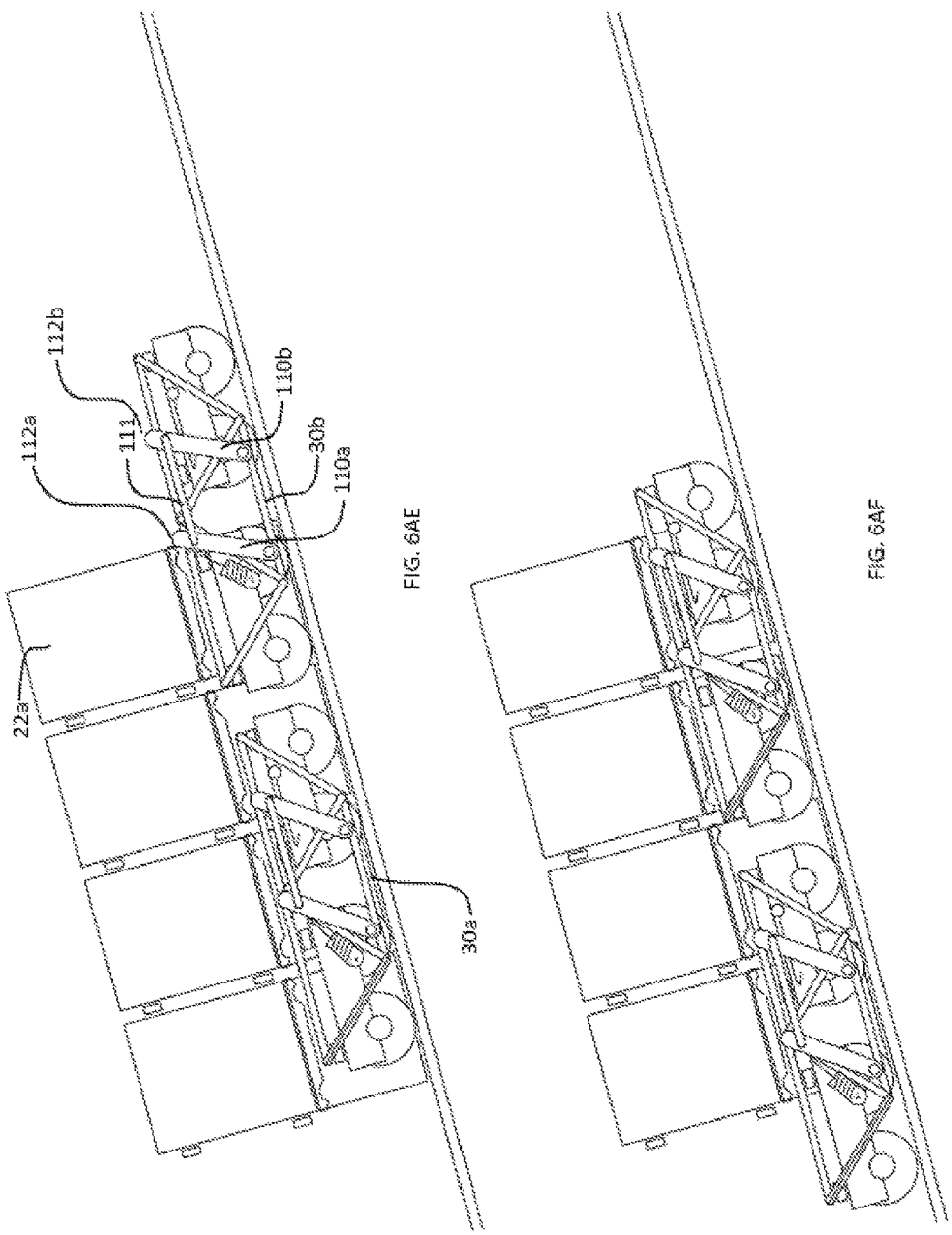

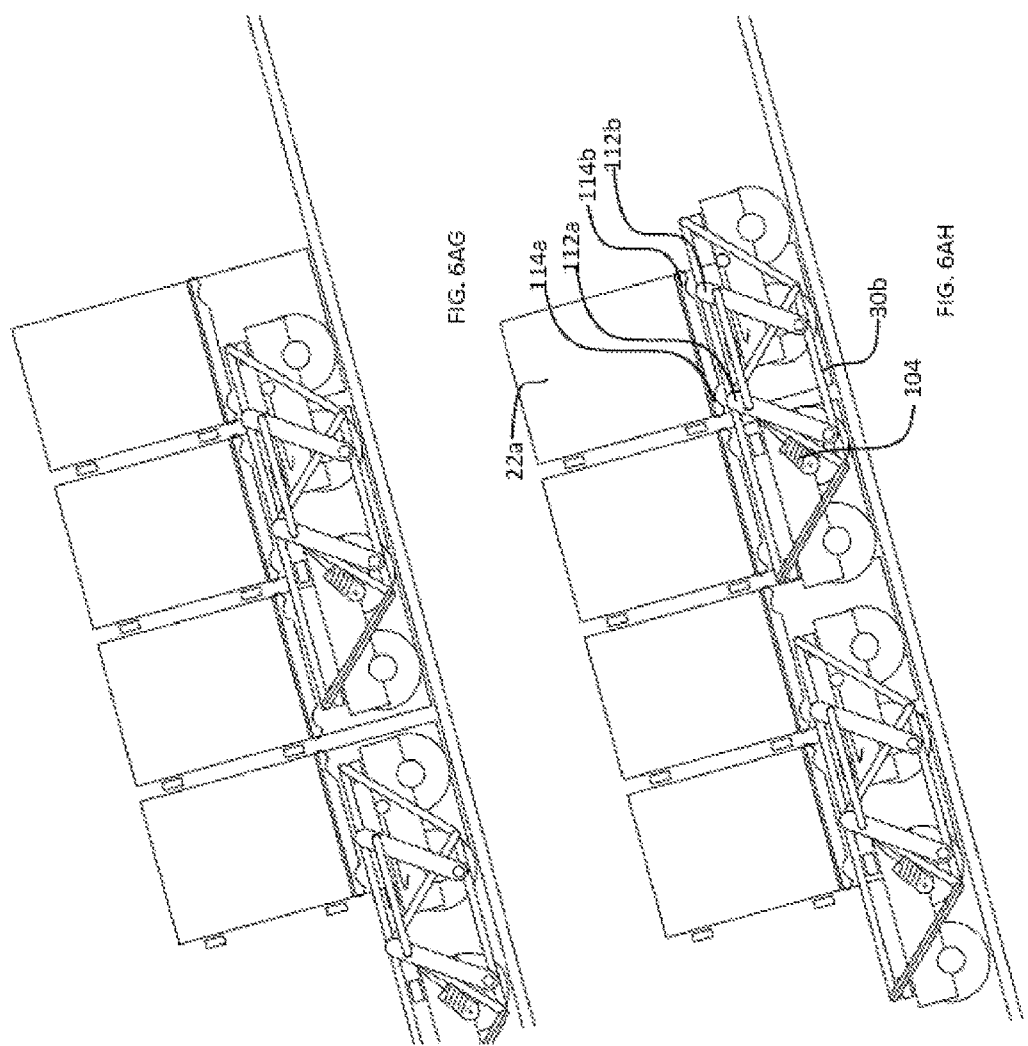

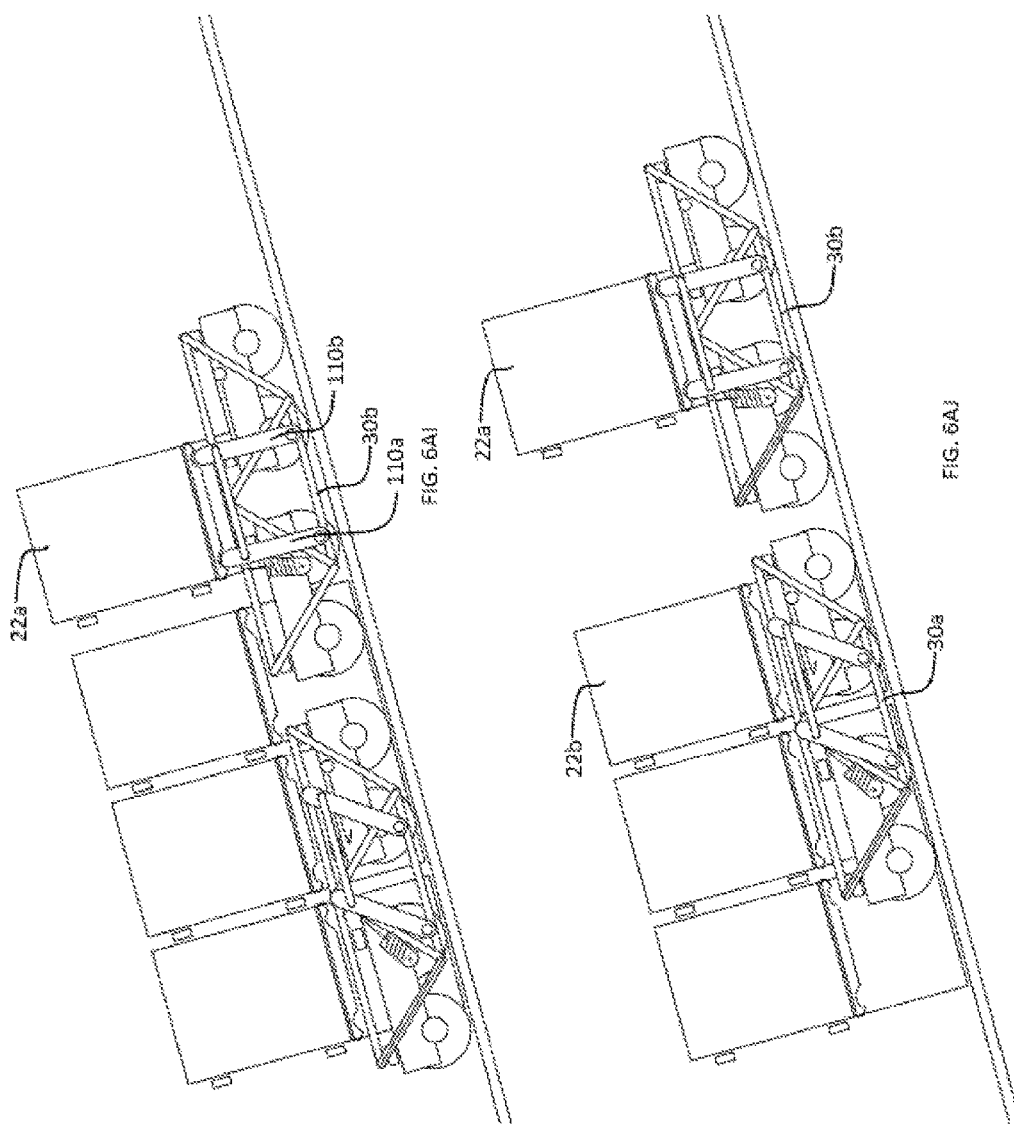

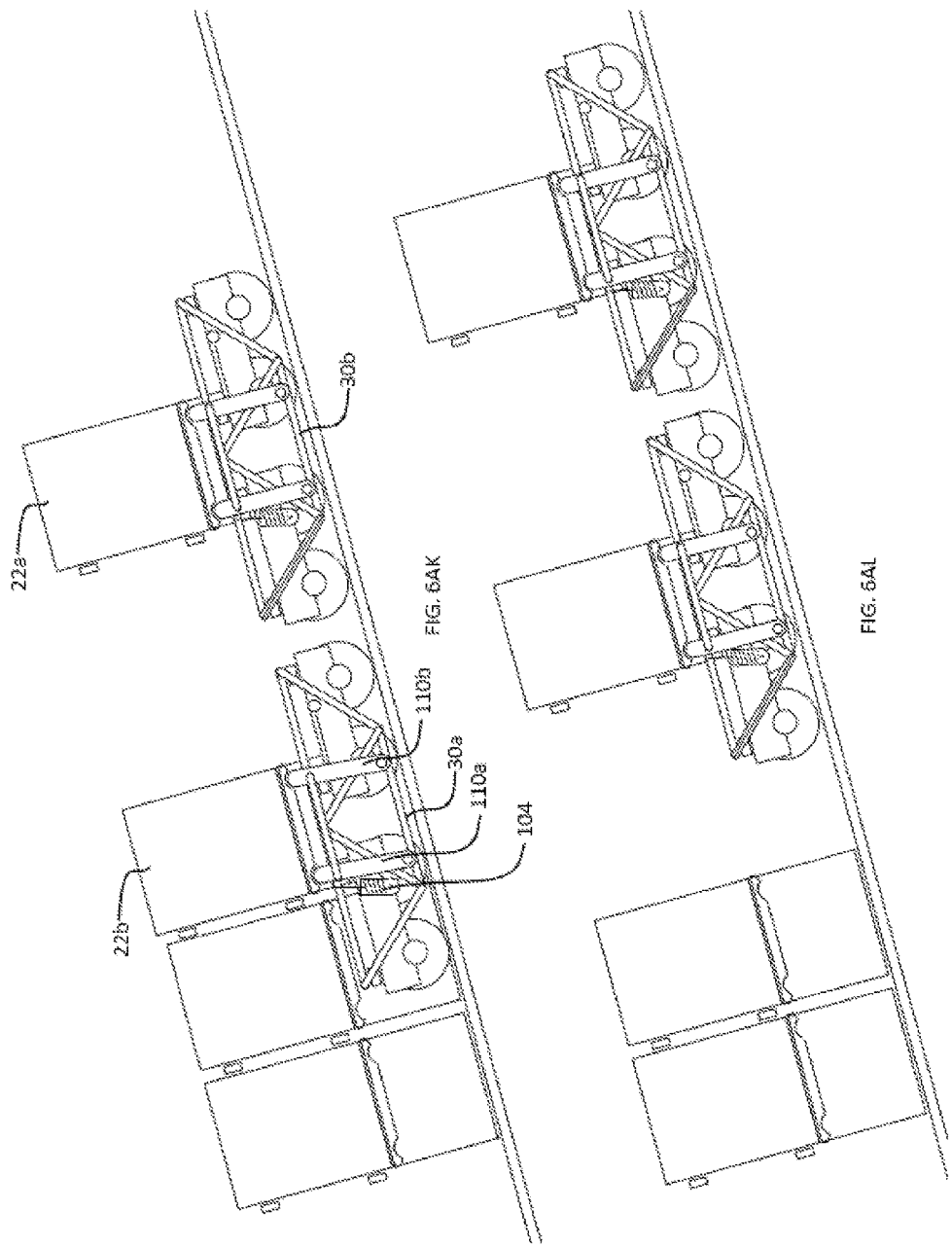

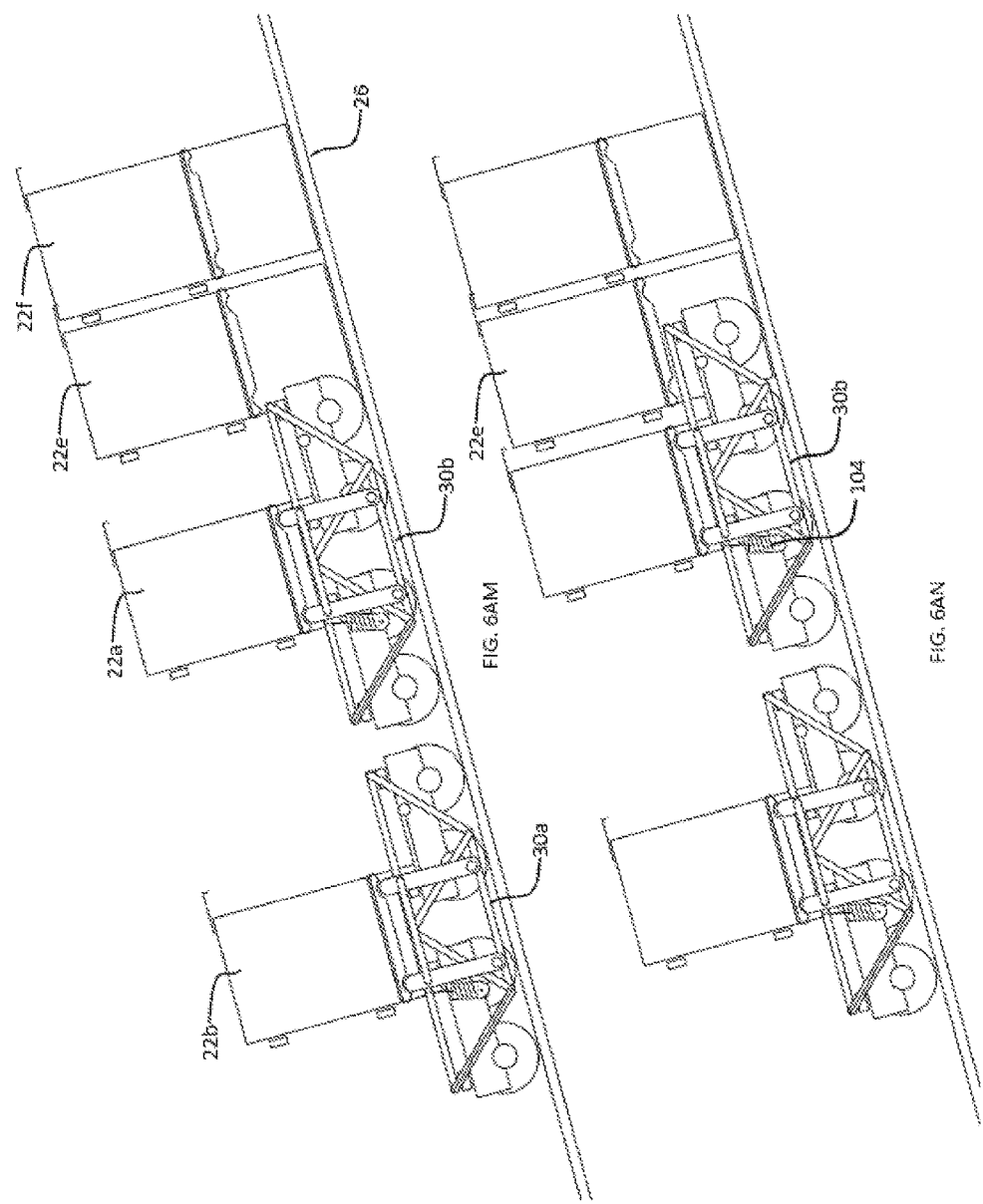

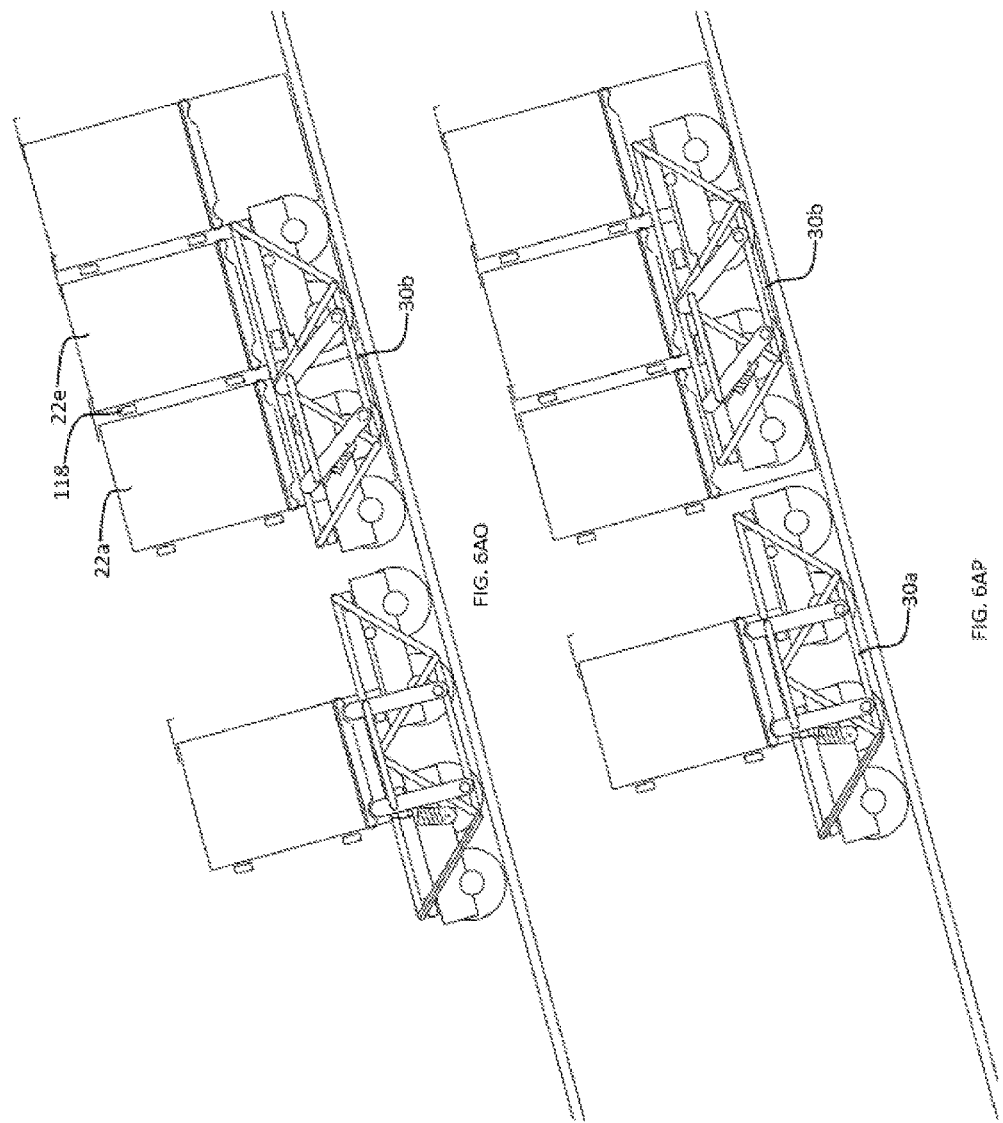

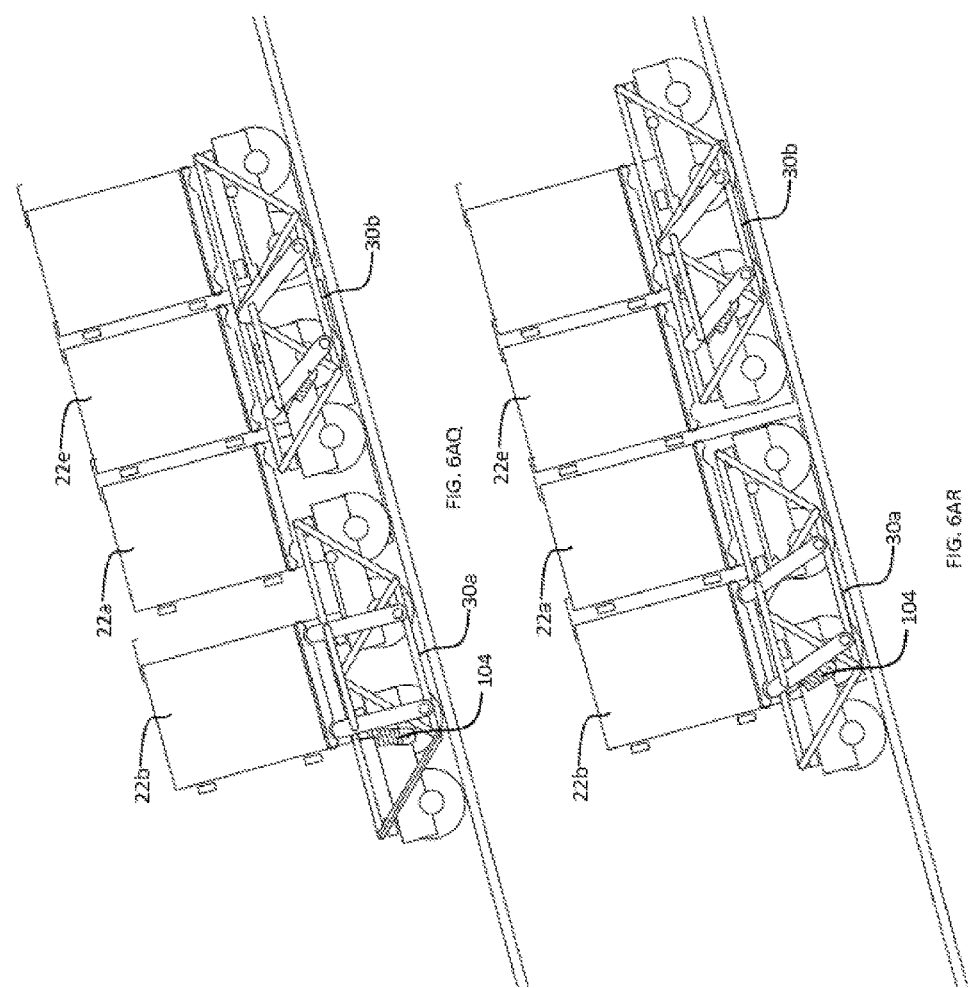

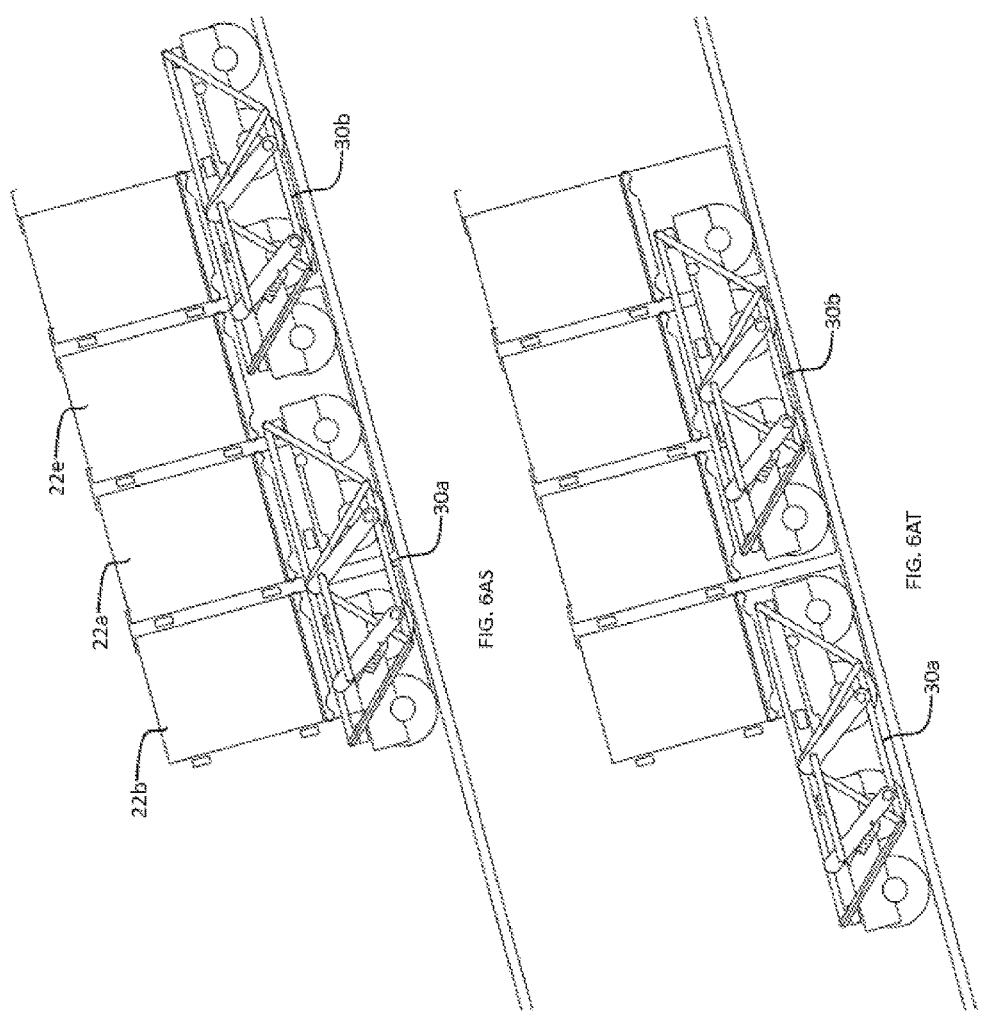

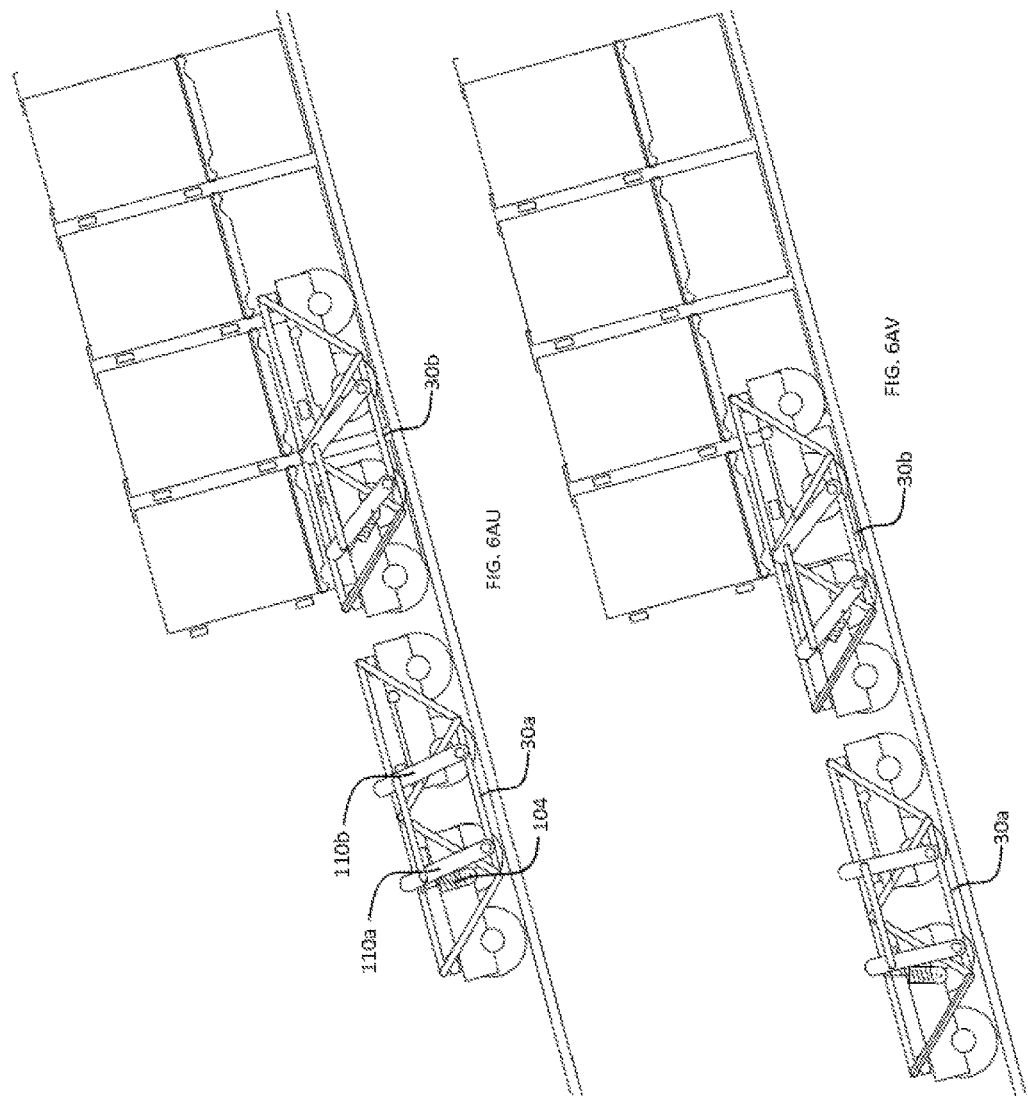

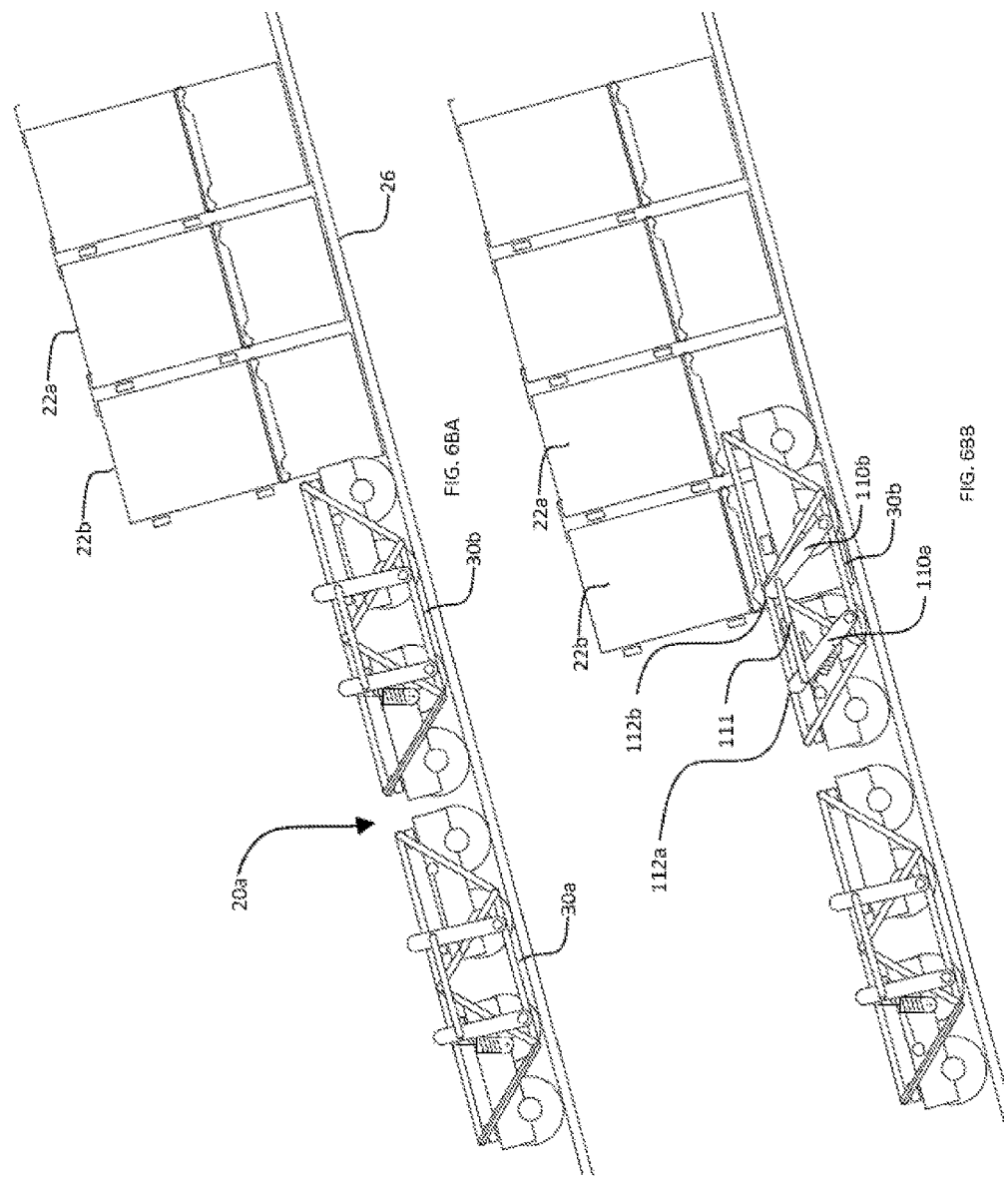

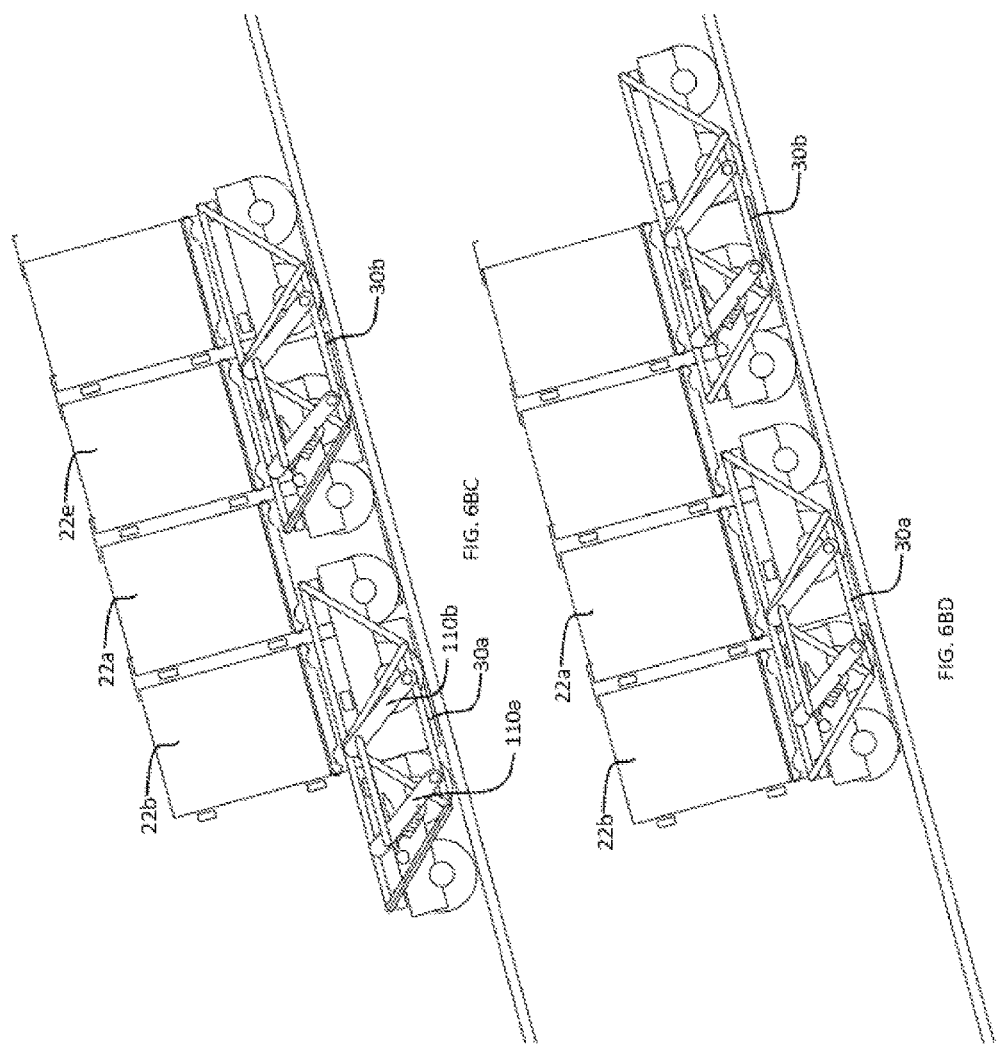

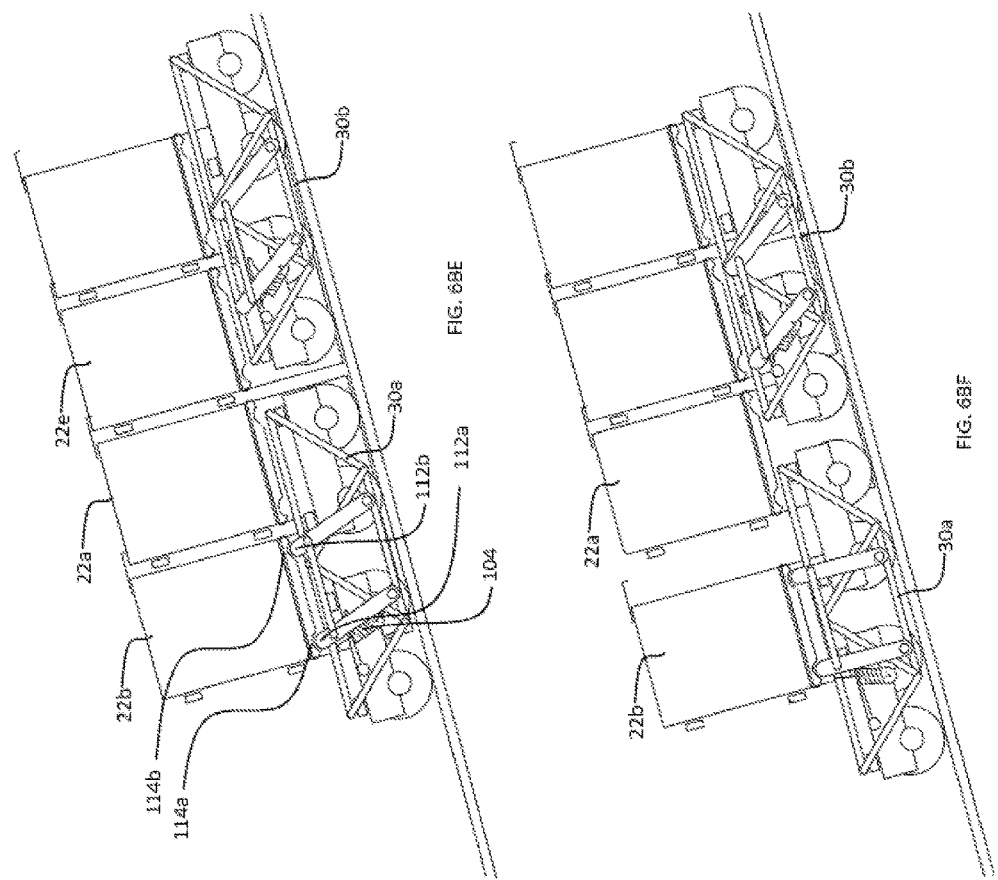

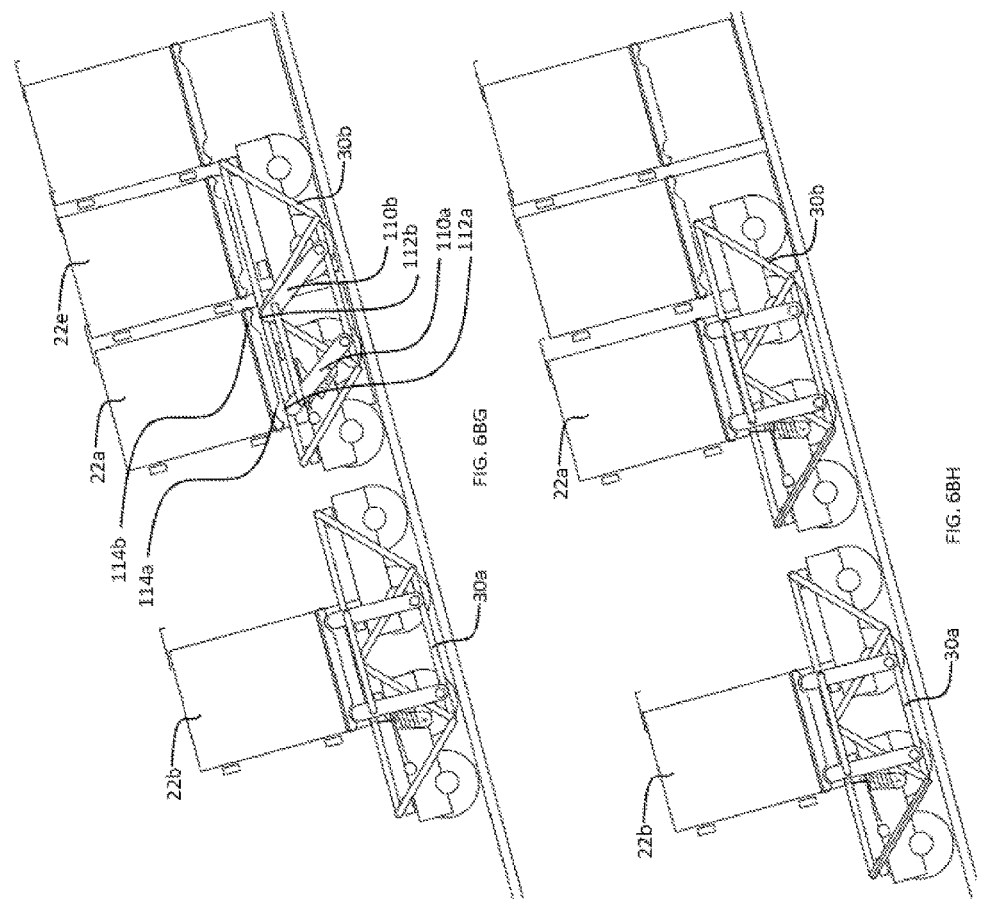

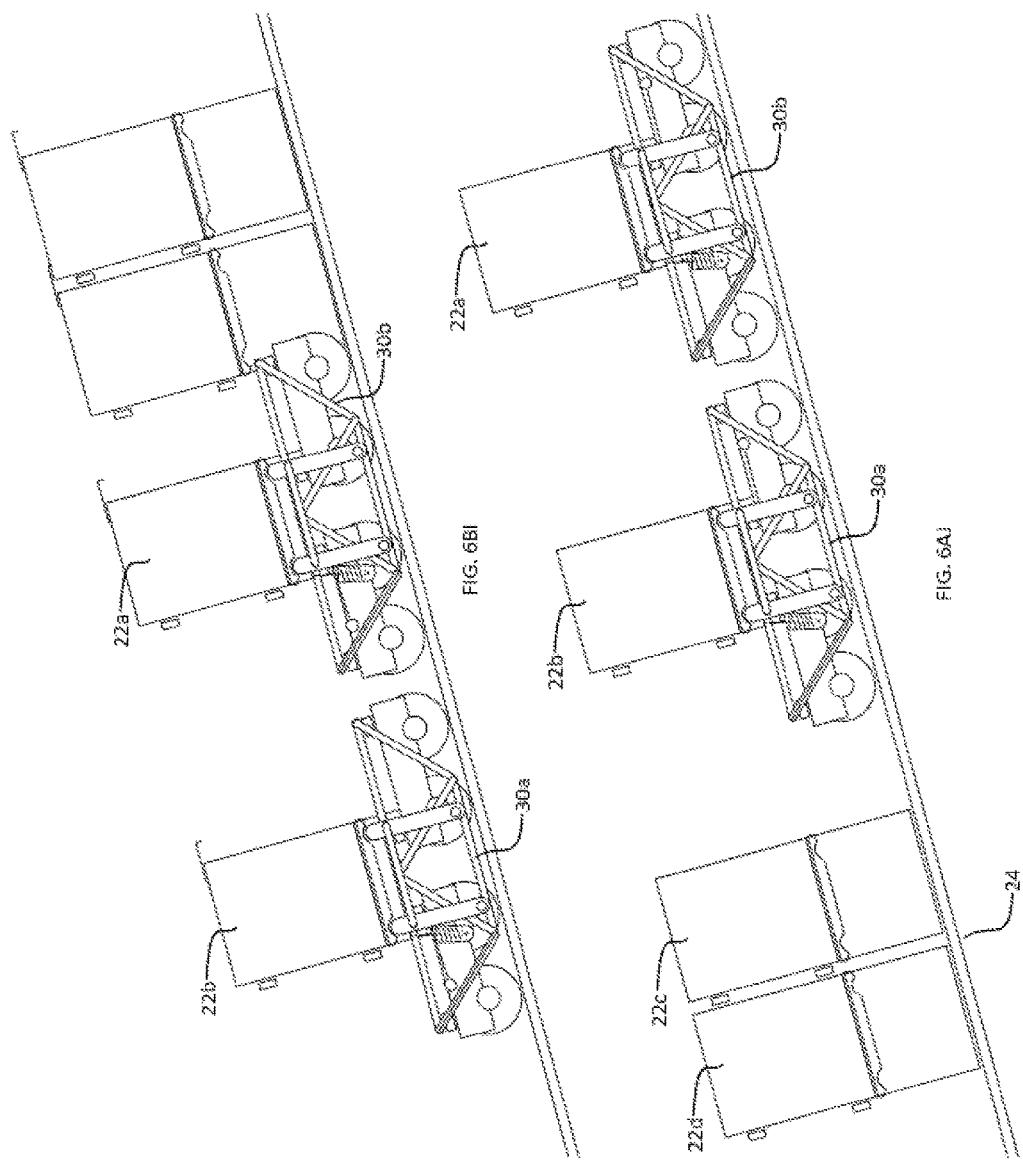

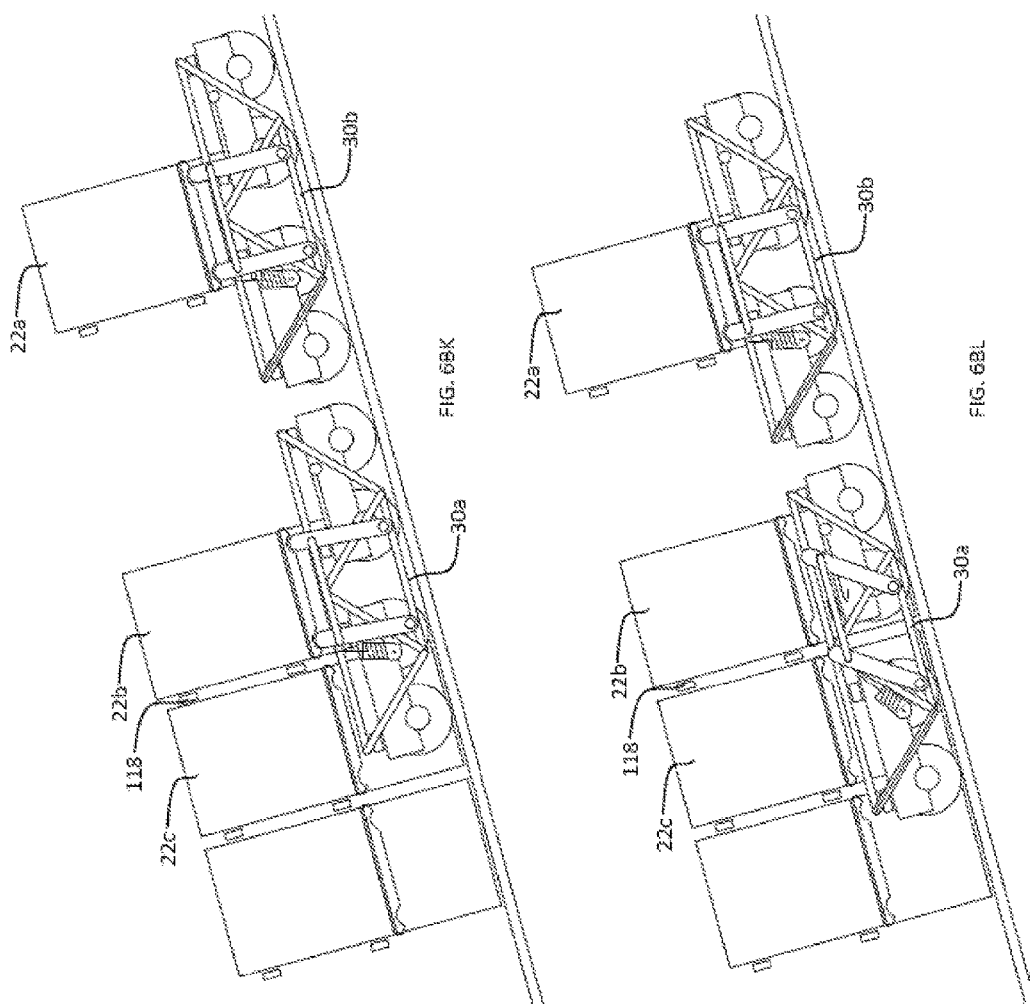

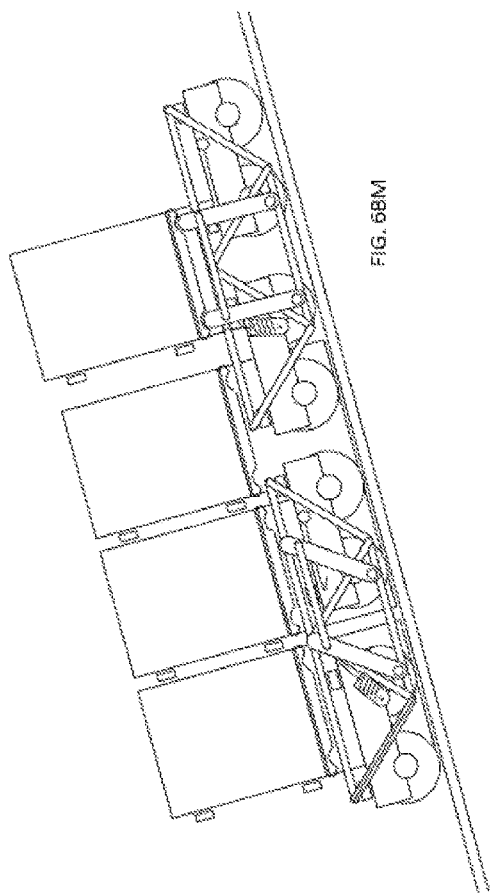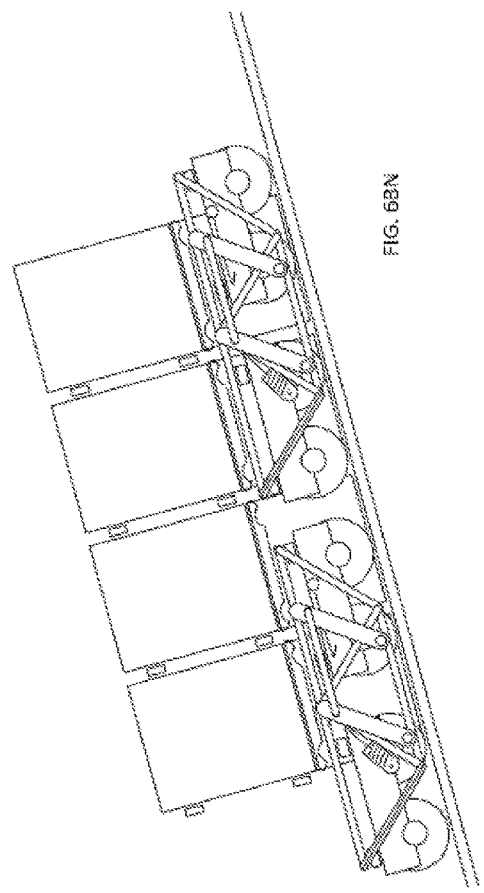

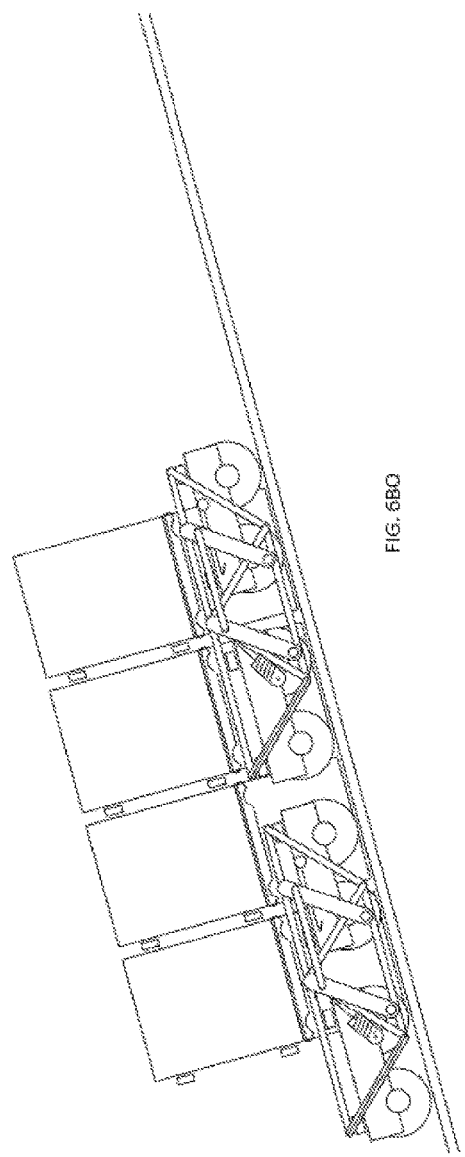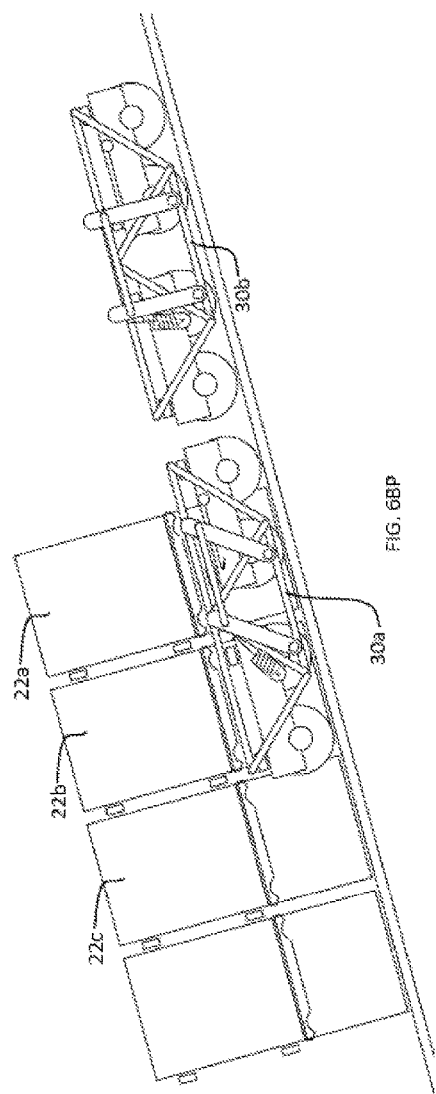

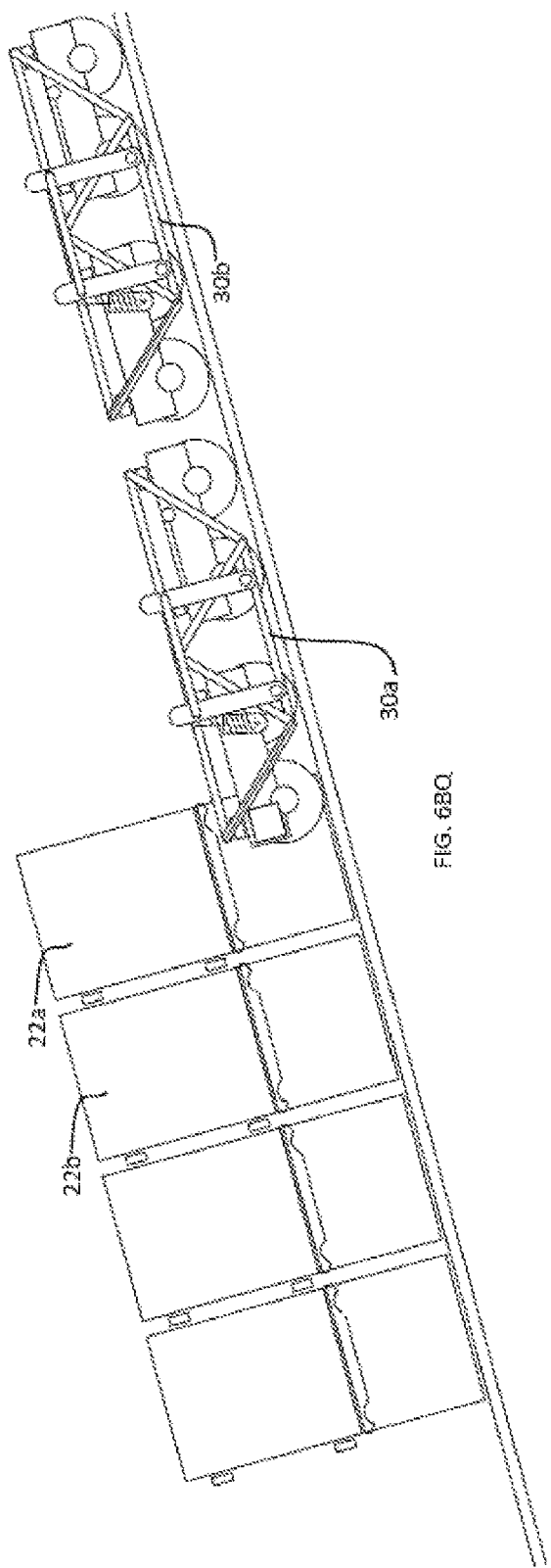

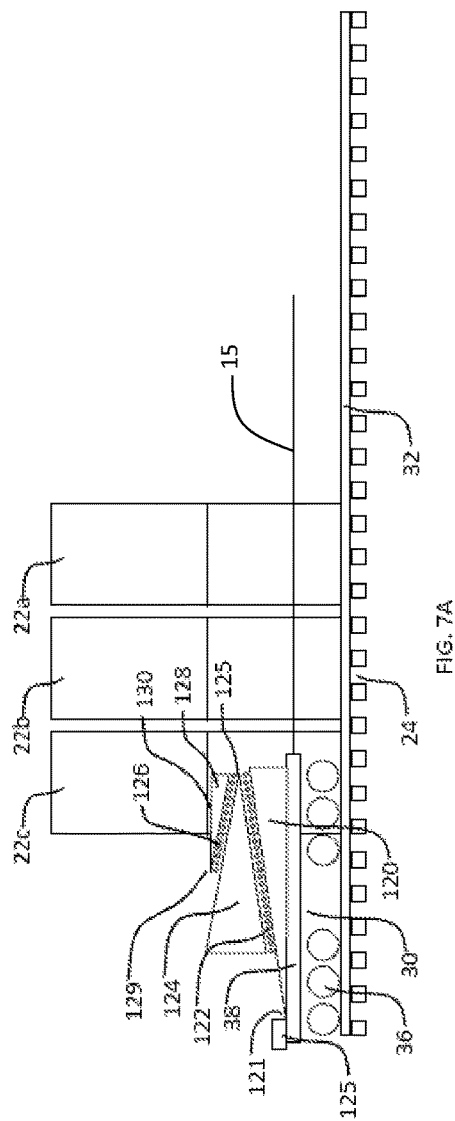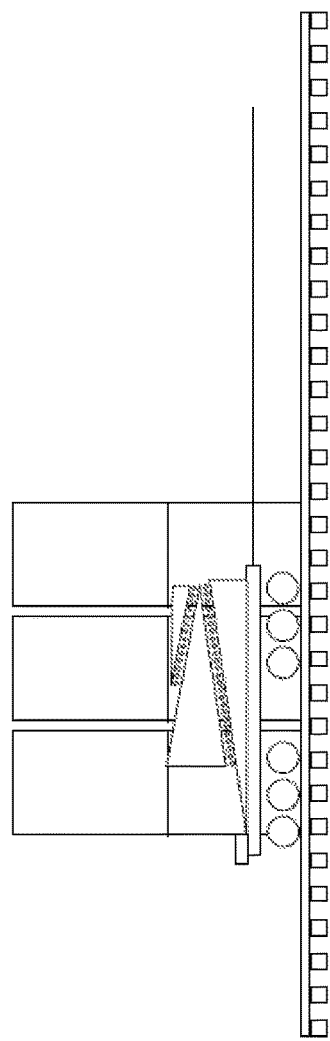

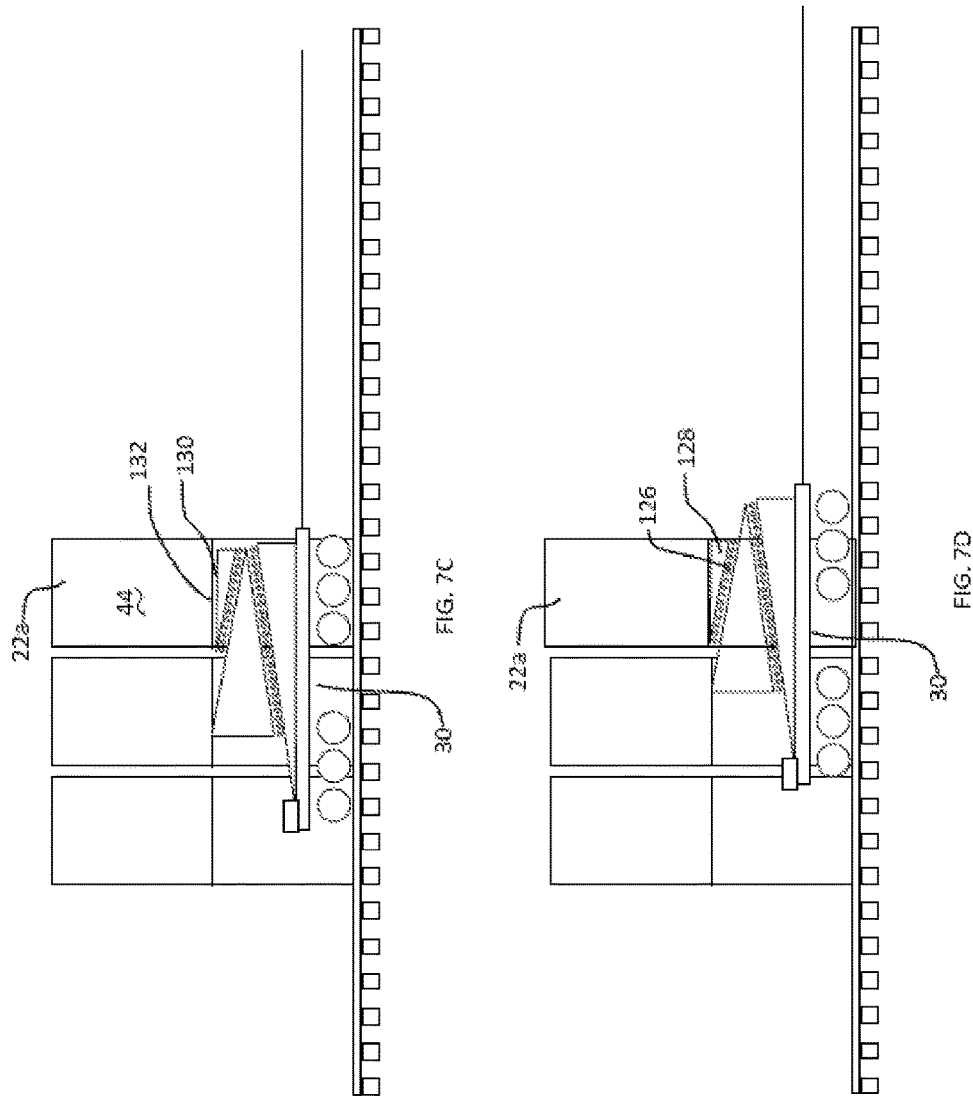

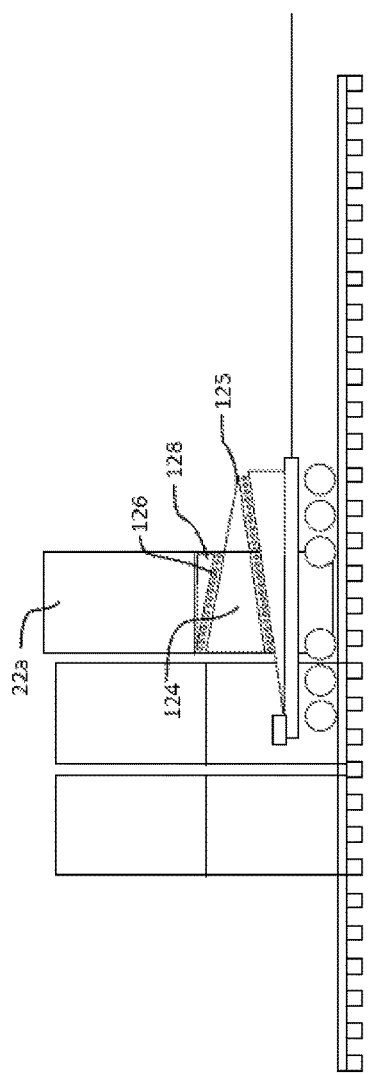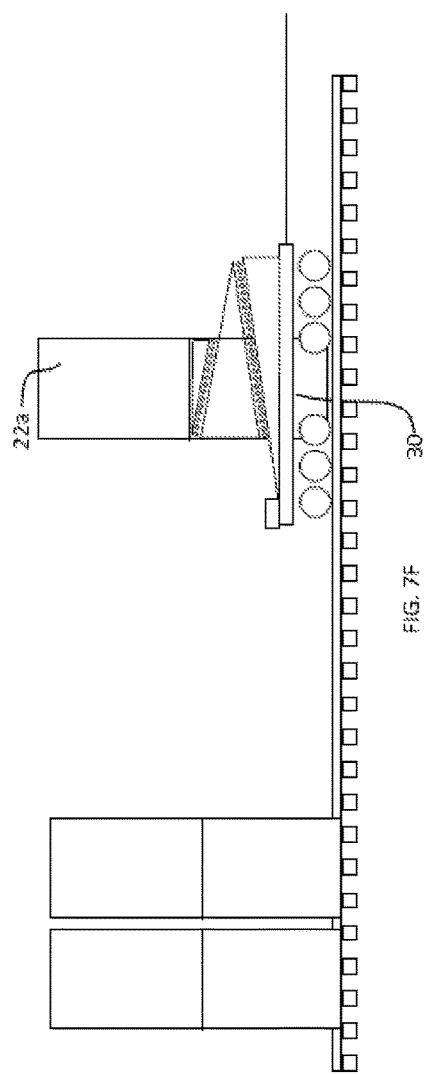

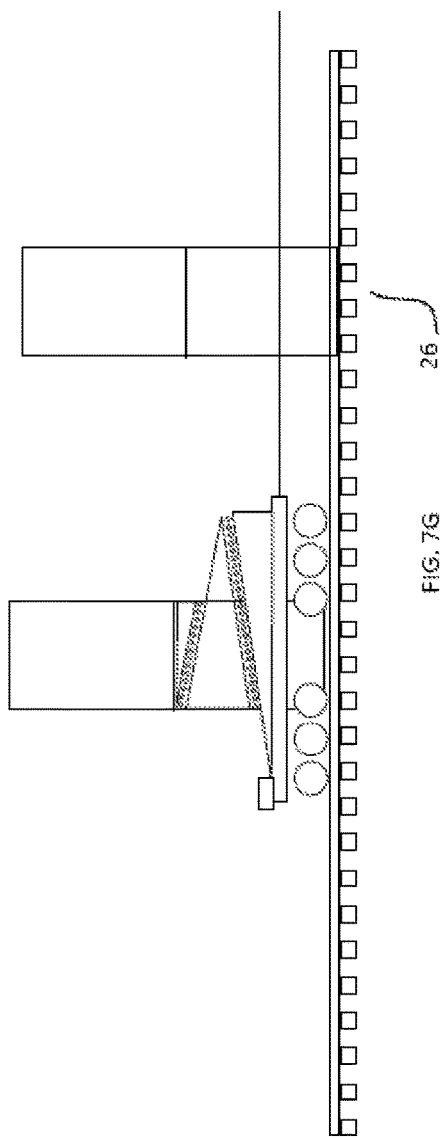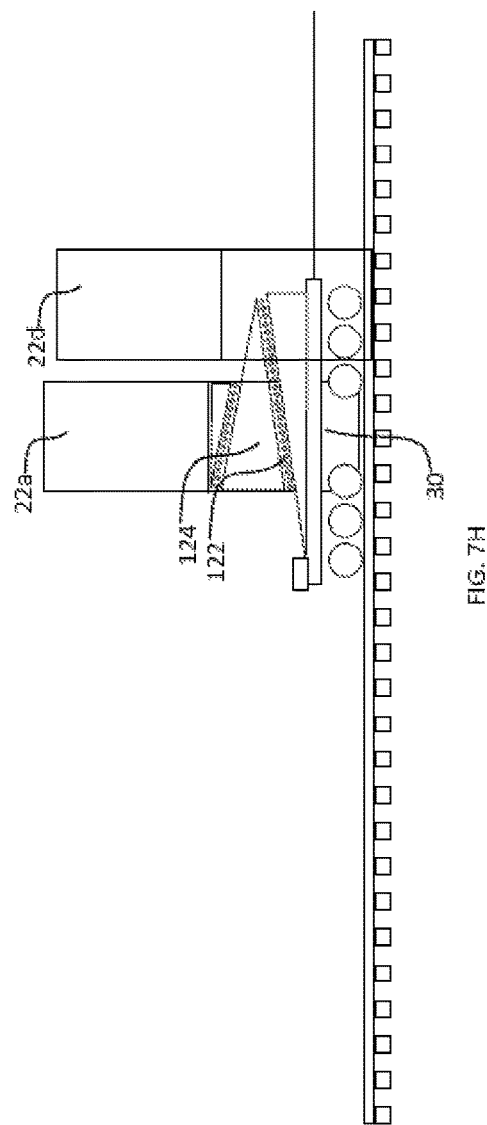

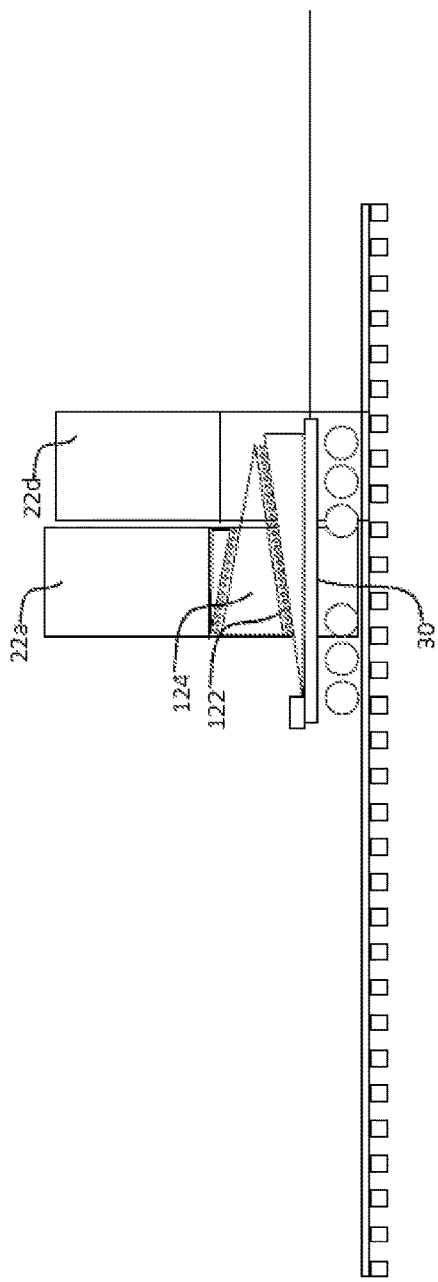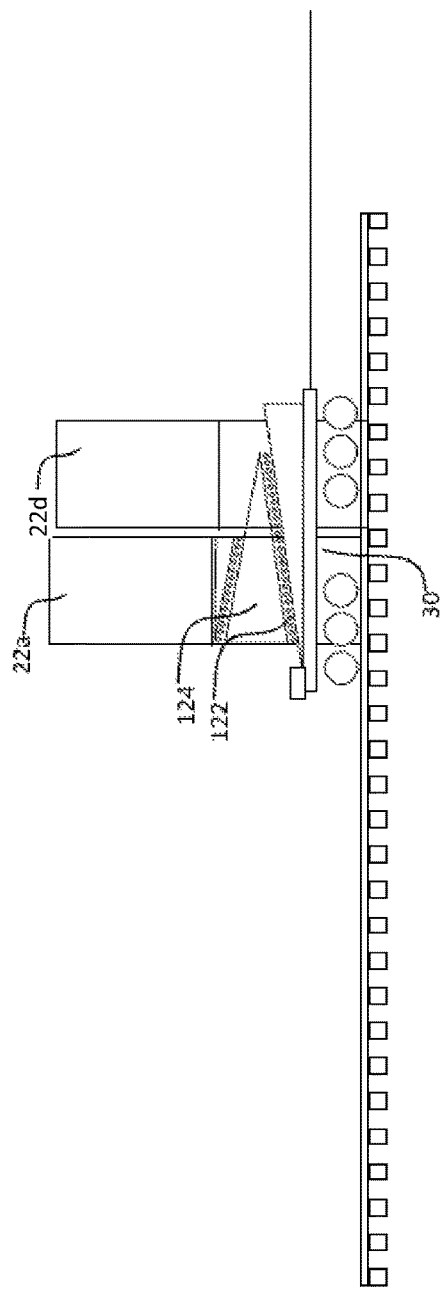

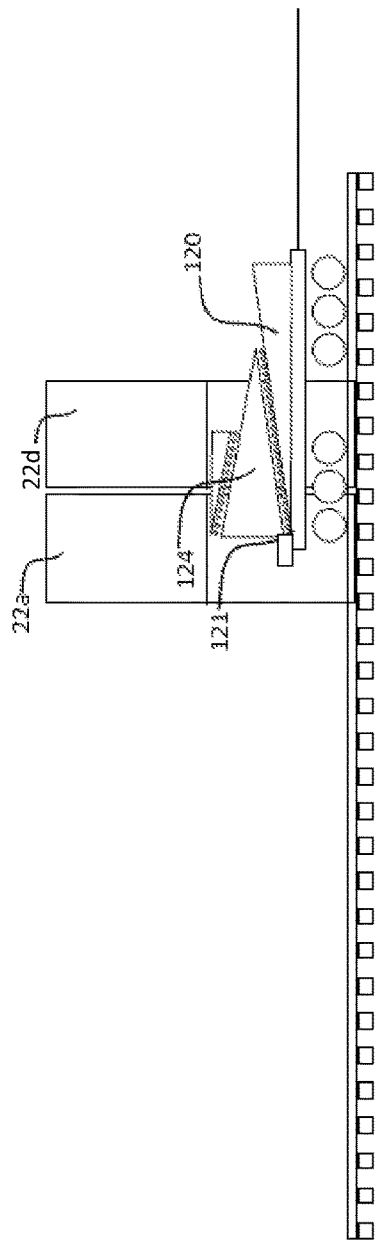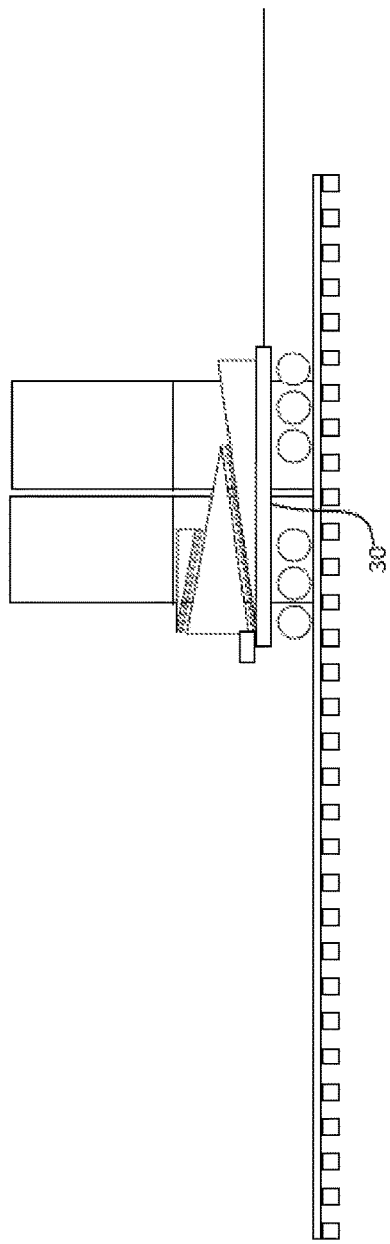

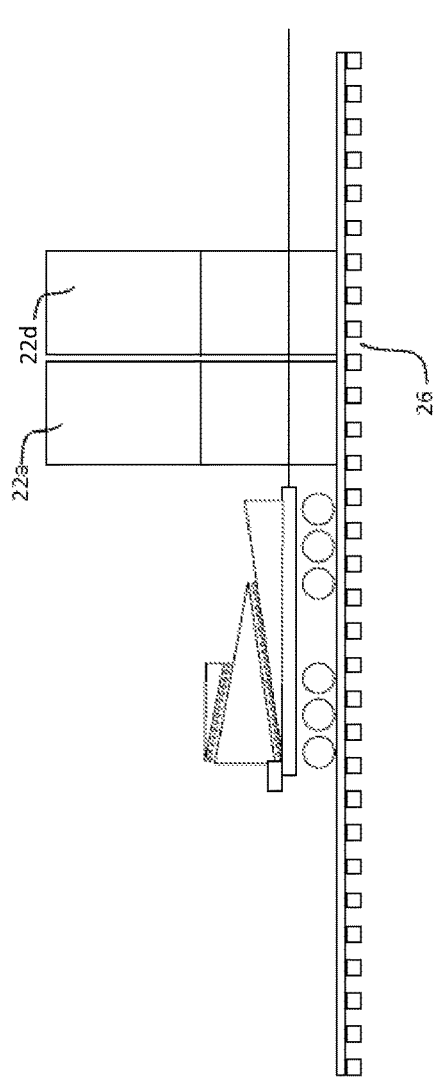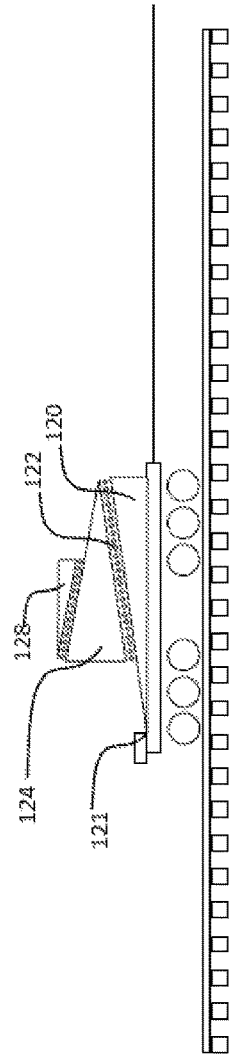

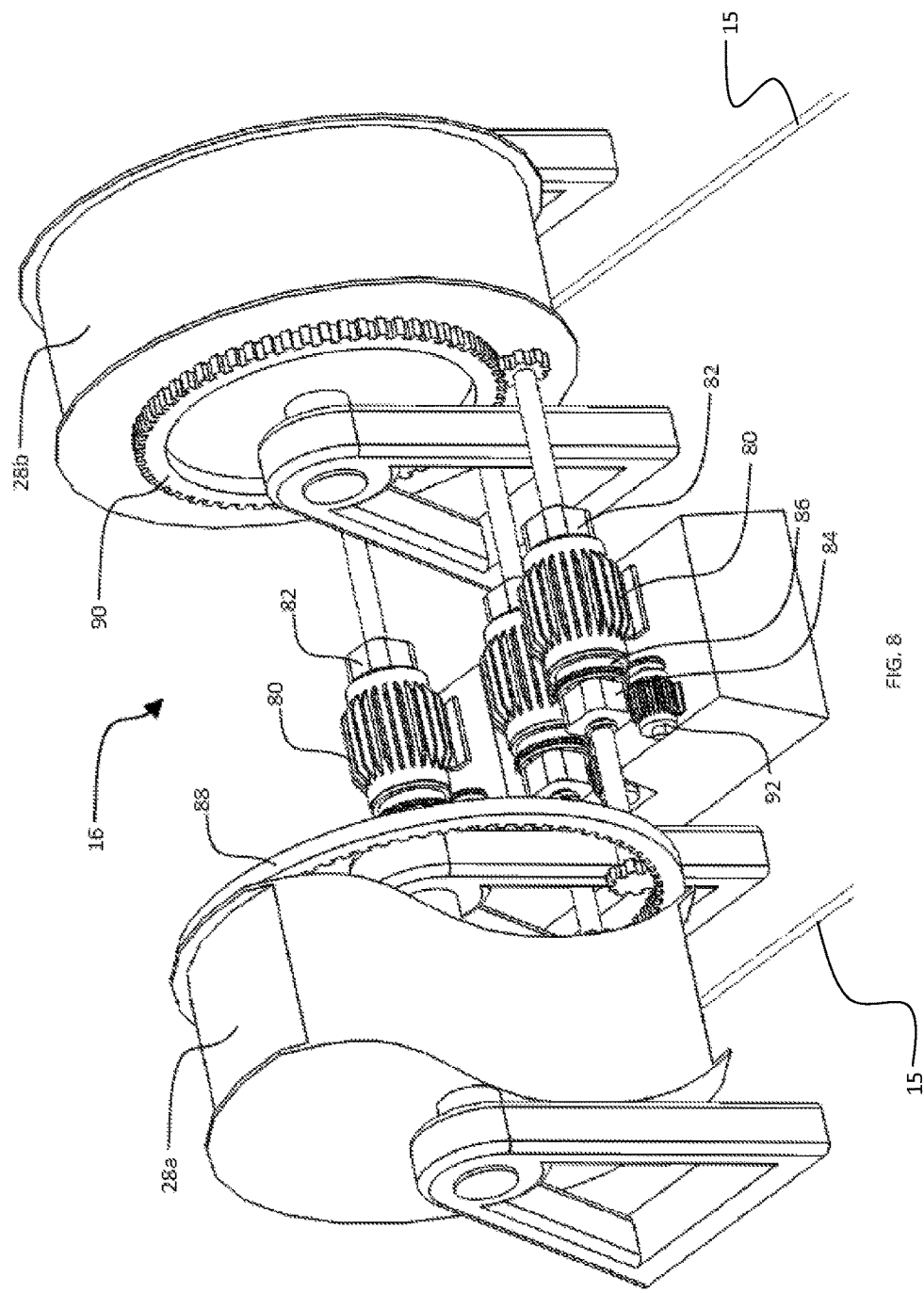

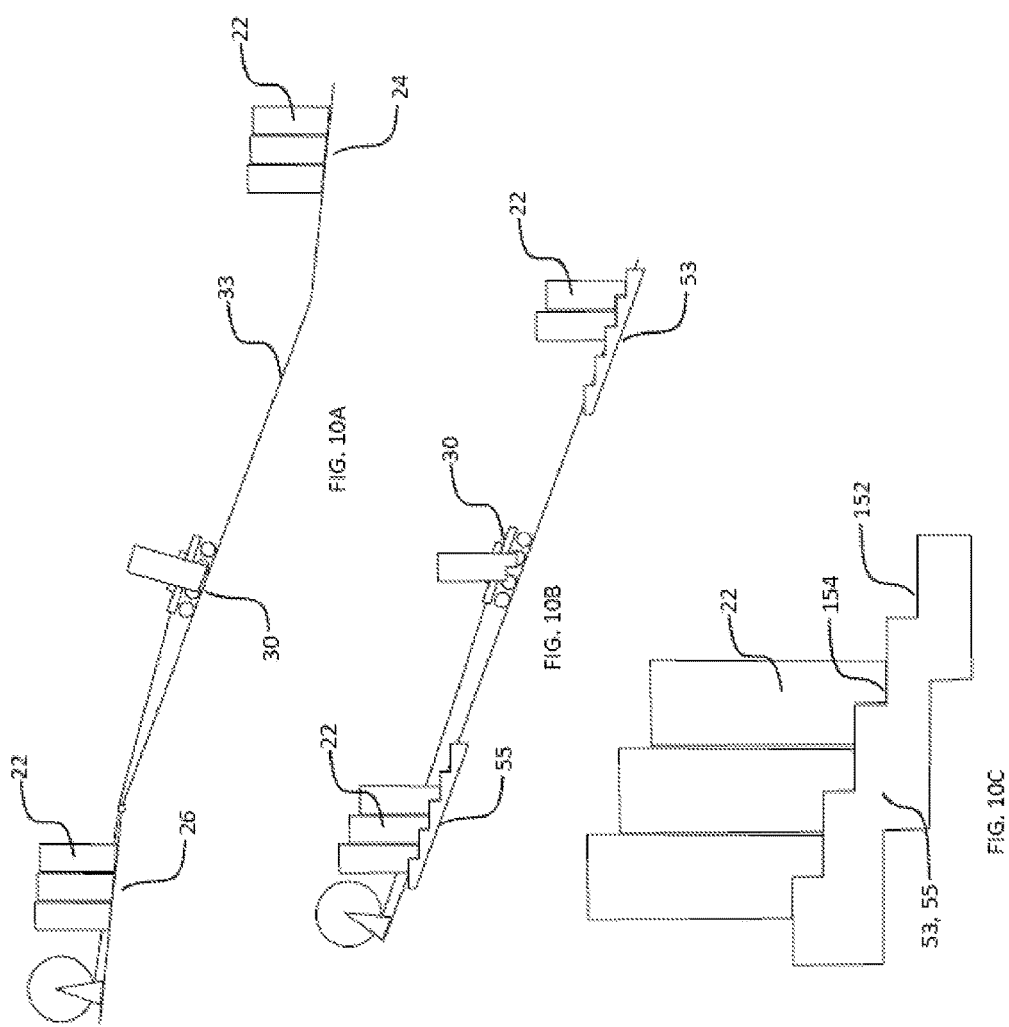

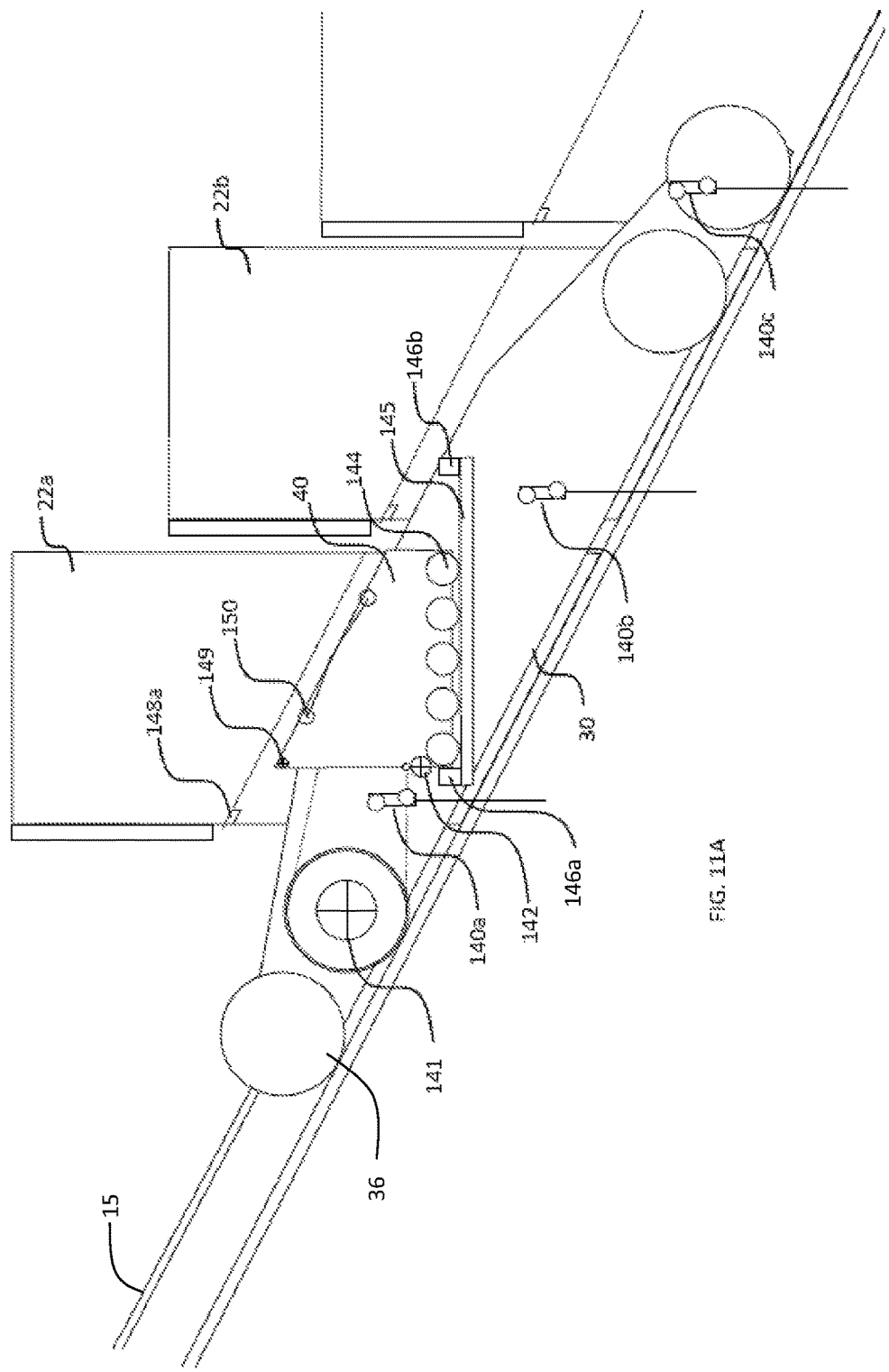

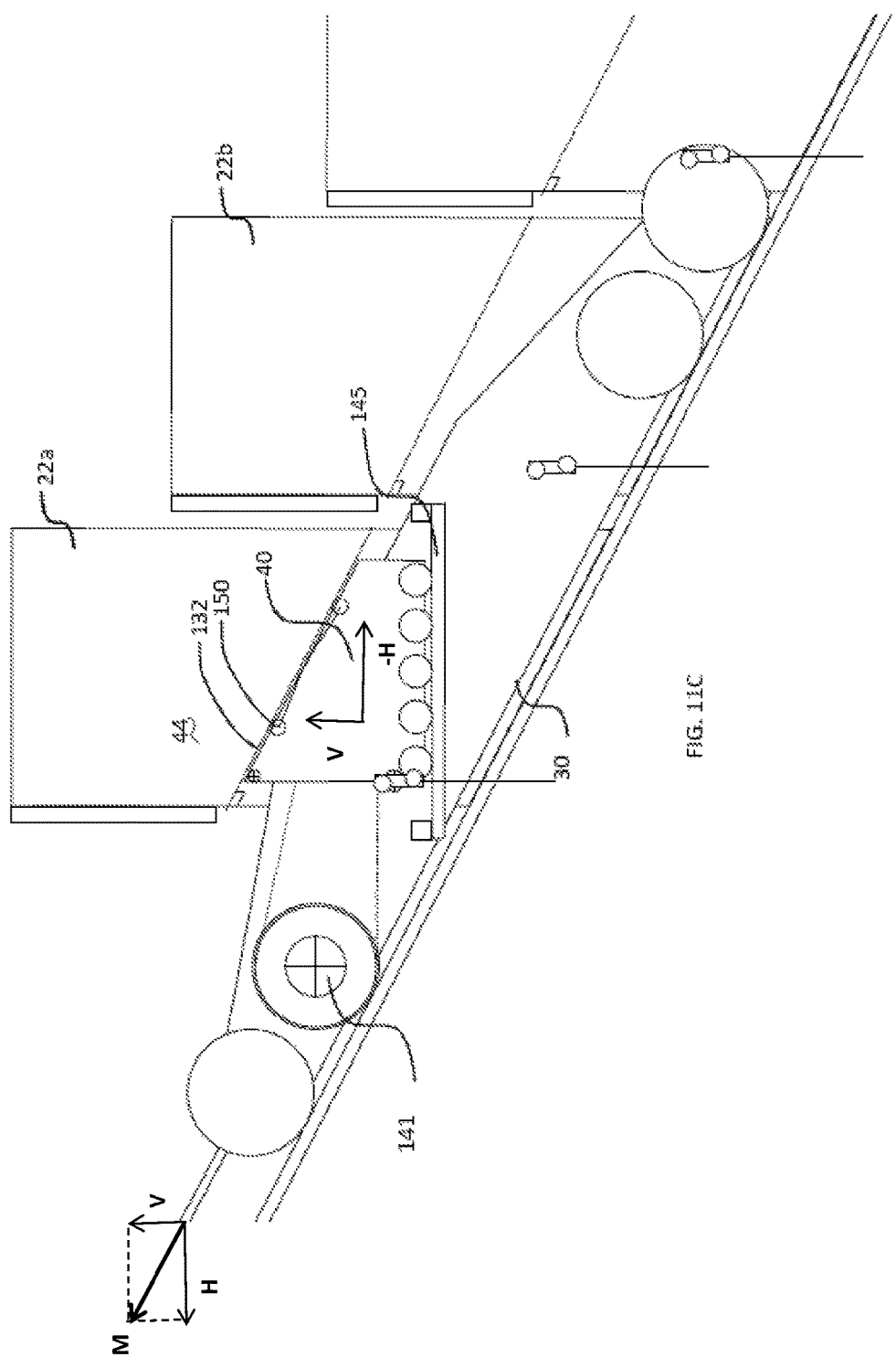

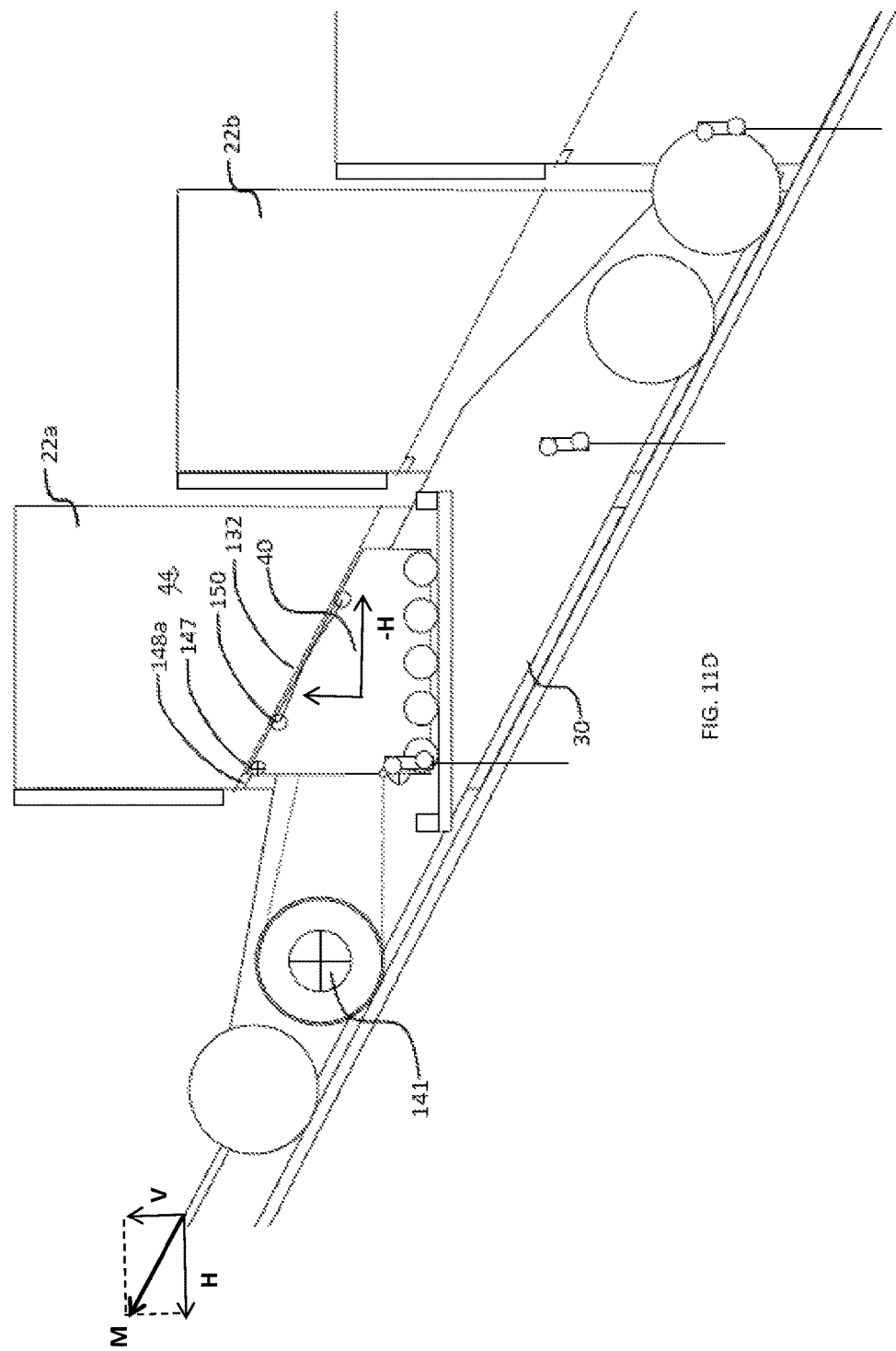

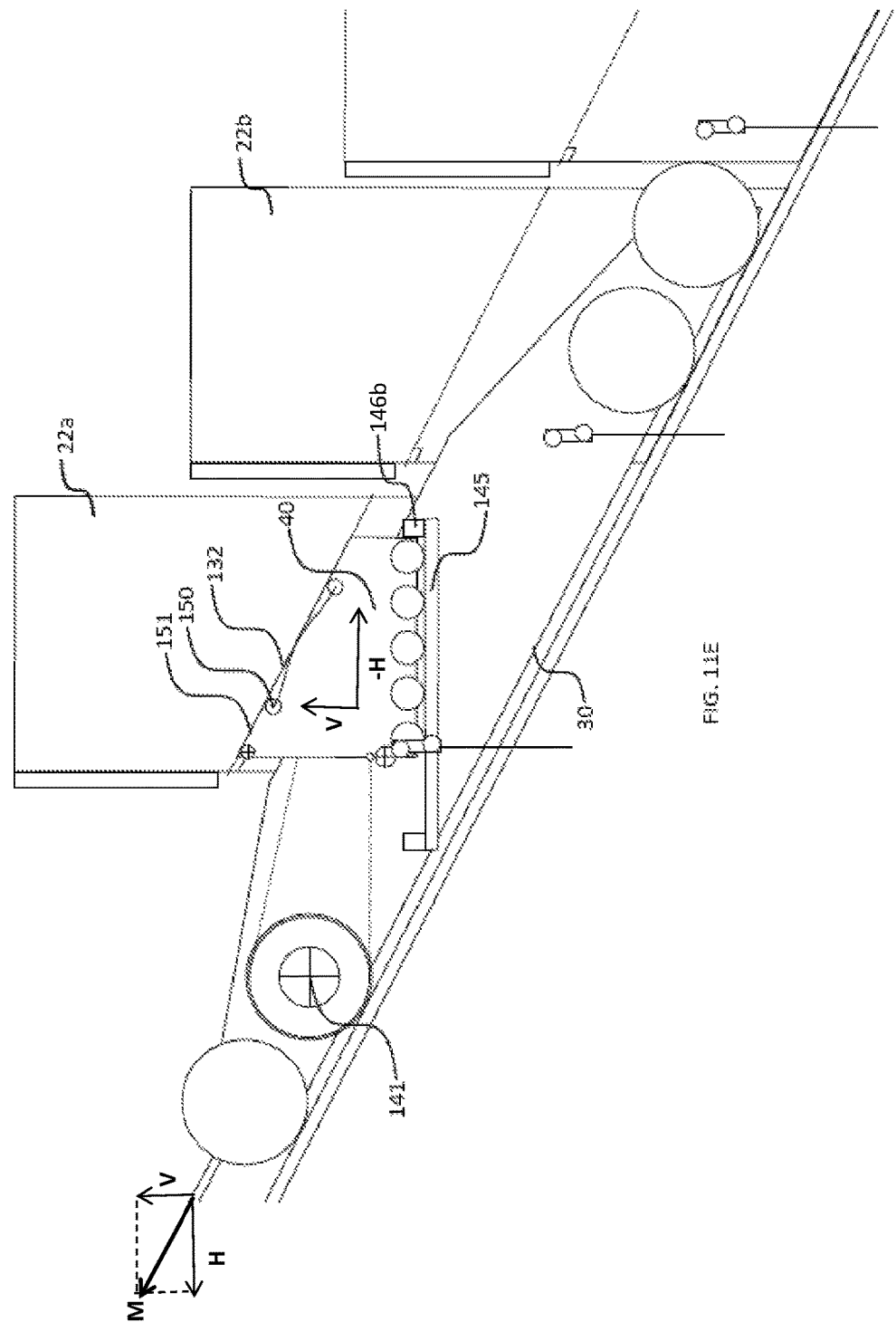

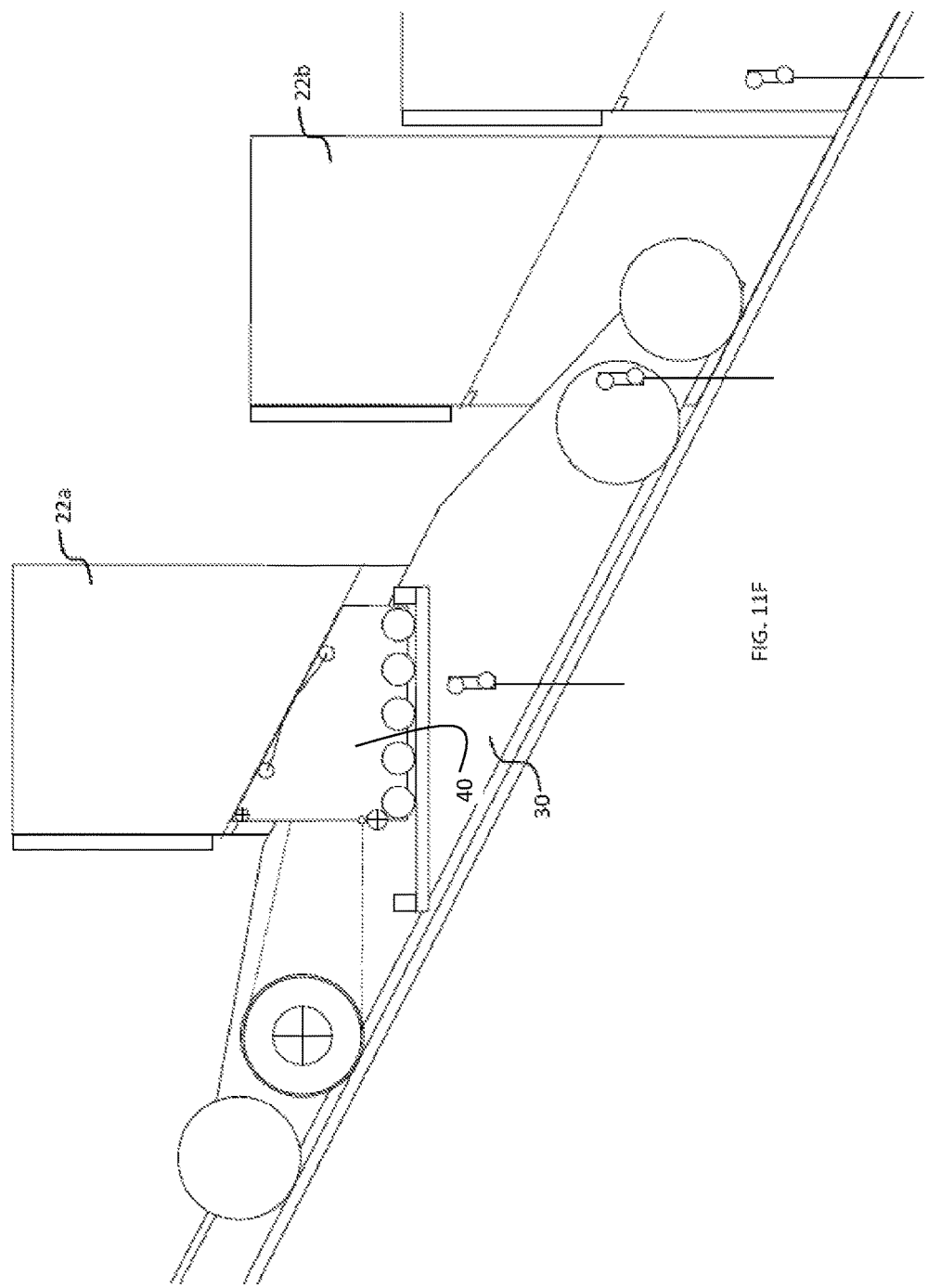

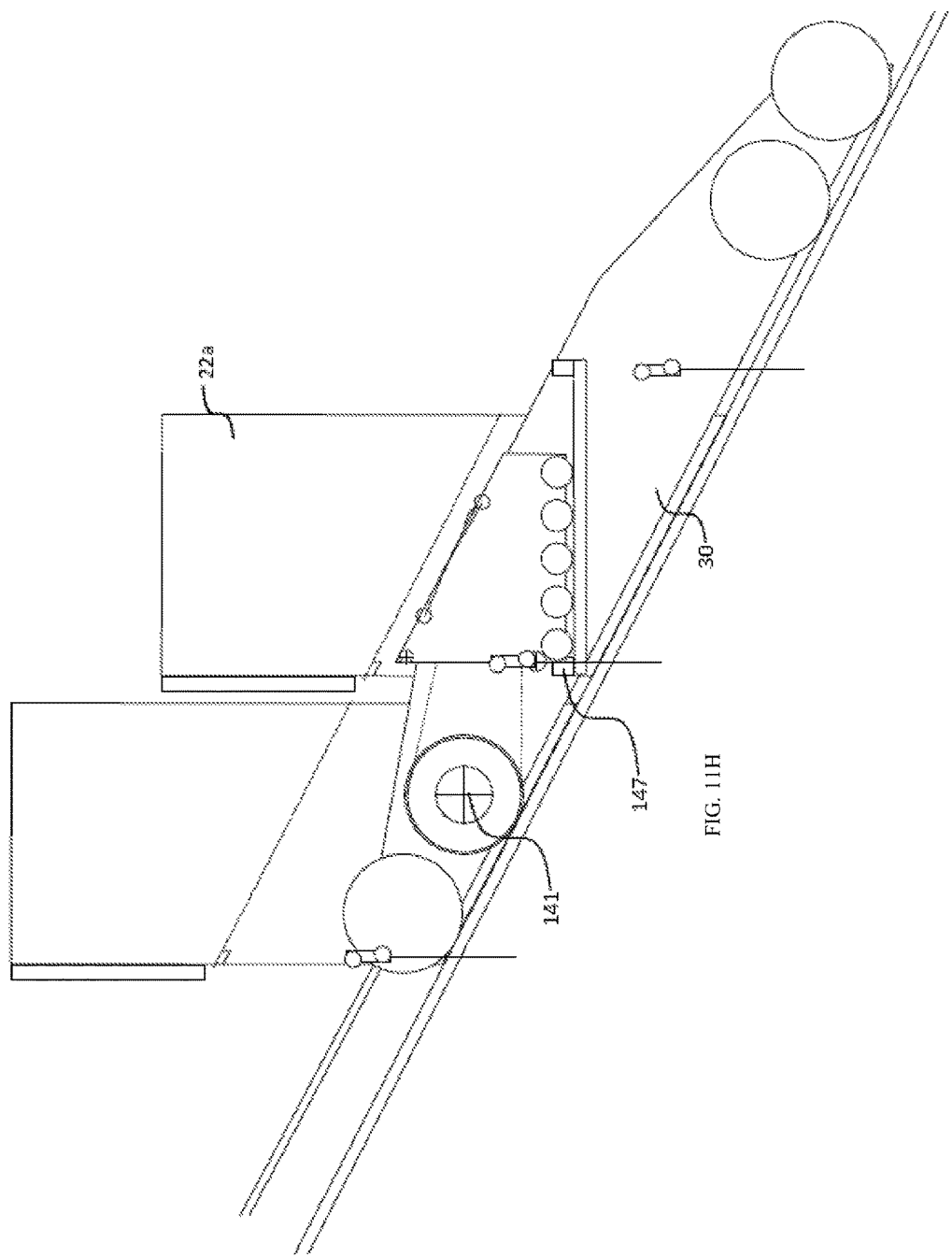

RIDGELINE CABLE DRIVE ELECTRIC ENERGY STORAGE SYSTEM

REFERENCE TO RELATED APPLICATIONS

This application claims priority of U.S. provisional application Ser. No. 62/301,466 having a filing date of Feb. 29, 2016 entitled RIDGELINE CABLE DRIVE ELECTRIC ENERGY STORAGE SYSTEM having a common assignee as the present application, the disclosure of which is incorporated herein by reference.

BACKGROUND

Field

The present invention relates generally to electric power storage and generation. More particularly, the present invention provides a system for gravitational potential energy storage employing electrically driven rail consists carrying off loadable masses between lower and upper storage yards. Potential energy is stored by employing electrical grid power for transport of the masses from the lower to upper storage facility using motor powered winch sets. Potential energy is recovered and returned to the electrical grid by generator operation of the winch set motors during transport of the masses from the upper to lower storage yards. The invention allows for grid load shifting as well the full range of ancillary services including regulation, spin, non-spin, replacement reserves, blackstart, VAR and heavy inertia to the grid.

Related Art

The electric power grid is increasingly complex and the matching of power usage with power generation capabilities is a critical element in maintaining stability in operation. This issue is becoming more complicated with the addition of alternative energy generation sources such as wind power and solar power, which have inherent issues with consistency of power production. The need for utility scale energy storage as a portion of the power supply grid is driven by requirements for daily load shifting and power quality services including frequency regulation, voltage control, spinning reserve, non-spinning reserve and black start. It is presently estimated that requirements in the US will approach 85,000 MW for load shifting and 7,137 MW for power quality while global requirements will approach 450,000 MW for load shifting and 37,828 MW for power quality.

Electrical energy storage may be accomplished using battery technologies, capacitor storage systems, kinetic energy storage systems such as flywheels or potential energy storage systems. Battery technology for Lithium ion batteries, flow batteries and Rechargeable Sodium-Sulfur batteries (NaS) are improving but typically will provide estimated capability only in the range of 10 megawatts or less. Similarly, capacitive storage systems on reasonable scale only provide between 1-10 megawatts of capability. Flywheel storage systems are also typically limited to less than 10 megawatts due to physical size and structural materials constraints.

Conventional gravitational potential energy storage devices consist of mechanical lifting devices raising weights against the force of gravity and Pumped Storage Hydro, a method that stores energy in the form of water pumped uphill against the force of gravity. Mechanical lifting devices are limited in their height to a few hundred feet and therefore require large amounts of mass to store a significant amount of electric energy. This results in a very large cost, making these devices expensive and uneconomical. In Pumped Storage Hydro, water is pumped from a lower elevation reservoir to a higher elevation; the stored water is then released through turbines to convert the stored energy into electricity upon demand. The energy losses are typically greater than 20% of the amount stored and the difficulties in permitting, constructing and operating makes pumped storage hydro difficult to implement. It can take more than a decade to construct such a system.

Rail based energy storage systems have been disclosed for use in utility scale energy storage in U.S. Pat. No. 8,593,012 issued on Nov. 26, 2013, which provide very efficient electric energy storage. However, such systems are designed to operate on steep conventional rail grades with larger storage yards available at each end of the system. In certain geographic areas those steep conventional grade features may not be available.

It is therefore desirable to provide potential energy storage with capability in the range of 10-1,000 megawatts of power with high efficiency and reduced installation and capital investment requirements, which is operable with limited horizontal storage space on steeper than conventional rail inclines.

SUMMARY

The embodiments disclosed herein provide a highly efficient, utility scale energy storage system which incorporates a power controller responsive to a utility grid and at least one module having tracks running from a bottom storage yard to a top storage yard and a winch set having a motor generator which simultaneously drives a first consist and a second consist in opposite directions on the tracks on grade. The first and second consist each incorporate at least one shuttle having a lifting mechanism to engage a mass stored in the bottom storage yard or top storage yard. The module is operable under control of the power controller in a charging mode with the winch set receiving in a motor electrical power from a utility grid to drive a first cycle with the first consist loading a mass in the bottom storage yard and ascending to the upper storage yard and unloading the mass and said second consist descending from the upper storage yard to the lower storage yard empty followed by a reversal of the winch set to drive a second cycle with the first consist descending form the upper storage yard to the lower storage yard empty and the second consist loading a mass in the bottom storage yard and ascending to the upper storage yard and unloading the mass thereby storing excess electrical energy available on the utility grid. The module is operable under control of the power controller in a generating mode with the winch set motor reversed to generate electrical power to the utility grid in a third cycle with the first consist loading a mass in the upper storage yard and descending to the lower storage yard and unloading the mass and said second consist ascending from the lower storage yard to the upper storage yard empty followed by a reversal of the winch set to generate in a fourth cycle with the first consist ascending from the lower storage yard to the upper storage yard empty and the second consist loading a mass in the upper storage yard and descending to the lower storage yard and unloading the mass thereby providing electrical energy to the utility grid.

BRIEF DESCRIPTION OF THE DRAWINGS

FIG. 2 is a detailed perspective view of operating elements of the first exemplary embodiment as disclosed in FIG. 1;

FIG. 3 is a perspective overview of a second embodiment of the ridgeline cable drive electric energy storage system with bypass tracks;

FIG. 5B is an end view of the track construction configuration of FIG. 5A

FIG. 5C is an end view of an alternative track construction configuration;

FIG. 5D is an exemplary configuration for a track support system with a concrete mass for a top anchoring of the track or track rail;

FIG. 5E is an exemplary configuration for a tie system used on conjunction with a track support as shown in FIG. 5D with lateral positioning support but longitudinal freedom for rail thermal expansion and contraction;

FIG. 5F is a detailed view of the rail engagement portion of the tie system of FIG. FIG. 5E;

FIG. 5G is a detailed view of a vertical adjustment wedge for use with the tie system of FIG. 5E;

FIGS. 6BA-BQ show a progression of shuttle positions and configurations for engagement of masses in the upper storage yard and disengagement of masses in the lower storage yard during system generation;

FIGS. 7A-7N show a progression of shuttle positions and configurations for engagement and disengagement of masses with a second exemplary mass engagement mechanism;

FIG. 8 is a detailed representation of the winch drive elements;

FIG. 10A is a representation of a mass storage configuration for storage yards with reduced grade;

FIG. 10B is a representation of mass storage configurations for storage yards on a common grade with the module track mainline;

FIG. 10C is a detailed representation of a method that allows for the standing of masses on a steep grade that prevents the masses from sliding down hill and minimizes the clearance height the mass must be raised to clear the mass foundation; and, FIGS. 11A-11I show a progression of shuttle positions and configurations for engagement and disengagement of masses during system generation with a third exemplary mass engagement mechanism.

DETAILED DESCRIPTION

Figure 1:
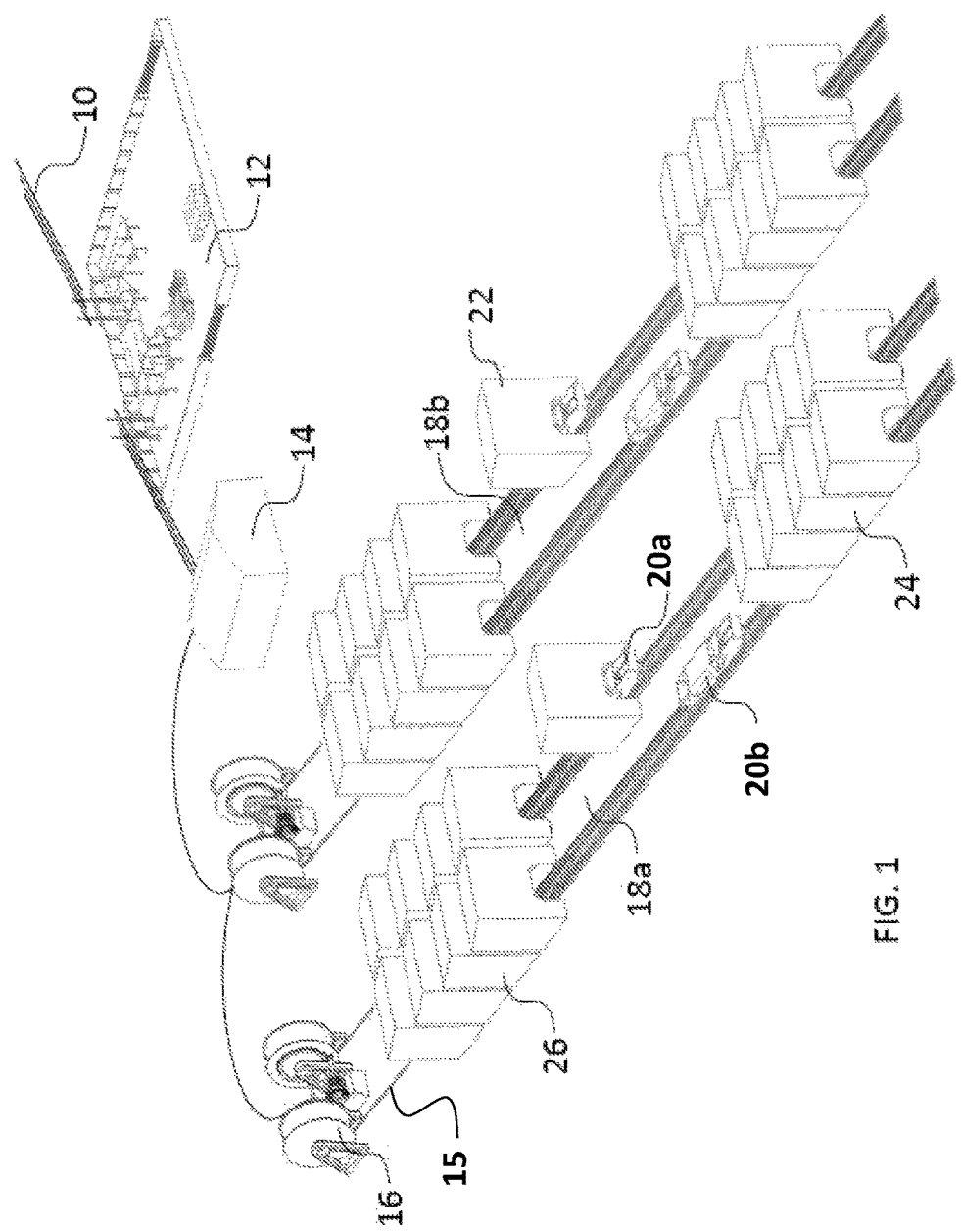
FIG. 1 is a perspective overview of an embodiment of the Ridgeline cable drive electric energy storage system.

A exemplary embodiment of the ridgeline cable drive electric energy storage system is made up of a number of individual modules. In this manner, the system can effectively be varied in size from 10 to several hundred-megawatt power and the output can be finitely controlled to perform ancillary services. Referring to the drawings, a typical system layout is shown in FIG. 1. A transmission line 10 provides connection to a utility grid to receive excess power as input to the system storage or transmit power from the system on demand from the utility. An electric substation 12 connects the transmission line 10 to a power control system 14 and winch sets 16, which will be described in greater detail subsequently. The power control system 14 is responsive to the utility grid to store excess electrical power and to generate electrical power upon demand employing the system elements described herein. A number of funicular track sets carry consists 20a, 20b comprised of one or more shuttles (described in greater detail subsequently) which carry masses 22 between a lower storage yard 24 and an upper storage yard 26. Each track set provides a cable drive gravity power module 18a, 18b. Two modules are provided for the exemplary embodiment in FIG. 1. The consists 20 are connected to the winch sets 16 which simultaneously drive one consist upgrade and one consist downgrade with cables 15. For storage of electric power when the grid has an excess, referred to herein as charging, the masses are loaded by the consists at the lower storage yard 24 and power from the grid is controlled by the control system 14 to be used by motors in the winch sets to move the consists to the upper storage yard where the masses are unloaded thereby storing the excess electrical power as potential energy in the elevated masses. The paired track sets allow a first cycle with a loaded consist to move upgrade to be unloaded while an empty consist moves downgrade to be loaded followed by reversal of the winch sets with a second cycle with the newly loaded consist moving upgrade and the unloaded consist moving downgrade. The process is therefore substantially continuous. Use of multiple track sets multiplies the power storage and generation capability and by relative staggering of the operational positioning of the consists along the track length for the various track sets provides greater continuity of charging or generation. When electricity generation is required, the process is reversed with the motors in the winch sets operating as generators converting the potential energy of the masses raised elevation back into electricity by regeneratively braking the consists motion during mass transport from the upper storage yard back to the lower storage yard with the generated electricity routed by the control system 14 to the power grid 10. Use of multiple modules increases the power generation capability of the energy storage facility and by relative staggering of the operational positioning of the consists along the track length for the various track sets provides greater continuity of charging or generation. The addition of tracksets by using multiple modules defines the power output of the system and that the energy capacity (e.g hours of output at full power) is a function of the number of masses and the elevation change of the tracksets. Additionally, motor drive sharing may be employed between tracks via across the line powering of tracks that are not loading or unloading as will be described subsequently. As seen in FIG. 2, the winch sets 16 each employ two interconnected winch drums, 28a and 28b which rotate in opposite directions with gearing and both cables exiting off the bottom of the winch drums to simultaneously wind and unwind. In alternative embodiments discussed below the cable is wound in opposite directions on the drums and the drums are turned in the same directions. An exemplary consist 20*a* connected to winch drum 28*a* is shown carrying a mass 22 while consist 20*b* connected to winch drum 28*b* is unloaded and in transit. Shuttles may be joined to configure consists with a desired maximum loading or may be used individually in various system embodiments. The weight of consist 20*a* on track 32*a* of the module 18 is counterbalanced by the weight of consist 20*b* operating on track 32*b* thereby providing high efficiency, as the power from the unloaded shuttle is directly transmitted to the loaded shuttle, in operation for both charging and generating in the system with the weight of mass 22 substantially determining the charging or generating power of the track set.

The modules may be configured as switchless with two complete tracks extending from the upper to lower storage yard in each module. Alternatively as shown in FIG. 3 a single track may be employed in each module with a switched siding 34 along the track to allow the ascending consist 20*a* and descending consist 20*b* to pass.

Figure 4A:
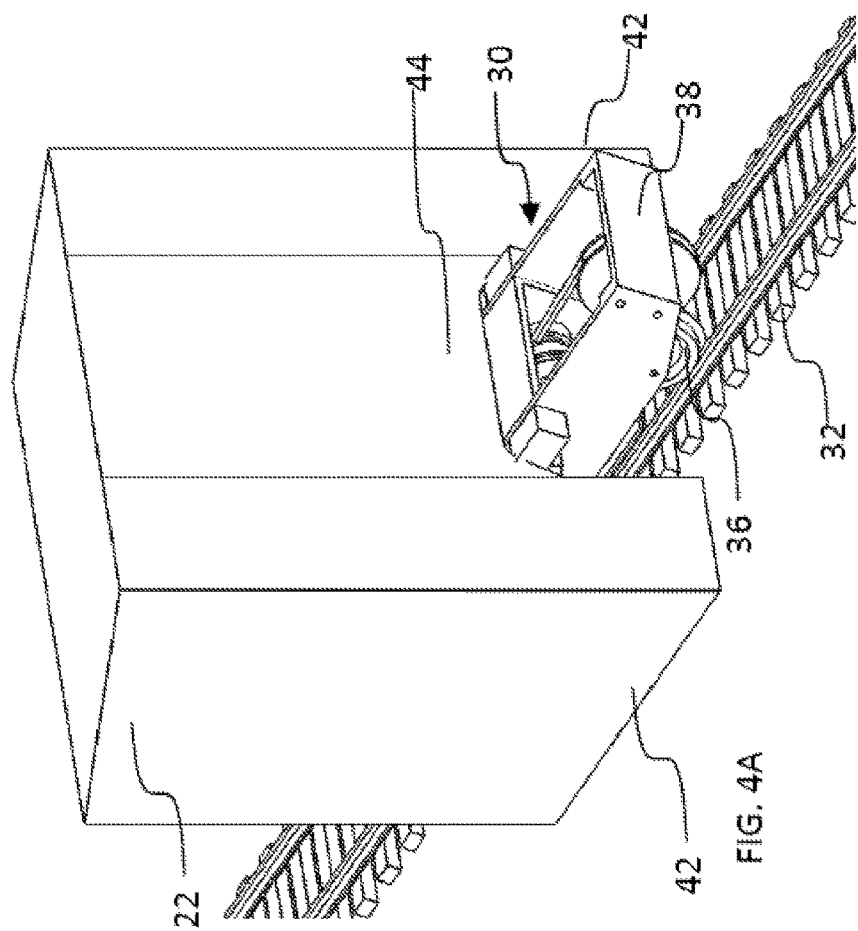
FIG. 4A is a perspective view of the exemplary shuttle unit with a mass engaged.
Figure 4B:
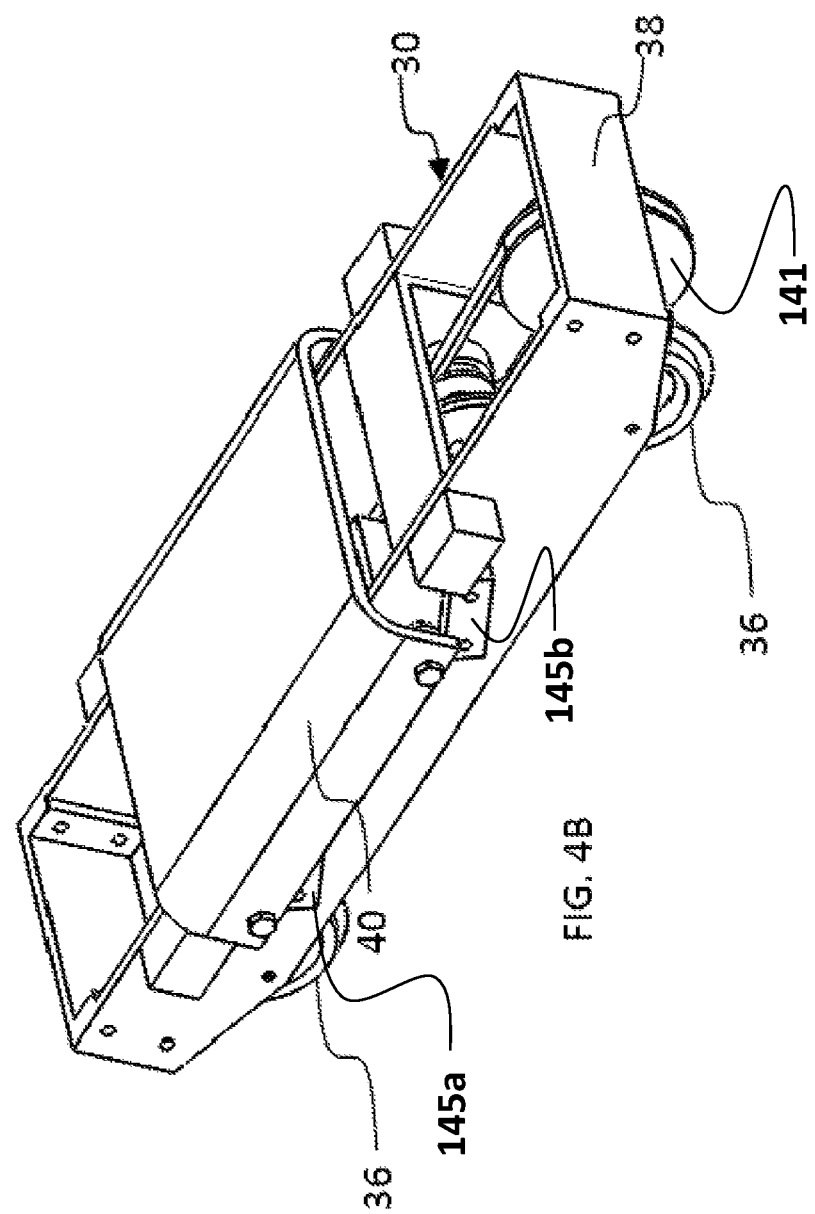
FIG. 4B is a perspective view of the exemplary shuttle unit showing the wheel bogies and an embodiment of a mass support structure.
Figure 4C:
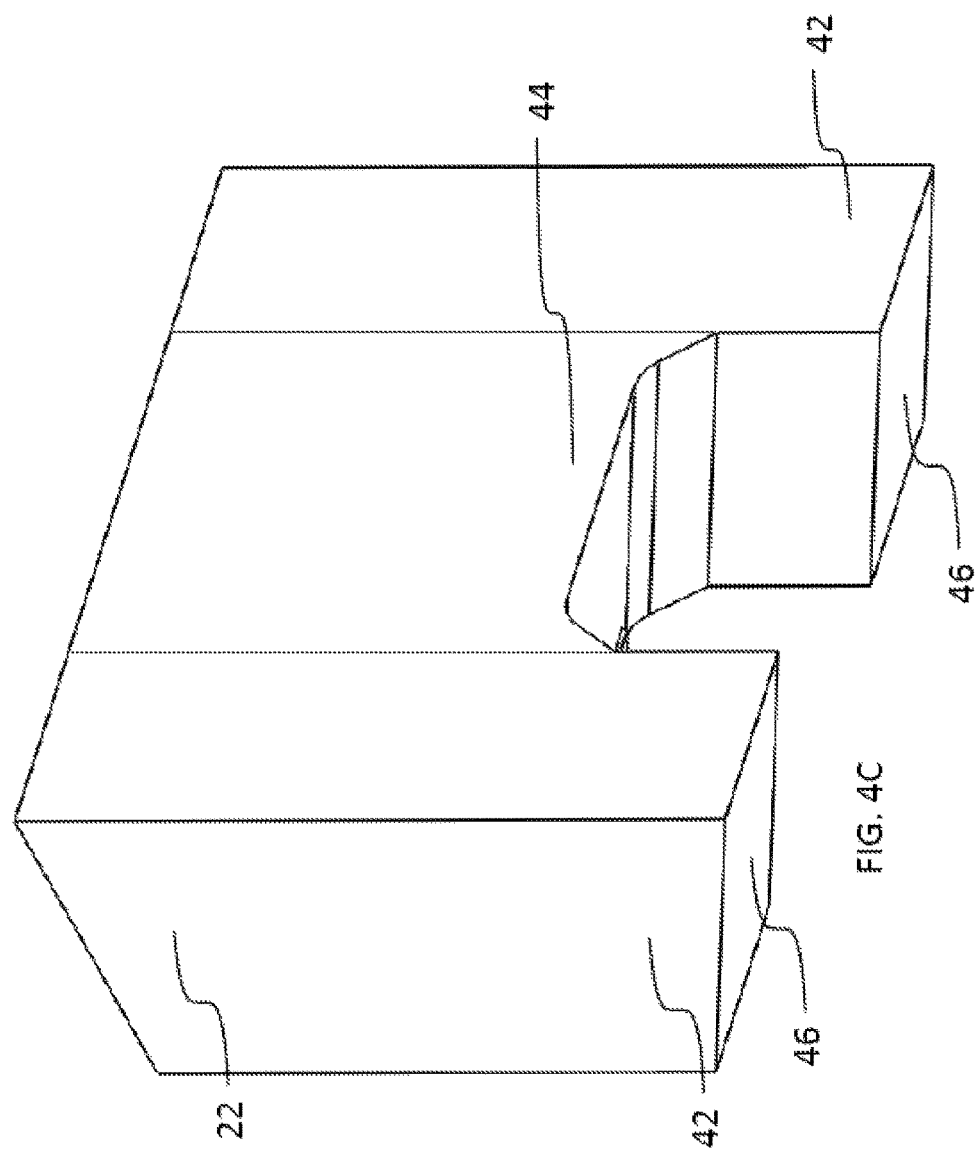
FIG. 4C is a perspective view of an exemplary mass.

As seen in FIGS. 4A-4C, each shuttle 30 incorporates multiple wheeled bogies 36 carrying a support frame 38 on which the mass 22 is carried. The wheeled bogies engage the track 32. As best seen in FIG. 4B, the support frame 38 includes a lifting platform 40. The system for lifting the platform 40 may be mechanical, hydraulic or electric in various embodiments. However, an automated system for engagement and lifting or depositing the masses is desirable as will be described subsequently. The mass 22 as seen in FIGS. 4A and 4C has outer leg portions 42 separated by a bight portion 44 in an inverted "U" shape to straddle the width of the track 32. The shape provides a low polar inertia reducing both rotational tendency or side to side rocking of the mass during transit up the steep grade. Reduction in side to side rocking enhances effective wheel to track loading. While shown with rounded edges on the upper corners the corners may be square. The leg portions have substantially flat bottoms 46 to rest on the ground straddling the track at the upper and lower storage yard allowing the masses to be freestanding. The lifting system 40 of the shuttle engages the bight portion 44 to raise the mass 22 clearing the flat bottoms 46 of the leg portions sufficiently for grade changes in the track. This configuration allows the shuttle to transit beneath the mass in the storage yard, engage and raise the mass and then proceed on the track without an external crane or lifting mechanism to place the mass on the shuttle.

Figure 5A:
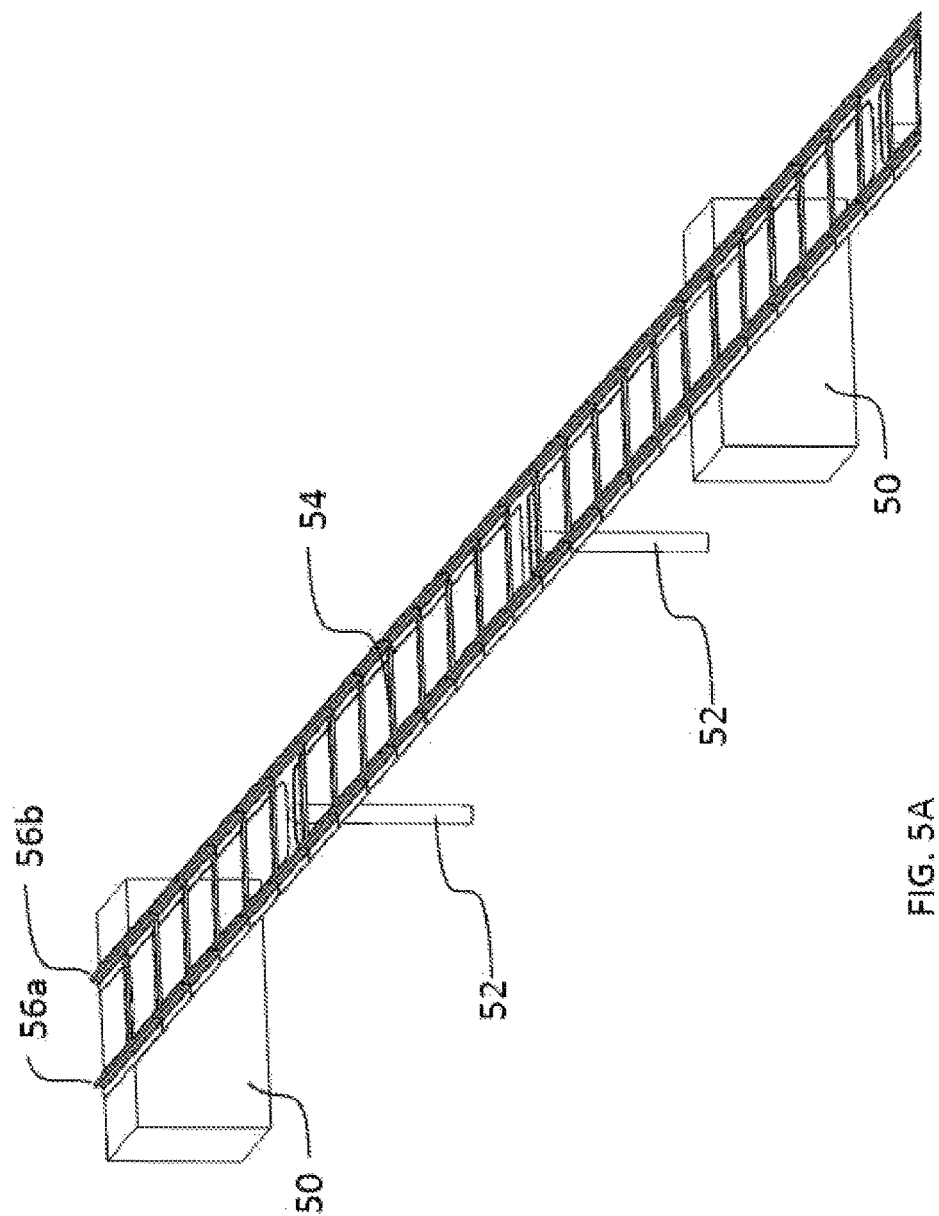
FIG. 5A is a perspective view, with a portion of the ground cut away, of a track construction configuration for the ridgeline cable drive electric energy storage system.

Tracks for the modules may be provided on the grade using one of several techniques. As shown in FIGS. 5A and 5B, the tracks 32 may be anchored at the top of the grade with a concrete mass 50 with rail alignment pilings 52 inserted at spaced intervals on the grade. Ties or connectors 54 are engaged by the rails 56*a* and 56*b* of the track to maintain separation forming a "ladder track". The "ladder track" is supported on the grade on rock ballast 57 or similar material. Alternatively as shown in FIG. 5C, ties 58 may be anchored directly to the earth on grade 60 in the grade with distributed soil anchors 70. Rails 56*a* and 56*b* are then secured to the ties.

To accommodate thermal expansion and contraction in the rails, an alternative configuration as shown in FIG. 5D may be employed. The top connection of the track is accomplished with a concrete mass 50 as in the configuration of FIG. 5A. However, the rails 56*a* and 56*b* of track 32 are supported in ties 72 supported in a conventional manner on grade 60. As seen in FIGS. 5E and 5F, each tie 72 has a longitudinal relief 74 to receive each rail. Lateral sides 76 of the relief constrain the tracks laterally. However, the tracks are free to expand and contract longitudinally within the reliefs. Vertical adjustment of the tracks in the reliefs 74 may be accomplished with a slidable wedge 78 as seen in FIG. 5G, which is received in a lateral relief 80 seen in FIG. 5F. The wedge 78 incorporates a slot 82 received over a threaded pin 84 and may be constrained in position once adjusted by a nut 86 (seen in FIG. 5E) engaged on the pin.

Figure 5H:
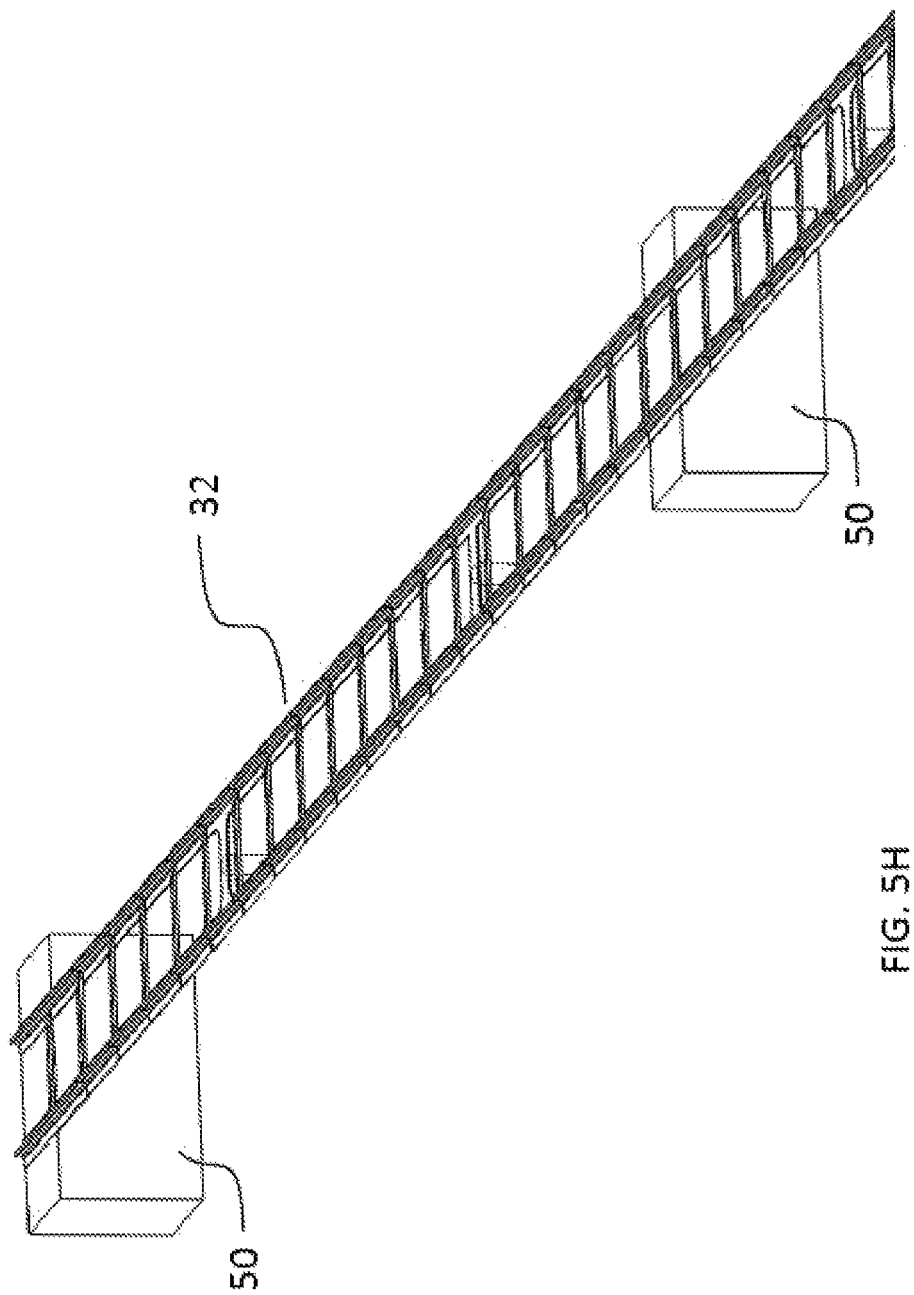
FIG. 5H is an exemplary configuration for a track support system with a top mass and intermediate masses to constrain the track rails from longitudinal expansion and contraction while avoiding downslope migration.

The rails of the track 32 may alternatively be constrained with regard to longitudinal expansion and contraction by placement of additional concrete masses 51 spaced on grade 60 to preclude migration of the track downslope induced by cyclical expansion and contraction as seen in FIG. 5H.

Figure 6A:
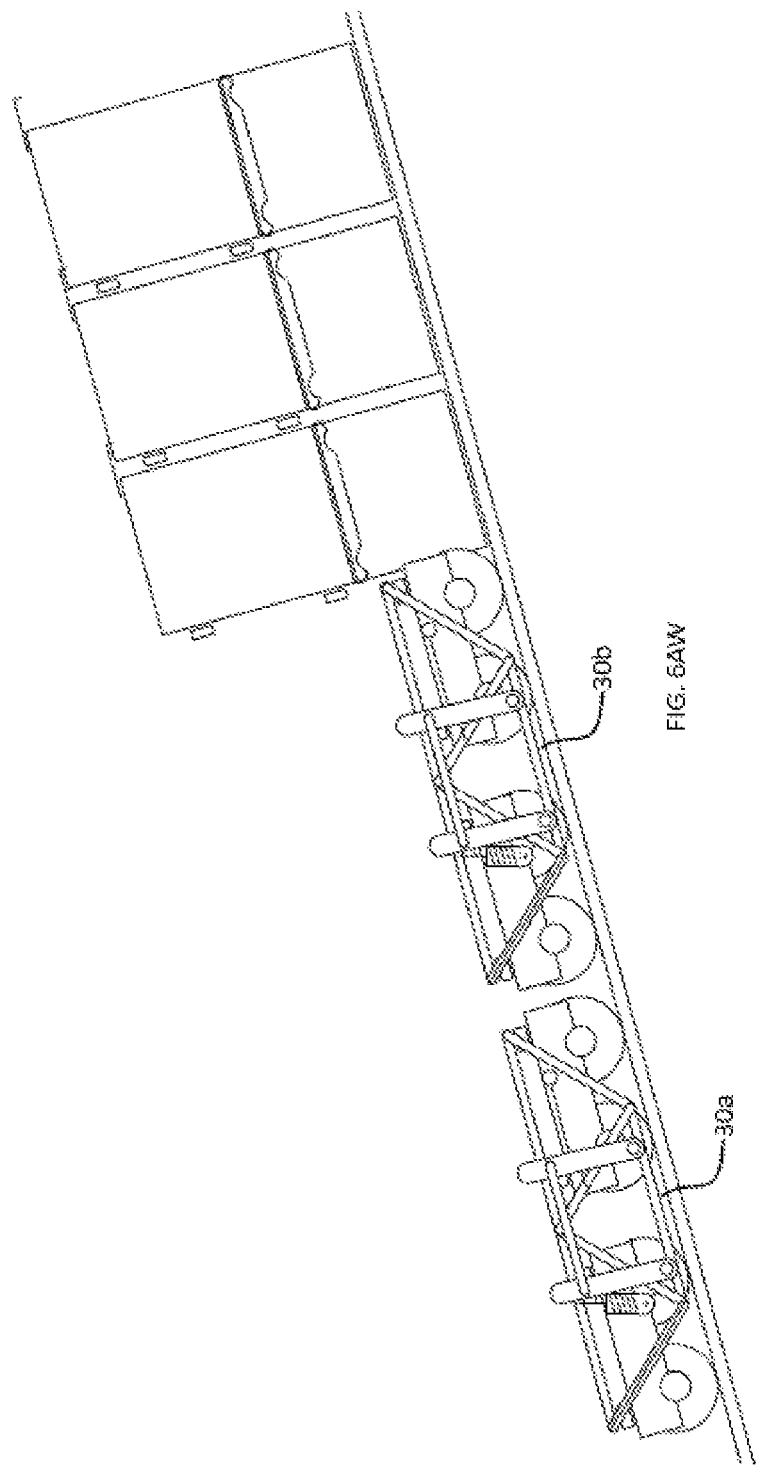
FIGS. 6AA-6AW show a progression of shuttle positions and configurations for engagement of masses with a first exemplary mass engagement mechanism in the lower storage yard and disengagement of masses in the upper storage yard during system charging.

As previously discussed, lifting and depositing of masses on the shuttles (alone or connected in consists) in the upper and lower storage yards during operations for charging or generating without stopping the shuttles is highly desirable. A first exemplary lifting system is demonstrated in FIGS. 6AA-6BQ. As seen in FIG. 6AA two shuttles 30*a* and 30*b* connected in a consist 20*a* active on a module 18*a* as described with respect to FIG. 1 are lowered by the associated winch 16 to approach the lower storage yard 24 in which a number of masses 22*a*-22*d* are stored.

Each shuttle has a rotatable lifting frame 100 pivotally attached at pins 102*a* and 102*b* to the support frame 38. For this exemplary embodiment, the lifting mechanism is hydromechanical and a hydraulic piston/damper 104 is engaged to the rotatable frame 100. A spring element may also be employed in combination with the hydraulic piston/damper for energy recovery during motion of the lifting frame as subsequently described. A hydraulic pump 106 mechanically driven by a geared connection to the wheels in the bogies 36 of the shuttle may be connected to drive the piston/damper 104 as will be described subsequently. Use of the mechanical geared drive through the shuttle wheels allows entirely independent operation of the lifting mechanism powered solely by motion of the shuttle. No separate electrical connection to the shuttle is required. One or more sensors 108 are positioned on the shuttle to detect relative position of the shuttle with respect to the end mass (22*a* initially) in the storage yard. Position of the sensor in the drawing is representative only. The sensor is mechanically actuated by contact through a feeler or similar mechanical element with the mass. In alternative embodiments where electrical power is available on the shuttle, optical or electronic sensors may be employed.

As seen in FIG. 6AB as the shuttle 30*a* proceeds under the end mass 22*a* the sensor detects the mass and releases the frame 100 for rotation by the hydraulic piston/damper. As seen in FIG. 6AC, the arms 110*a*, 110*b* of frame 100 rotate clockwise, constrained for parallel motion by center bar 111, collapsing the frame to allow clearance of engagement stubs 112*a* and 112*b* under the masses. As seen in FIG. 6AD, the consist with shuttles 30*a* and 30*b* continues to descend under the masses. As the second shuttle 30*b* approaches the end mass 22*a*, as seen in FIG. 6AE, the sensor detects the mass and releases the frame 100 for rotation by the hydraulic piston/damper. As seen in FIG. 6AE, the arms 110*a*, 110*b* of frame 100 on shuttle 30*b* rotate clockwise, constrained for parallel motion by center bar 111, collapsing the frame to allow clearance of engagement stubs 112*a* and 112*b* under the masses as seen in FIG. 6AF. The consist continues to a reversal point as shown in FIG. 6AG and the winch 16 then reverses to draw the consist upgrade. As seen in FIG. 6AH as shuttle 30b approaches alignment with the end mass 22a the sensor detects the position and engages hydraulic piston/damper 104 to begin rotation of the frame counter clockwise to engage stubs 112a and 112b in receiving reliefs 114a and 114b, respectively, in the lower surface of mass 22a. Continuing upgrade motion of the shuttle 30b employs mechanical advantage provided by the arms 110a and 100b with rotation of engagement stubs 112a and 112b in the reliefs 114a and 114b to raise the mass 22a with the arms locking at the vertical as seen in FIG. 6AI. The consist continues upgrade with shuttle 30b carrying mass 22a as shuttle 30a approaches mass 22b which is now the end mass in the storage row as seen in FIG. 6AJ. As shuttle 30a approaches mass 22b the sensor detects the position and engages hydraulic piston/damper 104 on shuttle 30a to begin rotation of the frame to engage stubs 112a and 112b in receiving reliefs 114a and 114b, respectively, in the lower surface of mass 22a. Continuing upgrade motion of the shuttle 30b employs mechanical advantage provided by the arms 110a and 110b with rotation of engagement stubs 112a and 112b in the reliefs 114a and 114b to raise the mass 22a with the arms locking at the vertical as seen in FIG. 6AK. The consist continues upgrade with shuttle 30b carrying mass 22a and shuttle 30a carry mass 22b as seen in FIG. 6AL.

As the consist approaches the upper storage yard 26 as shown in FIG. 6AM, shuttle 30b proceeds beneath previously stored masses 22e and 22f (or if masses are not yet present in the upper storage yard an appropriate fixed and arch). As seen in FIG. 6AN, the sensor detects the relative position of mass 22e and releases the vertical lock on shuttle 30b allowing the frame to begin to rotate counter clockwise with rotation damped by the piston/damper 104. As the mass 22a engages mass 22e, the frame completes rotation as shown in FIG. 6AO disengaging stubs 112a and 112b from the reliefs 114a and 114b. A mass interlock 116 may be employed to engage the mass 22a to the mass 22e to enhance rotational stability. Resilient bumpers 118 may be employed on the vertical surfaces of the masses to facilitate engagement and reduce impact. The consist continues upgrade with shuttle 30b proceeding under the stored masses as shown in FIG. 6AP.

As seen in FIG. 6AQ, the sensor on shuttle 30a detects the relative position of mass 22a, previously deposited by shuttle 30b, and releases the vertical lock on shuttle 30a allowing the frame to begin to rotate counter clockwise with rotation damped by the piston/damper 104 as shown in FIG. 6AR. As the mass 22b engages mass 22a, the frame completes rotation as shown in FIG. 6AS. A mass interlock 116 may similarly be employed to engage the mass 22b to the mass 22a to enhance rotational stability.

The direction of the consist is then reversed with the winch 16 allowing the consist to descend downgrade as shown in FIG. 6AT. As shuttle 30a clears the last stored mass 22b as seen in FIG. 6AU, the sensor detects the position and engages piston/damper 104 to rotate the frame clockwise to bring arms 110a and 110b upright engaging the vertical lock as show in FIG. 6AV. Similarly, as shuttle 30b emerges from under the last stored mass 22b, the sensor detects the position and engages piston/damper 104 to rotate the frame clockwise to bring arms 110a and 110b upright engaging the vertical lock as show in FIG. 6AW. The consist then proceeds downgrade to repeat the steps beginning with FIG. 6AA as long the system is charging.

When generating is required, each module operates as shown in FIG. 6BA through 6BQ (a reversal of the steps of FIGS. 6AA-6AW reiterated with slight abbreviation). As seen in FIG. 6BA two shuttles 30a and 30b connected in a consist 20a active on a module 18a as described with respect to FIG. 1 are raised by the associated winch 16 to approach the upper storage yard 26 in which a number of masses are stored. As seen in FIG. 6BB as the shuttle 30b proceeds under the end mass 22b the sensor detects the mass and releases the frame 100 for rotation by the hydraulic piston/damper. The arms 110a, 110b of frame 100 rotate counter clockwise, constrained for parallel motion by center bar 111, collapsing the frame to allow clearance of engagement stubs 112a and 112b under the masses. As seen in FIG. 6BC, the consist with shuttles 30a and 30b continues to ascend under the masses. As the second shuttle 30a approaches the end mass 22b the sensor detects the mass and releases the frame 100 for rotation by the hydraulic piston/damper. The arms 110a, 110b of frame 100 on shuttle 30a rotate clockwise, constrained for parallel motion by center bar 111, collapsing the frame to allow clearance of engagement stubs 112a and 112b under the masses as seen in FIG. 6BD. The consist continues to a reversal point as shown in and the winch 16 then reverses to allow the consist to descend downgrade. As seen in FIG. 6BE as shuttle 30a approaches alignment with the end mass 22b the sensor detects the position and engages hydraulic piston/damper 104 to begin rotation of the frame clockwise to engage stubs 112a and 112b in receiving reliefs 114a and 114b, respectively, in the lower surface of mass 22b. Continuing downgrade motion of the shuttle 30a employs mechanical advantage provided by the arms 110a and 100b with rotation of engagement stubs 112a and 112b in the reliefs 114a and 114b to raise the mass 22b with the arms locking at the vertical as seen in FIG. 6BF. The consist continues downgrade with shuttle 30a carrying mass 22b as shuttle 30b approaches mass 22a which is now the end mass in the storage row as seen in FIG. 6BG. As shuttle 30b approaches mass 22a the sensor detects the position and engages hydraulic piston/damper 104 on shuttle 30b to begin rotation clockwise of the frame to engage stubs 112a and 112b in receiving reliefs 114a and 114b, respectively, in the lower surface of mass 22a. Continuing down grade motion of the shuttle 30b employs mechanical advantage provided by the arms 110a and 110b with rotation of engagement stubs 112a and 112b in the reliefs 114a and 114b to raise the mass 22a with the arms locking at the vertical as seen in FIG. 6BH. The consist continues downgrade with shuttle 30b carrying mass 22a and shuttle 30a carry mass 22b as seen in FIG. 6BI.

As the consist approaches the lower storage yard 24 as shown in FIG. 6BJ, shuttle 30b proceeds beneath previously stored masses 22e and 22f (or if masses are not yet present in the lower storage yard an appropriate fixed end arch or mechanical stop). As seen in FIG. 6BK, the sensor detects the relative position of mass 22c and releases the vertical lock on shuttle 30a allowing the frame to begin to rotate clockwise with rotation damped by the piston/damper 104. As the mass 22a engages mass 22e, the frame completes rotation as shown in FIG. 6BL disengaging stubs 112a and 112b from the reliefs 114a and 114b. The resilient bumpers 118 may be employed on the vertical surfaces of the masses to facilitate engagement and reduce impact. The consist continues down grade with shuttle 30a proceeding under the stored masses as shown in FIG. 6BM.

As seen in FIG. 6BM, the sensor on shuttle 30a detects the relative position of mass 22b, previously deposited by shuttle 30a, and releases the vertical lock on shuttle 30b allowing the frame to begin to rotate counter clockwise with rotation damped by the piston/damper 104 as shown in FIG. 6BN. As the mass 22b engages mass 22a, the frame completes rotation as shown in FIG. 6BO.

The direction of the consist is then reversed with the winch 16 drawing the consist to ascend upgrade as shown in FIG. 6BP. As shuttle 30b clears the last stored mass 22a as seen in FIG. 6BP, the sensor detects the position and engages piston/damper 104 to rotate the frame counter clockwise to bring arms 110a and 110b upright engaging the vertical lock as show in FIG. 6AV. Similarly, as shuttle 30a emerges from under the last stored mass 22a, the sensor detects the position and engages piston/damper 104 to rotate the frame clockwise to bring arms 110a and 110b upright engaging the vertical lock as show in FIG. 6BQ. The consist then proceeds upgrade to repeat the steps beginning with FIG. 6BA as long the system is generating.

A second embodiment for the lifting system, also relying on mechanical advantage and motion of the shuttles to provide lifting of the masses while the shuttles are in motion, is shown in FIGS. 7A-7N. While the operation of the second lifting system is described with respect to a single shuttle, a consist with two or more shuttles may be employed as described with respect to the first embodiment. A shuttle 30 having a structural frame 38 supports a ramp 120 with an apex 121 oriented in a first direction on the shuttle. A first roller system 122 is operatively carried on an upper surface of the ramp 120. A first triangle element 124 engages the first roller system on a bottom surface with an apex 125 oriented oppositely from the ramp apex, A second roller system 126 is operatively carried on an upper surface of the triangle element 124. The first and second roller systems are lockable and may employ pneumatic, mechanical or hydraulic systems for locking with required pressure provided by a pump 125 operatively geared to the wheels on bogies 36 of the shuttle as in the prior embodiment to avoid any requirement for electrical connection to the shuttle unit. A second triangle element 128 having an apex 129 oriented oppositely form the first triangle apex engages the second roller system 126 on a bottom surface and provides a top engagement surface 130. An exemplary roller system which may be employed for the first and second rollers is a Superail system by Darnell-Rose Caster LLC, City of Industry, CA.

In operation, as shown in FIG. 7A, in an initial position, the first triangle element 124 is locked at a maximum divergent position from the apex of the ramp. The second triangle element 128 is carried at a minimum divergent position from the apex 125 of the first triangle element 124 allowing the shuttle 30 to transit underneath the masses 22a-22c present in a storage yard 24. As the associated winch 16, as described with respect to FIG. 1, draws the shuttle 30 along the track 32 the shuttle approaches the end mass 22a as seen in FIG. 7B. Upon reaching the centerpoint of the mass 22a, the top engagement surface 130 of the second triangle element 128 engages the bottom surface 132 of the bight 44 of mass 22a as seen in FIG. 7C. As the shuttle continues upgrade, as seen in FIG. 7D, the second triangle element, engaged to the mass 22a, is drawn upward along the second roller system 126 lifting the mass 22a. Upon reaching a maximum divergent position from the apex 125 of the first triangle element 124, the second triangle element 128 is then locked on the second roller system 126 as seen in FIG. 7E. The shuttle 30 with the loaded mass 22a is then drawn upgrade by the winch, as seen in FIG. 7F to approach the upper storage yard 26 as seen in FIG. 7G.

Upon approaching the first stored mass 22d in the upper storage yard 26 as seen in FIG. 7H, the first triangle element 124 is unlocked on the first roller system 122. Upon contact with the first stored mass 22d as seen in FIG. 7I, the first triangle element 124 begins to descend on the first roller system 122 lowering the mass 22a as seen in FIG. 7J. When the first triangle element 124 reaches the apex 121 of the ramp element 120 it is held by gravity, or may be locked in place and the shuttle 30 is free to transit beneath the stored masses 22a and 22d as shown in FIG. 7K. Upon reversal of direction by the winch 16 the shuttle 30 exits the stored masses, FIG. 7L, and begins to descend down grade as shown in FIG. 7M. The first triangle element 124 is then driven hydraulically or pneumatically up first roller element 122 to the maximum divergent position from apex 121 of ramp element 120 as shown in FIG. 7N during transit. The second triangle element 128 is unlocked and allowed to travel down second roller system 124 to the apex 125 of second triangle element 124, thereby assuming the initial position as shown in FIG. 7A. The process is then repeated as long as the system remains charging. For generating, the process is reversed beginning at the top storage yard.

As seen in FIG. 8, the winch drive sets 16 incorporate two drums 28a, 28b which rotate to draw their respective cables in opposite directions to oppositely raise or lower shuttles/consists on the track pairs in the module. The embodiment described with respect to FIG. 2 and the embodiment of FIG. 8 accommodates this requirement in alternative forms. Various embodiments may employ cable direction reversal by inner and outer bull gears, opposite cable winding on drums and opposite rotating spur gears by the addition of a reversal gear stage in one of the gearheads. For the embodiment of FIG. 8, the motor/generator 80 incorporates a fixed gear head 82 and a rotatable gear head 84 engaged to the motor with a rotating gear head mount 86. Both gear heads rotate in the same direction. A first drum 28a, incorporates an inner gear 88 engaging the rotatable hear head 84 while a second drum 28b incorporates and outer gear 90 engaging the fixed gear head 82 thereby providing the necessary opposite rotation. As masses are loaded and moved from the lower storage yard to the upper storage yard in the charging condition, the location of the next mass to be retrieved in the lower storage yard moves toward the distal end of the lower storage yard relative to the winch set. Shuttles therefor require greater cable length from the associated drum to reach the next available mass. Similarly, at the upper storage yard as masses accumulate the shuttle is not drawn as far toward the proximal end of the upper storage yard by a comparable cable length. As masses are moved from the upper storage yard to the lower storage yard in the generating condition, relative cable length is reduced. To accommodate this requirement, a differential motor 92 is engaged to the rotatable gear head 84 to adjust the cable length on the drums. The differential motor 92 is engaged to play out cable at each shuttle or consist transit during charging and take in cable at each shuttle or consist transit during generation. This provides increased accuracy in shuttle placement for mass loading and unloading.

Figure 9A:
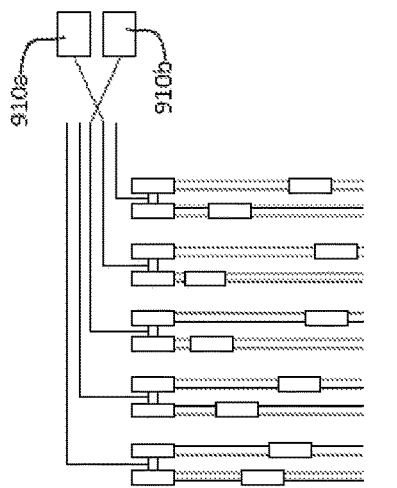
FIGS. 9A-9D are a schematic representation of module winch operational sequencing with a switched variable frequency drive (VFD)
Figure 9B:
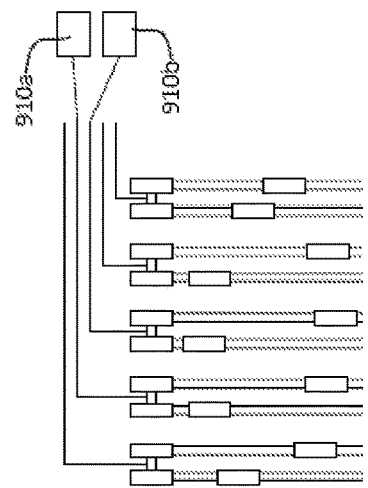
Figure 9C:
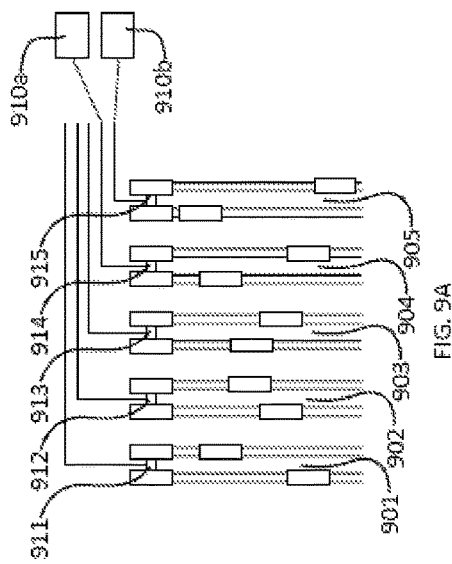
Figure 9D:
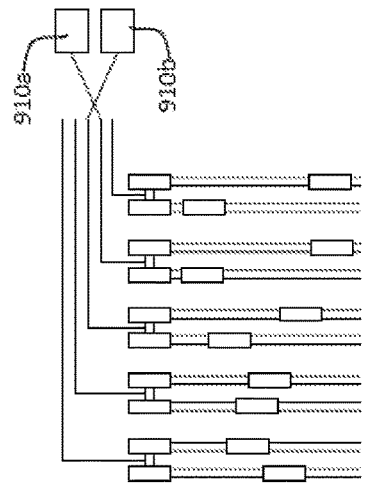
Figure 9E:
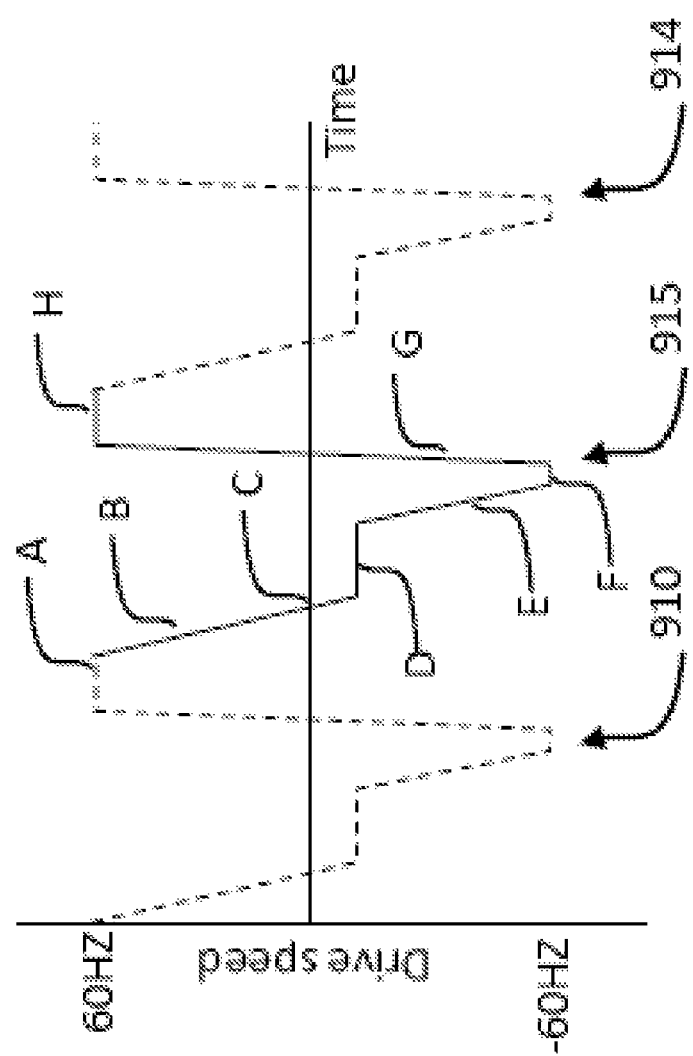
FIG. 9E is a timing diagram of the operational sequence for control of module winches by the VFD.

As previously described, driving the winch motors may be accomplished with across the line direct to grid synchronization between the various modules. As a consist is accelerated to speed after being loaded, the frequency of the winch motor(s) is matched to that of the electric grid. The winch motor(s) are then switched from being driven by the motor drive to being driven directly from the electric grid at a fixed speed. The winch motor drive is then available for use on another track module for the purpose of loading or unloading masses. In this way the number of winch motor drives can be reduced, the efficiency of the system can be increased and the inertia of the modules is linked directly to the frequency of the electric grid thereby stabilizing it. As seen in FIGS. 9A-D and 9E a pair of variable frequency drives (VFD) 910a, 910b acting as the motor drive are employed. At a time=0, seen in FIG. 9A, module 905 has consists approaching the upper storage yard and lower storage yard. Winch 915 is needed under VFD control to load and unload the masses as previously described. To accomplish this, the VFD 910b catches winch 915 from across-the-line at full power at point A in FIG. 9E. Winches 911-913 are across-the-line traveling at full speed. Winch 914 is being accelerated by VFD 910a. The VFD 910b decelerates winch 915 as seen in segment B of FIG. 9E. The VFD then reverses direction of the winch 915 at point C. The VFD then operates the winch 915 at slow speed to load and unload the masses in segment D. The VFD then accelerates the winch 915 to full speed, segment E. Winch 915 is then bypassed from the VFD and operates across-the-line, segment F, and the VFD 910a then prepares to catch winch 914, segment H. As represented in FIG. 9B, the VFD 910a engages winch 914 to operate under VFD control while winches 911-912 and 915 operate across the line traveling at full speed and VFD 910b has been switched to winch 913 Two VFD's are needed so that while one track set is accelerating to 60 Hz the next one approaching the yards can be decelerated. In this way the sum of the power from both VFD's 910 a & b is always equal to 1 track set The process is repeated as represented in FIGS. 9C and 9D for modules 904 and 903 as the consists in each module approach the upper and lower storage yards. The process is continued for modules 902 and 901 and then repeats.

Regulation of the utility grid can be accomplished by the cable drive electric energy storage system both during charging/generation or when no other supply or demand on the system is present from the grid. During either charging or generation, operation by the VFD to increase or decrease consist speed on the currently controlled module may be employed for trim to regulate up (Reg-UP) or regulate down (Reg-Down). Regulation when the system is not operating in charging or generation may be accomplished by controlling the stopping position from either charging or generating to configure a loaded consist at mid-elevation or alternating consist position on grade to allow every other module to provide either instant Reg-Up or Reg-Down without the time delay required by mass loading.

The lower storage yard 24 and upper storage yard 26 may be accommodated flat on grade as shown in FIG. 10A where the grade may be reduced from the steep grade of the track main line portions 33. In exemplary embodiments a main line grade of 38% or higher may be employed and reduced grades of 7% or lower may be employed in the storage yards. Where storage must be accommodated on the same grade as the main line track portion as shown in FIG. 10B, the storage yards may be implemented with respective concrete mass landing foundations, 53 in lower storage yard 24 and 55 in upper storage yard 26. As shown in detail in FIG. 10C, the concrete mass landing foundations 53, 55 are provided with a stair step bottom 150 to enhance support of the stored masses 20 on grade without downslope migration of the concrete masses. Similarly, the masses 20 are provided with a stair step bottom 154 on the outer leg portions of the masses mating with a stair step upper surface 152 on the concrete mass landing foundations 53, 55 to provide upright storage for the masses. Alternatively, the stair step upper surface 154 may employ steps equal in width to the bottoms 46 of the outer leg portions on the masses as previously described with respect to FIG. 4D.

Figure 11B:
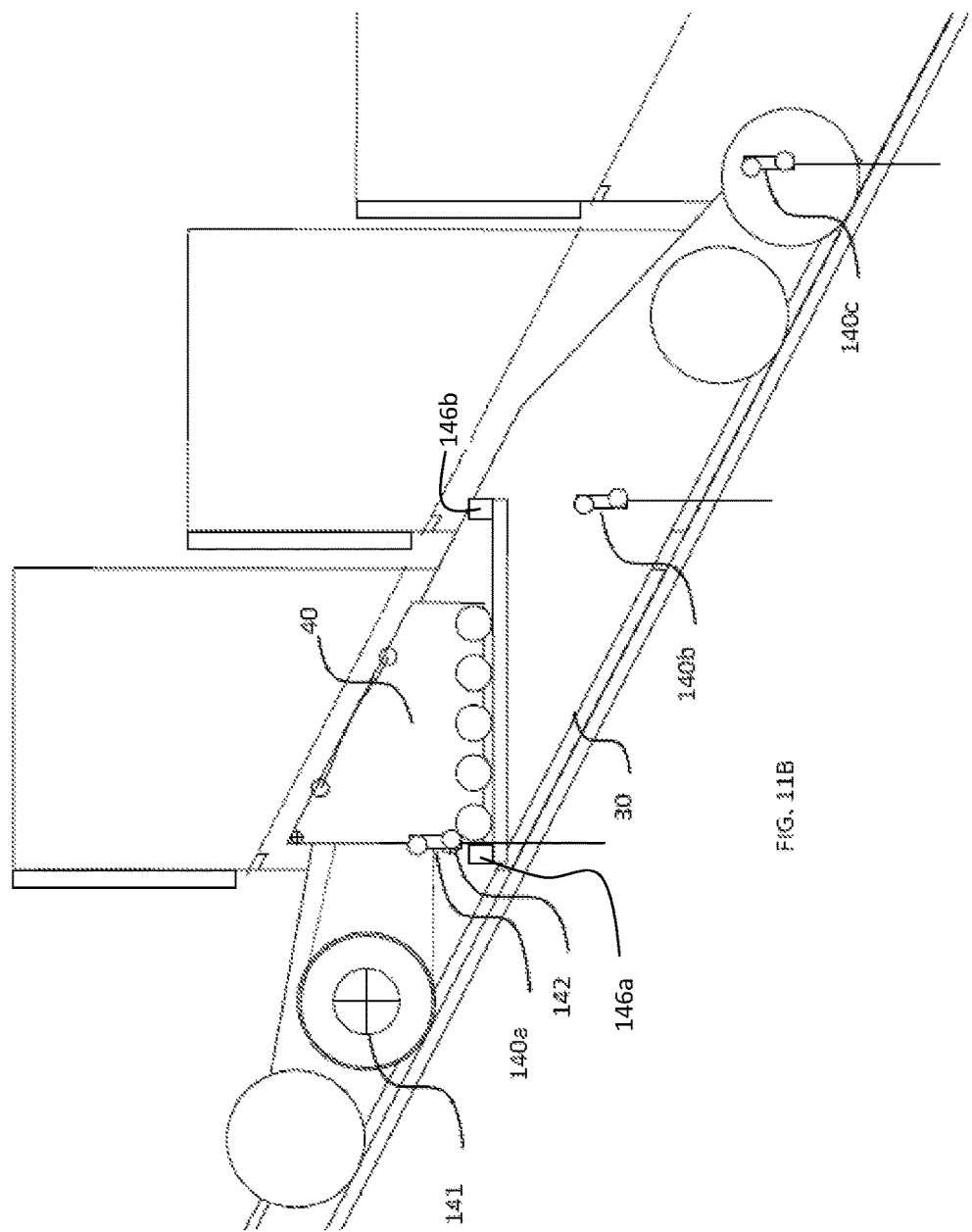

An third alternative lifting system comparable to the shuttle disclosed in FIG. 4B and also relying on mechanical advantage and motion of the shuttles to provide lifting of the masses while the shuttles are in motion, is shown in FIGS. 11A-11I. While the operation of the third lifting system is described with respect to a single shuttle, a consist with two or more shuttles may be employed as described with respect to the first embodiment. A shuttle 30 having a structural frame as in prior embodiments supports at least one rail 145 mounted at an angle complimentary to the angle of the track 32 providing a substantially horizontal running surface with the shuttle 30 mounted on the track. Multiple rails, 145a, 145b as depicted in FIG. 4B, may be employed to allow a longer lifting platform 40 to be accommodated within the dimensions of the shuttle. The lifting platform 40 is supported by wheels 144 engaged to the rails 145 allowing reciprocation of the lifting platform horizontally. A lockable drive 141, which for the embodiment shown comprises a clutched pulley engaged to one (or a pair) of the wheels on bogies 36, is connected either to the lifting platform 40 or the wheels 144 to move the lifting platform on the rails. In alternative embodiments, the drive may be a hydraulic, electrical or other drive system. At the upper and lower storage yard, positions of the stored masses 22a, 22b, et seq. are indicated with a track marker 140a, 140b, 140c. A track marker sensor 142 is associated with the lifting platform 40 to detect proximity of the lifting platform to a mass associated with a track marker. The track marker sensor is interconnected to the lockable drive 141 to engage the drive upon alignment of the track marker sensor 142 with the track marker 140a, 140b, 140c. As shown in FIG. 11A, with the lifting platform 40 translated to a first end of the rails 145 designated by a first end stop sensor 146a, the lifting platform is in a retraced position with respect to the shuttle 30 allowing the shuttle to be moved up or down the track under the stored masses.

As seen in FIG. 11B for operation of the system in a charging mode, as shuttle 30 is pulled uphill by winch 16 sensor 42 engages marker 140a and drive 141 is lightly engaged driving lifting platform 40 from the first end stop sensor 147 toward an opposite end stop sensor 146b. As shuttle 30 continues uphill, as seen in FIG. 11C, drive 141 moves lifting platform 40 along rail 145 and spring roller 150 engages a lower surface 132 of the bight portion 44 of mass 22a. As seen in FIG. 11D, shuttle 30 continues uphill. Drive 141 may be placed in a slipping mode allowing spring rollers 150 to roll against lower surface 132 until a mass end sensor 147 on the lifting platform 40 engages a stop 148 on the mass 22a. The engagement of sensor 147 commands drive 141 to full power. As seen in FIG. 11E, shuttle 30 continues uphill as drive 141 now moves lifting platform 40 along rails 145, displacing spring roller 150 which engages lower surface 132 of bight portion 44 with an upper surface 151 of the lifting platform 40. The upper surface 151 of the lifting platform translates relative to the shuttle perpendicular to the track angle. Mass 22a is lifted directly vertically with horizontal motion (vector −H) of the lifting platform 40 on the rails 145 coordinated to oppositely match the horizontal component H of the motion vector M of the shuttle 30 as it proceeds up the hill. When lifting platform 40 engages opposite end stop 146b drive 141 is responsively stopped and locked. While a multispeed/power drive is described in this embodiment, under certain conditions a constant speed drive, engaged by sensor 142 providing a matching of the horizontal motion of the lifting platform 40 on the rails 145 opposite to the horizontal component of the motion vector of the shuttle 30 and disengaged and locked by end stop 146b, may be employed. Shuttle 30 is then accelerated by the VFD as previously described and continues uphill with mass 22a engaged on lifting platform 40 as seen in FIG. 11F.

Figure 11G:
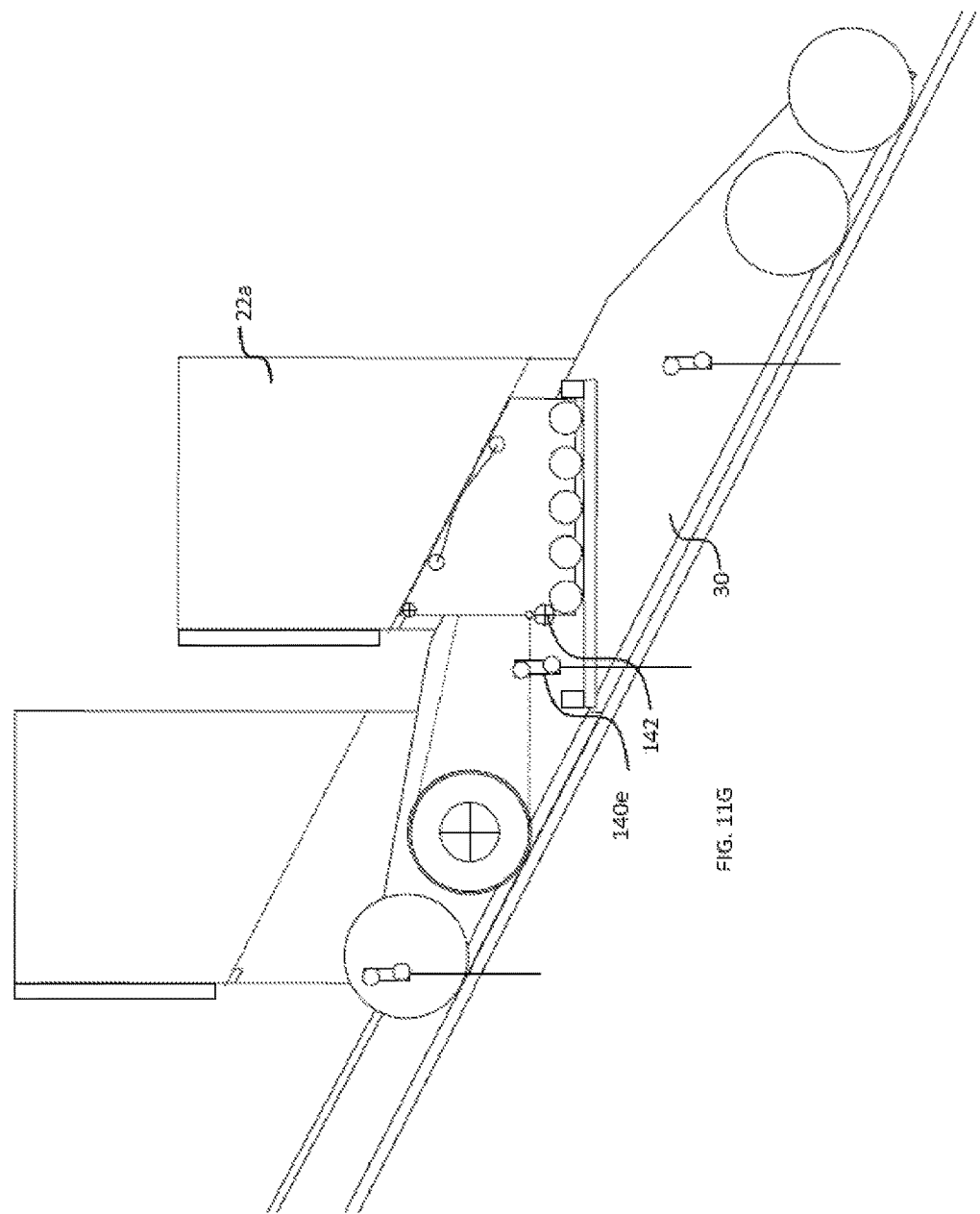
Figure 11I:
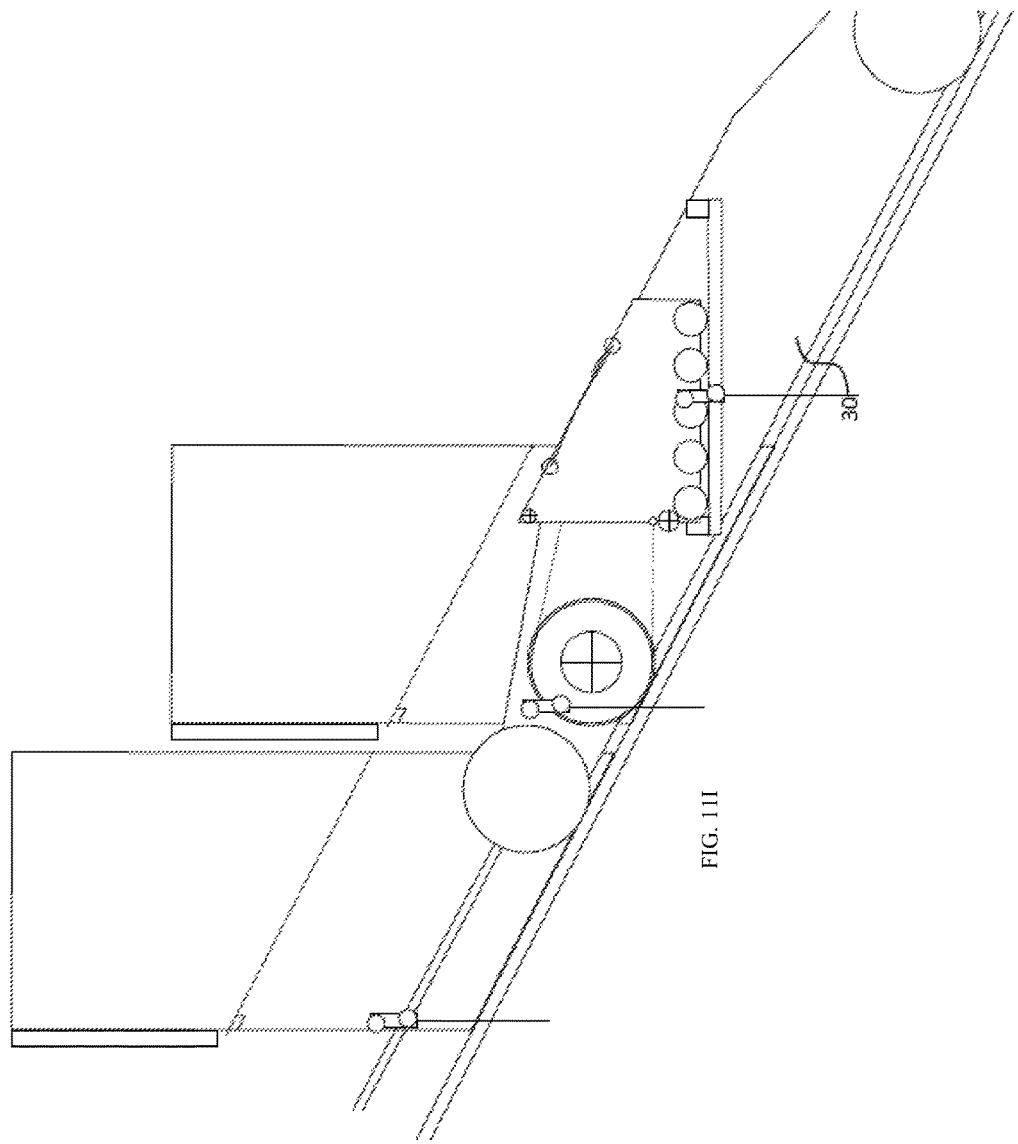

Shuttle 30 continues uphill and is decelerated by the VFD, as previously described, as sensor 142 approaches track marker 140e designating a desired position for unloading of the mass 22a in the upper storage yard as shown in FIG. 11G. Shuttle 30 is stopped as sensor 142 engages track marker 140e and drive 141 is engaged. Shuttle 30 is rolled downhill by winch 16 and drive 141 move the lifting platform 40 from opposite end stop sensor 146b toward the end stop sensor 146a along rails 145. Mass 22a is lowered directly vertically with motion of the lifting platform 40 on the rails 145 coordinated to match the horizontal component of the motion vector of the shuttle 30 as it proceeds down the hill thereby lower mass 22a on the ground until end stop sensor 146a is reached disengaging drive 141 as represented in FIG. 11H. Shuttle 30 may then transition beneath the mass 22a to begin transiting downhill as shown in FIG. 11I to retrieve the next mass in the lower storage yard.

Functioning of the system in generating mode operates identically in reverse order to that described, loading massed in the upper storage yard and unloading them in the lower storage yard.

The various embodiments disclosed herein provide a method for storing electrical energy by first controlling a module with a power controller in a charging mode in which electrical power from a utility grid is received in a motor of a winch set, the winch set simultaneously driving a first consist and a second consist in opposite directions on tracks on grade. The winch set drives a first cycle which includes loading the first consist with a first of a plurality of masses in a bottom storage yard, causing the first consist to ascend to an upper storage yard, unloading the first of the plurality of masses, and simultaneously causing the second consist to descend from the upper storage yard to the lower storage yard. The winch set is then reversed to drive a second cycle which includes causing the first consist to descend from the upper storage yard to the lower storage yard empty and simultaneously loading the second consist with a second one of the plurality of masses in the bottom storage yard, causing the second consist to ascend to the upper storage yard and unloading the second one of the plurality of masses thereby storing excess electrical energy available on the utility grid. The power controller is also controllable in a generating mode with the winch set motor reversed to generate electrical power in which electrical power generated from the winch set motor is transferred to the utility grid in a third cycle which includes loading the first consist with the second of the plurality of masses in the upper storage yard, causing the first consist to descend to the lower storage yard, unloading the second of the plurality of masses and simultaneously causing the second consist to ascend from the lower storage yard to the upper storage yard empty. The winch set is then reversed to generate in a fourth cycle including causing the first consist to ascend from the lower storage yard to the upper storage yard empty and loading the second consist with the first of the plurality of masses in the upper storage yard, descending to the lower storage yard and unloading the first of the plurality of masses thereby providing electrical energy to the utility grid.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention is therefore not limited by the above described embodiment, method, and examples, but by all embodiments and methods within the scope and spirit of the invention as claimed.

What is claimed is:

1. An energy storage system comprising:
a power controller responsive to a utility grid;
at least one module having
tracks running from a bottom storage yard to a top storage yard;
a winch set having a motor generator which simultaneously drives a first consist and a second consist in opposite directions on the tracks on grade;
said first and second consist each comprising at least one shuttle having a lifting mechanism to engage a mass stored in one of said bottom storage yard and said top storage yard,
the module operable under control of the power controller in a charging mode with the winch set receiving in a motor electrical power from a utility grid to drive a first cycle with the first consist loading a mass in the bottom storage yard and ascending to the upper storage yard and unloading the mass and said second consist descending from the upper storage yard to the lower storage yard empty followed by a reversal of the winch set to drive a second cycle with the first consist descending form the upper storage yard to the lower storage yard empty and the second consist loading a mass in the bottom storage yard and ascending to the upper storage yard and unloading the mass thereby storing excess electrical energy available on the utility grid, and,
the module operable under control of the power controller in a generating mode with the winch set motor reversed to generate electrical power to the utility grid in a third cycle with the first consist loading a mass in the upper storage yard and descending to the lower storage yard and unloading the mass and said second consist ascending from the lower storage yard to the upper storage yard empty followed by a reversal of the winch set to generate in a fourth cycle with the first consist ascending from the lower storage yard to the upper storage yard empty and the second consist loading a mass in the upper storage yard and descending to the lower storage yard and unloading the mass thereby providing electrical energy to the utility grid.

2. The energy storage system as defined in claim 1 wherein the at least one module comprises a plurality of modules.

3. The energy storage system as defined in claim 2 wherein a motor in each winch sets is switchably attached between a motor drive and the utility grid to be driven with across the line direct to grid synchronization between the modules whereby as a consist is accelerated to speed by the motor drive and after being loaded, the frequency of the winch motor is matched to that of the electric grid and the winch motor is then switched from being driven by the motor drive to being driven directly from the electric grid at a fixed speed and the motor drive is switched to the motor of the winch set in the next module.

4. The energy storage system as defined in claim 3 wherein regulation when the system is not operating in charging or generation is accomplished by controlling a stopping position of consists in the module from either charging or generating to configure a loaded consist near mid-elevation on the grade to provide either instant Reg-Up or Reg-Down without the time delay required by mass loading.

5. The energy storage system as defined in claim 4 wherein the at least one module comprises a plurality of modules and wherein consist position is alternated on grade to allow every other module to provide either instant Reg-Up or Reg-Down without the time delay required by mass loading.

6. The energy storage system as defined in claim 1 wherein the lifting mechanism comprises:
a frame pivotally mounted to the shuttle and having arms rotating in a first direction from an upright position during operation of the winch in the first cycle to clear the frame for transit of the shuttle beneath stored masses in a first storage yard, rotating in a second direction to engage the frame with a stationary mass and during motion of the shuttle continue rotation in the second direction to lift the mass, said arms locking in the upright position, said arms further rotating in the second direction upon unlocking to lower the mass in a second storage yard and to clear the frame for transit of the shuttle beneath stored masses in the second storage yard, after reversal of the winch to the second cycle and clearance of the frame from the stored masses said frame rotating in the first direction to erect the frame.

7. The energy storage system as defined in claim 1 wherein the lifting mechanism comprises:
a ramp with an apex oriented in a first direction on the shuttle;
a first roller system operatively carried on an upper surface of the ramp;
a first triangle element engaging the first roller system on a bottom surface with an apex oriented oppositely from the ramp apex;
a second roller system operatively carried on an upper surface of the triangle element, the first and second roller systems lockable;
a second triangle element having an apex oriented oppositely form the first triangle apex engaging the second roller system on a bottom surface and having a top engagement surface adapted to engage a bottom surface of a bight in the mass; wherein the first triangle element is locked at a maximum divergent position from the apex of the ramp in an initial position, the second triangle element is carried at a minimum divergent position from the apex of the first triangle element allowing the shuttle to transit underneath masses present in a first storage yard, and in a first cycle of the winch, upon reaching the centerpoint of an end mass, the top engagement surface engages the bottom surface the second triangle element which is drawn upward along the second roller system lifting the end mass, and upon reaching a maximum divergent position from the apex of the first triangle element, the second triangle element is locked on the second roller system, and upon approaching a first stored mass in the a second yard the first triangle element is unlocked on the first roller system, whereby upon contact with the first stored mass the first triangle element begins to descend on the first roller system lowering the mass, the first triangle element reaching the apex of the ramp element whereupon the shuttle is free to transit beneath stored masses in the second storage area, and upon reversal of direction by the winch to a second cycle, the shuttle exits the stored masses and the first triangle element is driven up the first roller element to the maximum divergent position from apex of ramp element, and, the second triangle element is unlocked and allowed to travel down the second roller system to the apex of second triangle element, thereby assuming the initial position.

8. The energy storage system as defined in claim 1 wherein the lifting mechanism comprises:
at least one rail mounted to a structural frame of said at least one shuttle at an angle complimentary to a track angle corresponding to the grade of the tracks providing a substantially horizontal running surface with the at least one shuttle mounted on one of the tracks;
wheels engaged to the rails and supporting the lifting platform allowing reciprocation of the lifting platform horizontally between a first position indicated by a first end stop sensor associated with the at least one rail, said lifting platform in a retracted state in the first position, and a second position indicated by an opposite end stop sensor, said lifting platform in an extended state in the second position;
a lockable drive, engaged to at least one wheel of a bogie on the shuttle;
a plurality of track markers at the upper and bottom storage yard positioned to mark positions of stored masses;
a track marker sensor associated with the lifting platform to detect alignment of the lifting platform with a mass associated with a track marker, said track marker sensor interconnected to the lockable drive and operable to engage the drive upon alignment of the track marker sensor with one of the plurality of track markers, said lockable drive translating the lifting platform between the first position and the second position, an upper surface of said lifting platform translating relative to the shuttle perpendicular to the track angle and engaging a lower surface of a bight portion of the mass, whereby the mass is lifted directly vertically with motion of the lifting platform on the rails coordinated to match the horizontal component of a motion vector of the shuttle as the shuttle proceeds up the hill.

9. The energy storage system as defined in claim 8 wherein the lockable drive comprises a clutched pulley.

10. The energy storage system as defined in claim 1 wherein the winch set incorporates two drums which rotate to draw their respective cables in opposite directions to oppositely raise or lower shuttles/consists on the track pairs in the module;
the motor/generator having
a fixed gear head and a rotatable gear head engaged to the motor with a rotating gear head mount, both gear heads rotating in the same direction; and,
a differential motor engaged to the rotatable gear head to adjust a cable length on the drums.

11. The energy storage system as defined in claim 1 wherein at least one module includes a variable frequency drive (VFD) and during either charging or generation, operation by the VFD to increase or decrease consist speed on the currently controlled module employed to regulate up (Reg-UP) or regulate down (Reg-Down).

12. A self-positioning system for mass pickup and deposit in an energy storage system comprising:
a first track and a second track running from a bottom storage yard to a top storage yard;
a winch set having a motor generator which simultaneously drives a first consist on the first track and a second consist in opposite directions on the second track on grade, said winch set incorporating
two drums which rotate to draw their respective cables in opposite directions to oppositely raise or lower shuttles/consists on the track pairs in the module;

the motor/generator having a fixed gear head and a rotatable gear head engaged to the motor with a rotating gear head mount, both gear heads rotating in the same direction; and, a differential motor engaged to the rotatable gear head to adjust a cable length on the drums;

said first and second consist each comprising at least one shuttle having a lifting mechanism to engage a mass stored in one of said bottom storage yard and said top storage yard, the winch set operable under control of the power controller in a charging mode with the winch set receiving in the motor/generator electrical power from a utility grid to drive a first cycle with the first consist loading a mass in the bottom storage yard and ascending to the upper storage yard and unloading the mass and said second consist descending from the upper storage yard to the lower storage yard empty followed by a reversal of the winch set to drive a second cycle with the first consist descending form the upper storage yard to the lower storage yard empty and the second consist loading a mass in the bottom storage yard and ascending to the upper storage yard and unloading the mass thereby storing excess electrical energy available on the utility grid, the differential motor engaged to play out cable at each consist transit during charging and, the winch set operable under control of the power controller in a generating mode with the winch set motor/generator reversed to generate electrical power to the utility grid in a third cycle with the first consist loading a mass in the upper storage yard and descending to the lower storage yard and unloading the mass and said second consist ascending from the lower storage yard to the upper storage yard empty followed by a reversal of the winch set to generate in a fourth cycle with the first consist ascending from the lower storage yard to the upper storage yard empty and the second consist loading a mass in the upper storage yard and descending to the lower storage yard and unloading the mass thereby providing electrical energy to the utility grid, the differential motor engaged take in cable at each consist transit during generation.

\* \* \* \* \*